United States Patent
Guan et al.

(10) Patent No.: US 7,139,457 B2
(45) Date of Patent: Nov. 21, 2006

(54) METHOD FOR COMPENSATING MODAL DISPERSION IN MULTIMODE OPTICAL FIBER TRANSMISSION PATH

(75) Inventors: Ning Guan, Sakura (JP); Shinji Habu, Sakura (JP); Katsuhiro Takenaga, Sakura (JP); Kuniharu Himeno, Sakura (JP); Koichi Harada, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/194,463

(22) Filed: Aug. 2, 2005

(65) Prior Publication Data

US 2006/0034573 A1     Feb. 16, 2006

(30) Foreign Application Priority Data

| Feb. 5, 2003 | (JP) | ............................. P2003-028488 |
| Mar. 25, 2003 | (JP) | ............................. P2003-083790 |
| Mar. 25, 2003 | (JP) | ............................. P2003-083791 |

(51) Int. Cl.
 *G02B 6/26* (2006.01)
 *G02B 6/10* (2006.01)
(52) U.S. Cl. ........................................ 385/123; 385/28
(58) Field of Classification Search ................ None
 See application file for complete search history.

(56) References Cited

U.S. PATENT DOCUMENTS 4,205,900 A * 6/1980 Eve ............................. 385/124
6,363,195 B1   3/2002 Abbott, III et al.

FOREIGN PATENT DOCUMENTS

| JP | S49-102356 A | 9/1974 |
| JP | S53-131054 A | 11/1978 |
| JP | 2001-052205 A | 2/2001 |
| WO | WO 99/22471 A1 | 5/1999 |

OTHER PUBLICATIONS

W. F. Love, "Bandwidth Spectral Characterization of Modal Compensation in Multimode Optical Fibers"; Proceedings of European Conference on Optical Communication 1981 (Denmark), Electromagnetics Institute, Technical University of Denmark, 1981, vol. 4, pp. 4-1 to 4-4.

L. Raddatz, et al., "An Experimental and Theoretical Study of the Offset Launch Technique for the Enhancement of the Bandwidth of Multimode Fiber Links"; Journal of Lightwave Technology, vol. 16, No. 3, Mar. 1998, pp. 321-331.

K. Okamoto, "Comparison of calculated and measured impulse responses of optical fibers"; Applied Optics, vol. 18, No. 13, Jul. 1, 1979, pp. 2199-2206.

(Continued)

*Primary Examiner*—Rodney Bovernick
*Assistant Examiner*—Omar Rojas
(74) *Attorney, Agent, or Firm*—Sughrue Mion, PLLC

(57) ABSTRACT

In an optical transmission path including multimode optical fibers, modal dispersion is reduced so that signal light can be transmitted at high speed and across a broad band, at low-cost and over a long distance. To reduce modal dispersion, when the transmission path is constructed by coupling a plurality of multimode optical fibers, a length ratio for the multimode optical fibers that obtains the maximum band of the optical transmission path is determined, and the multimode optical fibers are coupled according to this length ratio. The multimode optical fibers that are used have specific refractive index profiles as mode dispersion-compensating fibers. The compensated fiber and the mode dispersion-compensating fiber are coupled with specific lengths.

13 Claims, 39 Drawing Sheets

OTHER PUBLICATIONS

IEC 60793-2-10 Optical Fibers Part 2-10: Product specifications—Sectional Specification for category A1 multimode fibers, International Electrotechnical Commission, Mar. 2002 (can be found in the specification).

* cited by examiner

FIG. 7A
FIG. 7B
FIG. 7C
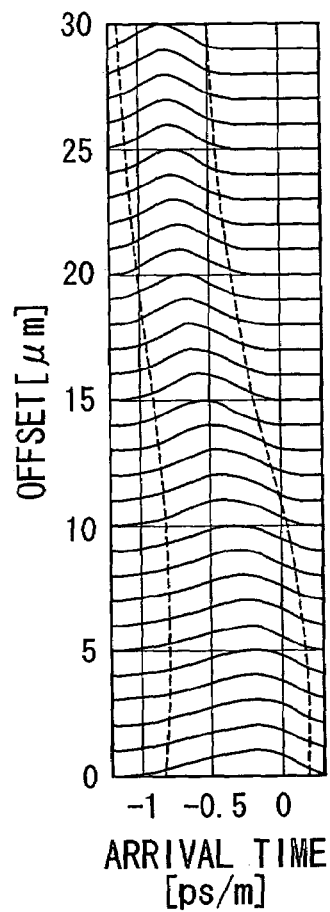
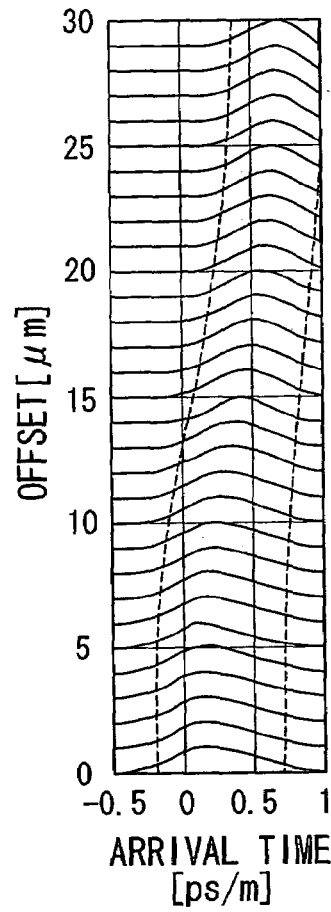
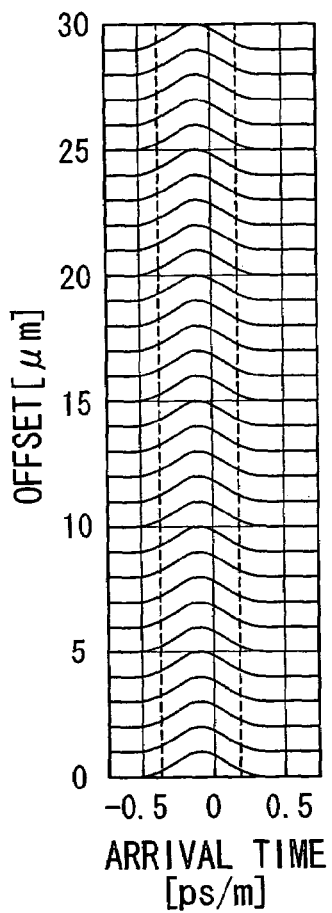

FIG. 46A
FIG. 46B
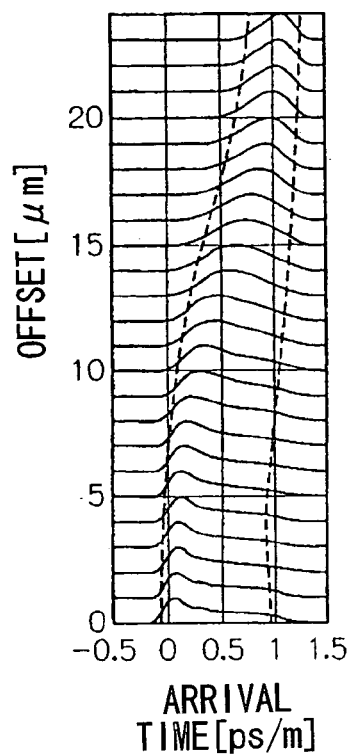
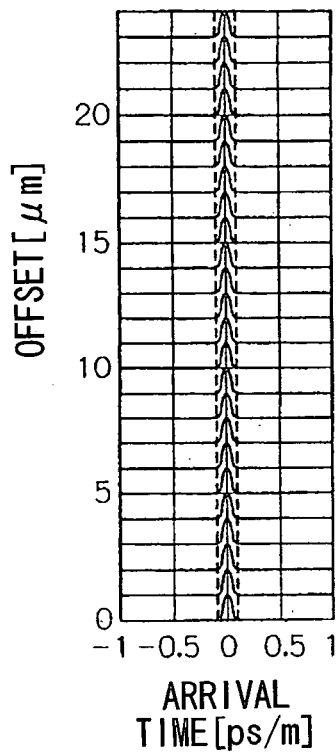
FIG. 47
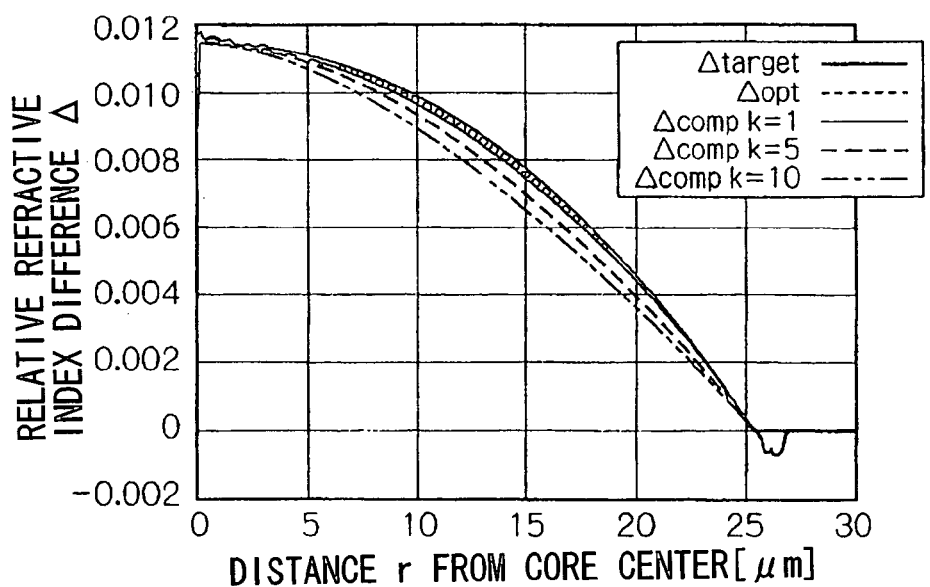

FIG. 58
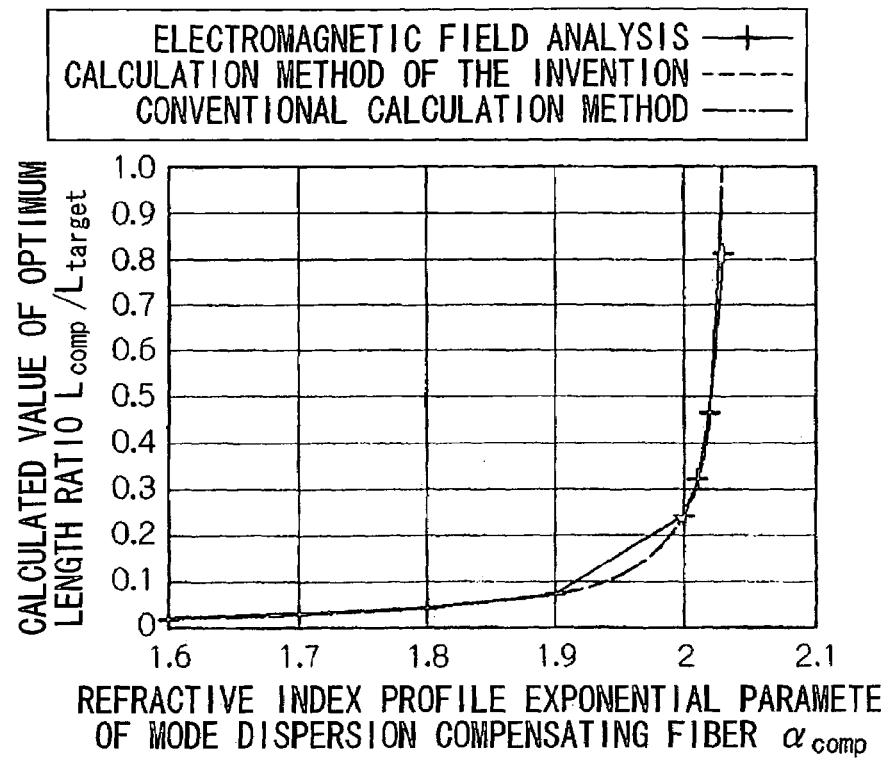
FIG. 59A  FIG. 59B  FIG. 59C
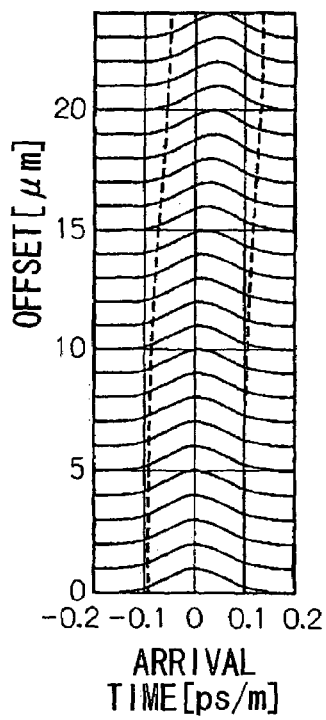
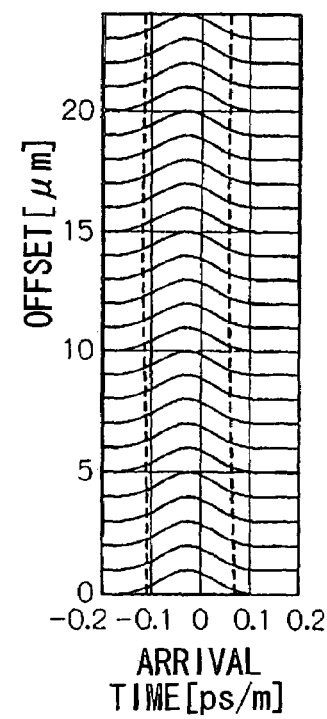
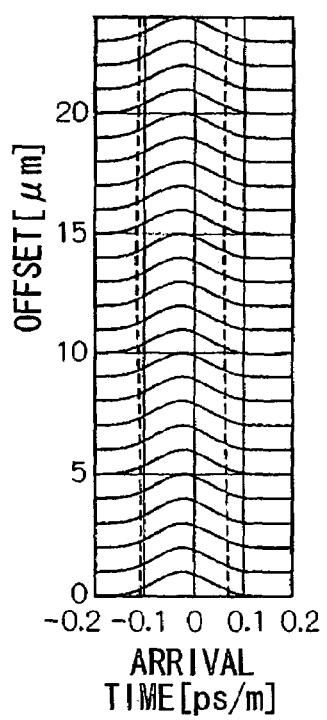

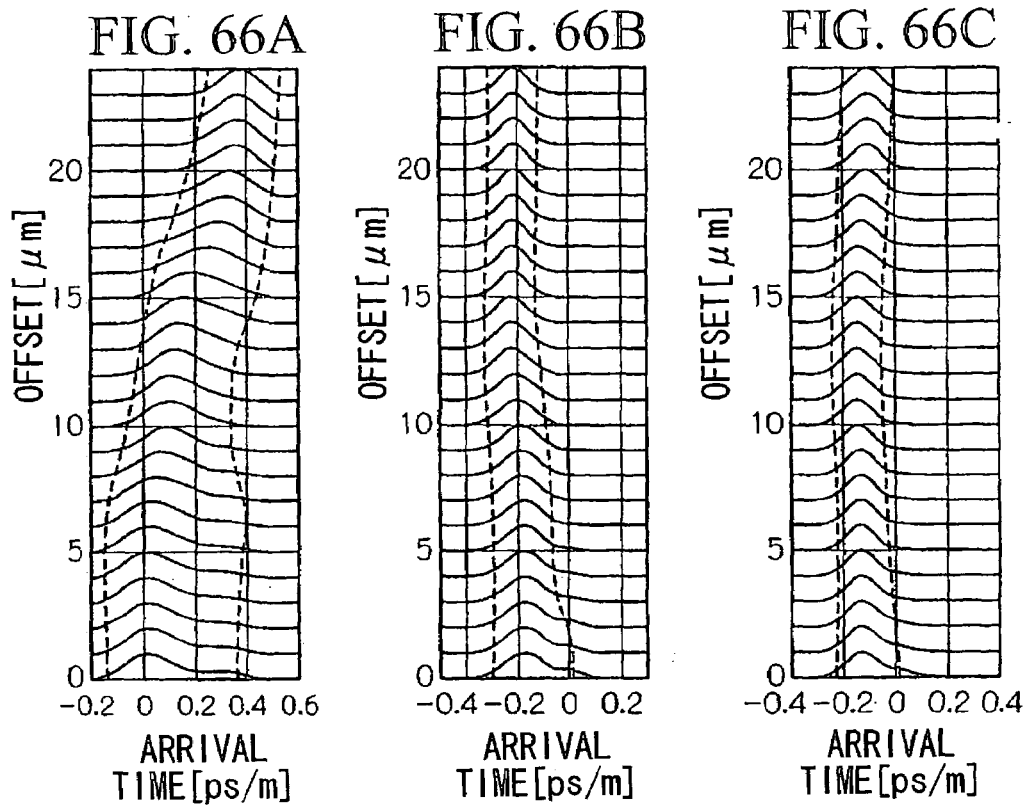
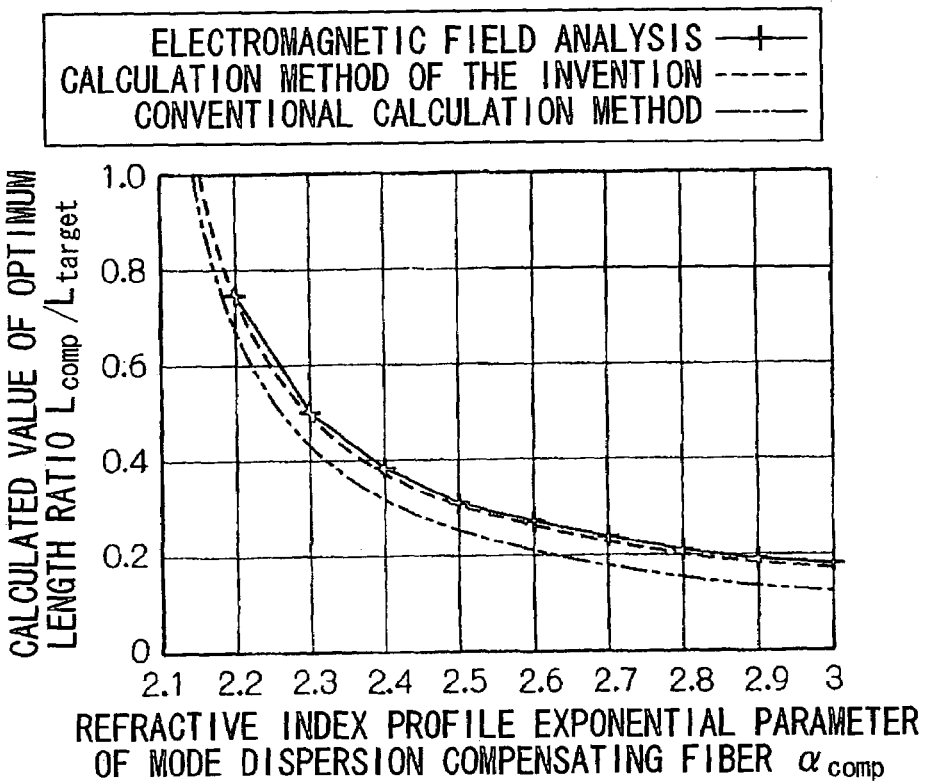

METHOD FOR COMPENSATING MODAL DISPERSION IN MULTIMODE OPTICAL FIBER TRANSMISSION PATH

CROSS-REFERENCE TO RELATED APPLICATIONS

This application claims priority from Japanese Patent Application Nos. 2003-28488, filed on Feb. 5, 2003, 2003-83790, filed on Mar. 25, 2003, 2003-83791, filed on Mar. 25, 2003, and International Patent Application No. PCT/JP2004/001108, filed on Feb. 4, 2004, the disclosures of which are incorporated herein by reference.

BACKGROUND OF THE INVENTION

1. Field of the Invention

This invention relates to a method for compensating modal dispersion in an optical fiber transmission path configured by using multimode optical fibers. The method is directed to reducing modal dispersion of the optical transmission path and obtaining a broad transmission band.

2. Related Art

Multimode optical fibers are widely used in local area networks (LAN) and the like that link computers or related devices in a transmission path, such as factory automation (FA) and office automation (OA) systems. Multimode fibers enable the diameter of the acceptance surface to be increased, and facilitate coupling with light-emitting and light-receiving devices.

One type of optical fiber is a graded index optical fiber (hereinafter referred to as "GI-fiber") in which the refractive index profiles set such that the refractive index gradually decreases as the radius of the core increases, synchronizing the arrival times of light signal in each mode, has little modal dispersion and obtains a broad band. Since GI fibers obtain a broad band, they are used in optical transmission paths in LAN and the like to increase transmission speed.

One international standard for LANs is Ethernet®. Recently, an Ethernet® with a transmission rate of 10 Gigabits/s (hereinafter referred to as "10 GbE") has been stipulated, and is expected to be put into practical use. As described in the document below, in order to realize 10 GbE there is a demand to greatly reduce modal dispersion along the transmission path and obtain a broad transmission band. "IEC 60793-2-10 Optical Fibers Part 2–10: Product specifications—Sectional Specification for category A1 multimode fibers", International Electrotechnical Commission March 2002, pp. 3–30.

Since the transmission band of a GI fiber is determined by its refractive index dispersion, to realize a broad band such as that required by 10 GbE, the refractive index dispersion of the core must be adjusted with extreme precision so that the refractive index has its maximum at the core center and decreases gradually as a function of the radial distance from the center.

Consequently, the range of tolerance for error in the refractive index of GI fiber is extremely narrow, making it difficult to manufacture with good yield and increasing the manufacturing cost. Since the range of tolerance for error in the refractive index is extremely narrow, it is difficult to achieve a stable and constant refractive index dispersion and difficult to manufacture long GI fibers.

Since the range of tolerance for error in the refractive index profile is narrow, it is difficult to form a stable and constant refractive index profile and difficult to achieve the intended broad band. Moreover, since the refractive index profile that obtains the maximum band differs according to the wavelength of the signal light, a broad band cannot be obtained by using a light transmission path that uses conventional GI fibers to propagate signal light in a different waveband to that of the transmission path specification.

As described in the document below, when the refractive index profile of the GI fiber does not satisfy the required profile and a broad band cannot be obtained, a GI fiber having a different refractive index profile from that of the GI fiber (fiber to be compensated) is coupled to the fiber to be compensated as a mode dispersion-compensating fiber to compensate for modal dispersion.

However, this document does not explicitly state specific conditions for compensating modal dispersion, and, for example, proposes no optimum values for the refractive index profile of the mode dispersion-compensating fiber for efficiently compensating modal dispersion of the compensated fiber. W. F. Love, Proceedings of European Conference on Optical Communication '81 (Denmark), Electromagnetics Institute, Technical University of Denmark, 1981, Vol. 4, pp. 4-1 to 4-4.

When using a mode dispersion-compensating fiber to compensate modal dispersion in a GI fiber, Published Japanese Translation No. 2001-52205 of the PCT International Application (WO99/22471) proposes the following method to calculate the length ratio of the compensated fiber and the modal dispersion compensating fiber to be coupled thereto.

The proposed method approximates the refractive index profile of the mode dispersion-compensating fiber and the refractive index profile of the compensated fiber using Equation (1) below, and calculates the refractive index profile exponential parameter α for each.

$$n(r) = \begin{cases} n_1[1 - 2\Delta(r/a)^\alpha]^{1/2} & (0 \leq r \leq a) \\ n_1[1 - 2\Delta]^{1/2} & (a < r) \end{cases} \quad (1)$$

wherein n(r) is the refractive index at a distance r from the core center of the optical fiber, $n_1$ is a refractive index at the core center, Δ is a relative refractive index difference of the core center with respect to a cladding, a is a core radius, and α is a refractive index profile exponential parameter.

Using respective refractive index profile exponential parameters α, the length of the mode dispersion-compensating fiber is determined so that the length ratio of the mode dispersion-compensating fiber and the compensated fiber satisfies Equation (2) below.

$$\frac{L_{comp}}{L_{target}} = \frac{\alpha_{target} - \alpha_{opt}}{\alpha_{opt} - \alpha_{comp}} \quad (2)$$

where $L_{comp}$ is a length of the mode dispersion-compensating fiber, $L_{target}$ is a length of the compensated fiber, $\alpha_{comp}$ is a refractive index profile exponential parameter of the mode dispersion-compensating fiber, $\alpha_{target}$ is a refractive index profile exponential parameter of the compensated fiber, and $\alpha_{opt}$ is the refractive index profile exponential parameter in a refractive index profile that obtains the maximum band at a predetermined wavelength.

The conventional method for calculating the length of mode dispersion-compensating fiber uses empirical rules and produces many errors. Additional errors arise from the need to approximate refractive index profiles of the mode dispersion-compensating fiber and the compensated fiber with the above Equation (1). Consequently, modal dispersion cannot be sufficiently compensated and it is difficult to achieve a broad band appropriate for high-speed transmission.

Another method proposes calculating optimum values for the length ratio $L_{comp}/L_{target}$ of the mode dispersion-compensating fiber and the compensated fiber by calculating a group velocity of the signal light propagating through the mode dispersion-compensating fiber and the compensated fiber using electromagnetic field analysis, and then making a simulation based on the calculated values.

However, this method requires complex computation, and a program for computation is not easy to develop. Since a long time is needed to compute the simulation, this method cannot be used in sites where an optical transmission path is laid.

SUMMARY OF THE INVENTION

Accordingly, it is an object of this invention to provide a method for using GI fibers to construct a low-cost optical transmission path that has a broad band that can be easily formed over a long distance, and to provide an optical transmission path and an optical LAN that can be formed over a long distance easily and at low-cost, and have a broad band capable of realizing high transmission speeds such as 10 GbE.

It is another object to provide a method for compensating modal dispersion that has superior modal dispersion efficiency and can compensate with high precision, and to provide an optical transmission path and an optical LAN that have a broad band and almost no modal dispersion.

In order to achieve the above-mentioned objects, this application provides three invention groups as examples of the invention.

First Invention Group

One exemplary embodiment of the present invention provides a method for constructing an optical transmission path by coupling a plurality of multimode optical fibers. The method includes determining a length ratio for the multimode optical fibers that obtains the maximum band of the optical transmission path, and coupling the plurality of multimode optical fibers according to the length ratio.

Another exemplary embodiment of the present invention provides an optical transmission path having a plurality of multimode optical fibers, the length ratio of the multimode optical fibers being adjusted to obtain the maximum band of the optical transmission path.

According to an exemplary embodiment of the present invention, the optical transmission path has a multimode optical fiber along which arrival times of signal light, propagated through the multimode optical fibers in a plurality of modes, are faster in higher-order modes than in lower-order modes, and a multimode optical fiber along which arrival times of signal light are slower in higher-order modes than in lower-order modes.

According to an exemplary embodiment of the present invention, the optical transmission path transmits signal light in a band of 0.85 µm and/or a band of 1.3 µm. An exemplary embodiment of the present invention provides an optical LAN that uses the optical transmission path.

Second Invention Group

Another exemplary embodiment of the present invention provides a method for compensating modal dispersion by coupling a mode dispersion-compensating fiber and a compensated fiber having refractive index profiles that satisfy the following Equation (3):

$$\Delta_{comp}(r)=\Delta_{opt}(r)+k\{\Delta_{opt}(r)-\Delta_{target}(r)\} \quad (3)$$

where $\Delta_{comp}(r)$ is a relative refractive index difference of the mode dispersion-compensating fiber at a distance r from a core center, $\Delta_{target}(r)$ is a relative refractive index difference of the compensated fiber at a distance r from a core center, $\Delta_{opt}(r)$ is a relative refractive index difference of the entire fiber at the distance r from the core center when the compensated fiber and the mode dispersion-compensating fiber are coupled to obtain the maximum band at a predetermined wavelength, and k is a proportional numerical constant. The fibers may comprise multimode optical fibers. In this exemplary embodiment modal dispersion is compensated in the compensated fiber and the maximum band at a predetermined wavelength is obtained.

According to an exemplary embodiment of the present invention, the mode dispersion-compensating fiber and the compensated fiber are coupled according to a length ratio that obtains the maximum band.

According to another exemplary embodiment of the present invention, a mode dispersion-compensating fiber couples to a compensated fiber including a multimode optical fiber, compensates modal dispersion in the compensated fiber, and obtains the maximum band at a predetermined wavelength. The refractive index profile of the mode dispersion-compensating fiber satisfies Equation (3).

Another exemplary embodiment of the present invention provides an optical transmission path constructed by coupling a compensated fiber including a multimode optical fiber to a mode dispersion-compensating fiber having a refractive index profile that satisfies Equation (3), according to a length ratio that obtains the maximum band.

According to an exemplary embodiment of the present invention, the optical transmission path transmits signal light in a band of 0.85 µm and/or a band of 1.3 µm.

According to an exemplary embodiment of the present invention, an optical LAN uses the optical transmission path.

Another exemplary embodiment of the present invention provides a method for compensating modal dispersion. When coupling a mode dispersion-compensating fiber and a compensated fiber including multimode optical fibers so as to compensate modal dispersion in the compensated fiber and obtain the maximum band at a predetermined wavelength, the compensated fiber and the mode dispersion-compensating fiber are coupled according to a length that satisfies the following Equation (4):

$$L_{comp}/L_{target} = \frac{\int_0^{a_{target}} \{\Delta_{target}(r) - \Delta_{opt}(r)\}dr}{\int_0^{a_{comp}} \{\Delta_{opt}(r) - \Delta_{comp}(r)\}dr} \quad (4)$$

where $L_{comp}$ is a length of the mode dispersion-compensating fiber, $L_{target}$ is a length of the compensated fiber, $a_{comp}$ is a core radius of the mode dispersion-compensating fiber, $a_{target}$ is a core radius of the compensated fiber, $\Delta_{comp}(r)$ is a relative refractive index difference at a distance r from a core center of the mode dispersion-compensating fiber, $\Delta_{target}(r)$ is a relative refractive index difference at a distance r from a core center of the compensated fiber, and $\Delta_{opt}(r)$ is a relative refractive index difference at a distance r from a core center of the entire fiber when the compensated fiber and the mode dispersion-compensating fiber are coupled to obtain the maximum band at a predetermined wavelength.

Another exemplary embodiment of the present invention provides a method for compensating modal dispersion by coupling a mode dispersion-compensating fiber and a compensated fiber having refractive index profiles that satisfy the following Equation (5), and a length ratio that satisfies the following Equation (6):

$$n(r) = \begin{cases} n_1\{1 - 2\Delta_1(r/a)^\alpha\}^{1/2} & (0 \leq r \leq a) \\ n_1\{1 - 2\Delta_1\}^{1/2} & (a < r) \end{cases} \quad (5)$$

where n(r) is a relative refractive index difference of the optical fibers at a distance r from a core center, $n_1$ is a refractive index at the core center, $\Delta_1$ is a relative refractive index difference of the core center with respect to a cladding, a is a core radius, and $\alpha$ is a refractive index profile exponential parameter, $$L_{comp}/L_{target} = \left(\frac{\alpha_{target} - \alpha_{opt}}{\alpha_{opt} - \alpha_{comp}}\right) \times \left(\frac{1 + \alpha_{comp}}{1 + \alpha_{target}}\right) \quad (6)$$

where $L_{comp}$ is a length of the mode dispersion-compensating fiber, $L_{target}$ is a length of the compensated fiber, $\alpha_{comp}$ is a refractive index profile exponential parameter of the mode dispersion-compensating fiber, $\alpha_{target}$ is a refractive index profile exponential parameter of the compensated fiber, and $\alpha_{opt}$ is a refractive index profile exponential parameter of the entire fiber when the mode dispersion-compensating fiber and the compensated fiber are coupled so as to obtain a maximum band at a predetermined wavelength. The fibers may comprise multimode optical fibers. In this exemplary embodiment modal dispersion is compensated in the compensated fiber and the maximum band at a predetermined wavelength is obtained.

Another exemplary embodiment of the present invention provides an optical transmission path constructed by coupling a compensated fiber and a mode dispersion-compensating fiber, including multimode optical fibers, according to a length ratio that satisfies Equation (4).

Another exemplary embodiment of the present invention provides an optical transmission path constructed by coupling a mode dispersion-compensating fiber and a compensated fiber, including multimode optical fibers. The mode dispersion-compensating fiber and the compensated fiber have refractive index profiles that satisfy Equation (5), and are coupled according to a length ratio that satisfies Equation (6).

According to an exemplary embodiment of the present invention, refractive index profile exponential parameters $\alpha_{comp}$ and $\alpha_{target}$ of the mode dispersion-compensating fiber and the compensated fiber are 0.5 or greater, the relative refractive index differences of core centers with respect to claddings $\Delta_{1comp}$ and $\Delta_{1target}$ are between 0.005 and 0.025, and core radii $a_{comp}$ and $a_{target}$ are between 5 μm and 50 μm.

According to an exemplary embodiment of the present invention, the optical transmission path transmits signal light in a band of 0.85 μm and/or a band of 1.3 μm. An exemplary embodiment of the present invention provides an optical LAN that uses the optical transmission path.

BRIEF DESCRIPTION OF THE DRAWINGS

FIGS. 7(a), (b), and (c) are diagrams of DMD characteristics of GI fiber 1, GI fiber 2, and the optical transmission path shown in FIG. 2, respectively, when the length of the path is 0.3 km.

FIG. 46 is a diagram of DMD characteristics of (a) a compensated fiber and (b) an optical transmission path according to Specific Example 2-7.

FIG. 47 is a diagram of the refractive index profiles of a mode dispersion-compensating fiber according to Specific Example 2-8 and a compensated fiber that was already manufactured, and the refractive index profile that obtains the maximum band of wavelengths of the signal light used.

FIG. 58 is a diagram showing the relationship between $\alpha_{comp}$ and the length ratio $L_{comp}/L_{target}$ calculated in Specific Example 3-4.

FIG. 59 is a diagram of DMD characteristics in (a) the compensated fiber, (b) an optical transmission path configured with a length ratio $L_{comp}/L_{target}$ calculated by a conventional method, and (c) an optical transmission path configured with a length ratio $L_{comp}/L_{target}$ calculated by the method of an exemplary embodiment of the present invention according to Specific Example 3-4.

FIG. 66 is a diagram of DMD characteristics in (a) the compensated fiber, (b) an optical transmission path configured with a length ratio $L_{comp}/L_{target}$ calculated by a conventional method, and (c) an optical transmission path configured with a length ratio $L_{comp}/L_{target}$ calculated by the method of an exemplary embodiment of the present invention according to Specific Example 3-7.

FIG. 67 is a diagram showing the relationship between $\alpha_{comp}$ and the length ratio $L_{comp}/L_{target}$ calculated in Specific Example 3-8.

DETAILED DESCRIPTION OF EXEMPLARY EMBODIMENTS

Exemplary embodiments of the present invention will be explained in detail.

Firstly, a first invention group will be explained in detail.

[Optical Transmission Path and Method for Constructing the Same]

Signal light incident into a multimode optical fiber, such as a GI fiber, propagates in a plurality of modes. When the propagation modes generate differences in the arrival times of the signal light at the output end, the difference in the arrival times causes dispersion of the propagated signal light (hereinafter referred to as "modal dispersion").

When modal dispersion is considerable, signal light with a high transmission capacity (signal light with a narrow pulse width) has a wider pulse width after propagation due to modal dispersion, resulting in overlapping of signals that consequently become undetectable. This type of modal dispersion limits the transmission speed at which signal light can be propagated; the limit value that a signal can be propagated at is referred to as the band of the optical fiber.

Since the transmission speed of signal light in an optical fiber is affected by the frequency that the signal light can be propagated at, the speed is determined by the band of the optical fiber. Modal dispersion can be almost completely eliminated by synchronizing the arrival times of signals propagated in different modes at the output end, thereby widening the band of the optical fiber and increasing the transmission speed of the signal light.

Figure 1:
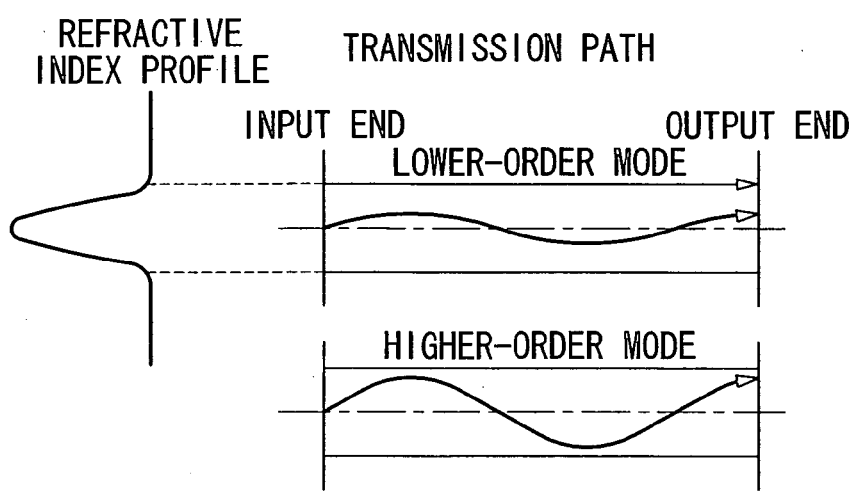
FIG. 1 is a schematic diagram of a refractive index profile of a GI fiber and propagation paths of each propagation mode.

FIG. 1 is a schematic diagram of a refractive index profile of a GI fiber, and paths of propagation modes of light signals that propagate through the GI fiber in a plurality of propagation modes.

The refractive index profile n(r) of the GI fiber has its maximum at the core center, and is approximated with Equation (7) below. In Equation (7), $n_1$ is a refractive index at the core center, $\Delta_1$ is the relative refractive index difference, a is the core radius, r is the difference from the core center, and $\alpha$ is a refractive index profile exponential parameter.

$$n(r) = \begin{cases} n_1\{1 - 2\Delta_1(r/a)^\alpha\}^{1/2} & (0 \leq r \leq a) \\ n_1\{1 - 2\Delta_1\}^{1/2} & (a < r) \end{cases} \quad (7)$$

In lower-order modes, the light propagates near to the core center and is strongest at the core center. In contrast, in higher-order modes, the distribution of light strength is strongest away from the core center so that the light is totally reflected in a large angle at the interface between the core and the cladding, whereby the transmission path is longer than in lower-order modes.

As mentioned above, the refractive index profile of the GI fiber is such that the refractive index reaches its maximum at the core center, and gradually decreases as the radius distance increases; consequently, although signal light in lower-order modes has a short propagation path, it propagates slowly. In contrast, while signal light in higher-order modes has a long transmission path, its refractive index is small around the outer periphery of the core and it propagates at high speed.

The shape of the refractive index profile of the GI fiber is determined by the refractive index profile exponential parameter a in Equation (7). Accordingly, the arrival times at the output end of the light signals propagating in different modes can be synchronized by controlling the refractive index profile exponential parameter $\alpha$. This reduces modal dispersion to its theoretical minimum and achieves a broad band. The refractive index profile exponential parameter in this case is deemed optimum value $\alpha_0$.

When the refractive index profile exponential parameter a increases, the refractive index profile slowly changes at the core center while the refractive index abruptly decreases around the core periphery. Therefore, when the refractive index profile exponential parameter a is greater than the optimum value $\alpha_0$, the arrival time at the output end of signal light propagating in higher-order modes is delayed.

Conversely, when α is made smaller, signal light propagating in higher-order modes arrives at the output end earlier.

Figure 2:
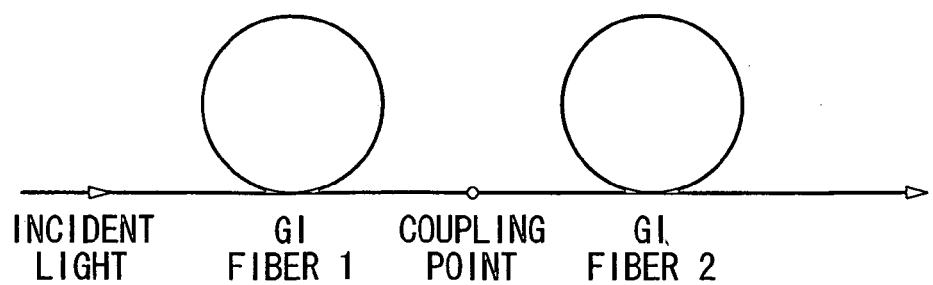
FIG. 2 is a schematic configuration diagram of an example of an optical transmission path of an exemplary embodiment of the present invention.

FIG. 2 is an example of an optical transmission path of an exemplary embodiment of the present invention. This optical transmission path is constructed by coupling a GI fiber having a refractive index profile exponential parameter α that is lower than the optimum value $\alpha_0$, and a GI fiber having a refractive index profile exponential parameter a that is greater than the optimum value $\alpha_0$.

The GI fibers can be manufactured by a conventional method. Their refractive index profile exponential parameters a need only be greater or lower than the optimum value $\alpha_0$, and need not be carefully adjusted during manufacture.

Figure 3A:
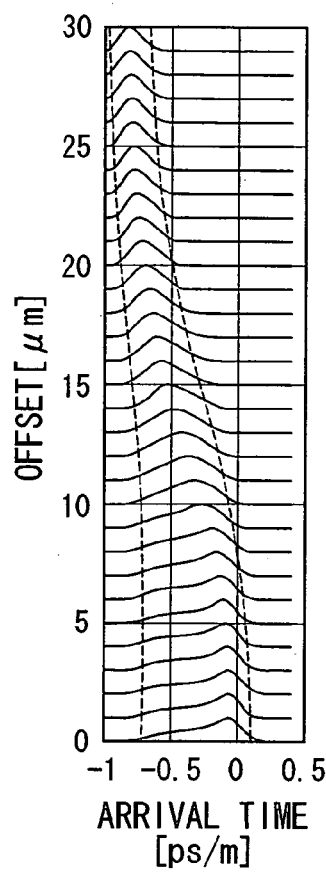
FIGS. 3(a), (b), and (c) are diagrams of differential mode delay (DMD) characteristics of GI fiber 1, GI fiber 2, and the optical transmission path shown in FIG. 2, respectively.
Figure 3B:
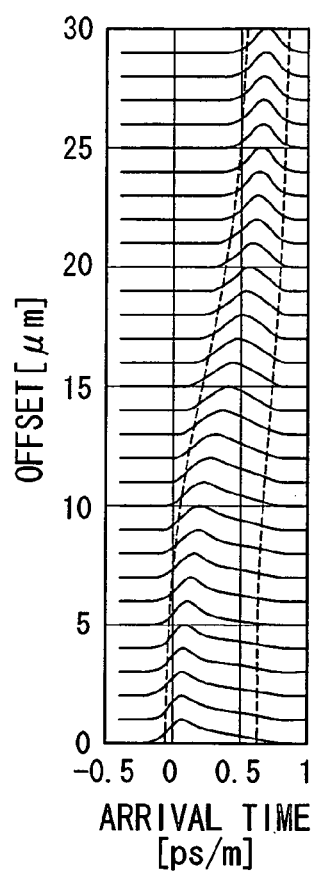
Figure 3C:
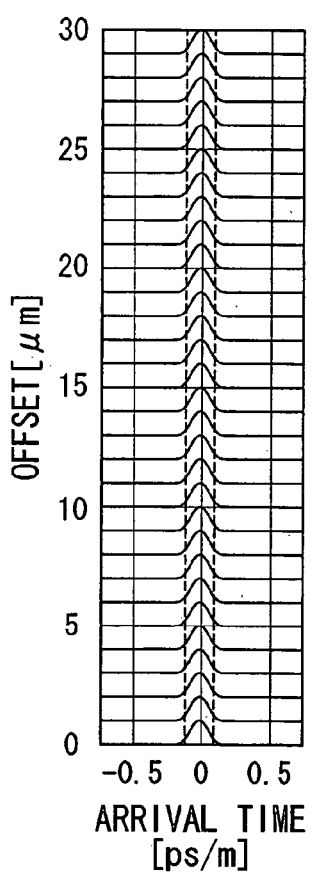

FIGS. 3(a), 3(b), and 3(c) are diagrams of differential mode delay (DMD) characteristics of the GI fibers 1 and 2 and an optical transmission path shown in FIG. 2 calculated from simulation, respectively. DMD characteristics are obtained by offsetting the center of a pulse of incident light from the center of the GI fiber while exciting multiple propagation modes, and plotting the output waveforms over time, the propagation times being different for each mode. Offset is the distance in the radial direction from the center of the incident signal light to the center of the core.

The light signal propagates in a higher-order mode as the center of the incident light moves farther away from the center of the core in the radial direction. Therefore, a waveform of zero offset is a light signal that contains many lower-order modes, and the higher the offset, the higher the order of the mode that the signal light propagates in.

GI fiber 1 has a refractive index profile exponential parameter a of 1.94 and GI fiber 2 has a refractive index profile exponential parameter α of 2.14, while the optimum value $\alpha_0$ for the refractive index profile exponential parameters of both GI fibers 1 and 2 is 2.04. The GI fibers 1 and 2 each have a radius of 62.5 μm, a core radius of 25 μm, a relative refractive index difference Δ of 0.01, and a total length of 1 km.

In this example, the optical transmission path is constructed by coupling a GI fiber 1 of 0.48 km to a GI fiber 2 of 0.52 km.

The center wavelength of the signal light is 0.85 μm, the spectral full width at half maximum is 0.25 nm, and the pulse full width at half maximum is 0.08 ns.

As shown in FIG. 3(a), GI fiber 1, whose refractive index profile exponential parameter α is lower than the optimum value $\alpha_0$, arrives at the output end more quickly when the mode order is higher. Accordingly, if the arrival time of signal light propagated in the lowest order mode is taken as a reference, the relative value of the arrival time of signal light propagated in higher-order modes becomes a minus value.

In contrast, as shown in FIG. 3(b), GI fiber 2, whose refractive index profile exponential parameter a is higher than the optimum value $\alpha_0$, arrives at the output end more slowly when the mode order is higher. Accordingly, if the arrival time of signal light propagated in the lowest order mode is taken as a reference, the relative value of the arrival time of signal light propagated in higher-order modes becomes a plus value.

In this transmission path, GI fibers 1 and 2 are coupled together, so that the plus relative value of the arrival time in higher-order modes along GI fiber 2 can compensate for the minus relative value of the arrival time in higher-order modes along GI fiber 1.

The relative values of the arrival times of signal light propagated in higher-order modes increase in proportion to the length of the GI fiber. Accordingly, the ratio between the lengths of GI fiber 1 and GI fiber 2 in the transmission path is adjusted so that the relative value of the arrival time in higher-order modes along GI fiber 1 matches the relative value of the arrival time in higher-order modes along GI fiber 2, whereby the arrival times of signal light at the output end are synchronized in all propagation modes as shown in FIG. 3(c).

The length ratio of GI fibers 1 and 2 is determined by the following method.

The refractive index profiles of GI fibers 1 and 2 are measured, and these measurements are used in simulations to calculate the propagation speeds of light signals in all modes. The simulations calculate the power of each mode excited by incident light using a method such as that disclosed in, for example, L. Raddatz et al, J. Lightwave Technol., Vol. 16, pp. 324–331 (1998). Mode excitation from GI fiber 1 to GI fiber 2 is calculated from the electromagnetic field distribution of corresponding propagation modes.

The propagation speeds of all modes in GI fibers 1 and 2 are then calculated using the method disclosed in K. Okamoto, Appl. Opt., Vol. 18, pp. 2199–2206 (1979).

This theoretical calculation method is used in calculating the bands of optical transmission paths constructed by coupling the two GI fibers 1 and 2 with various length ratios. Here, it is assumed that signal light that propagates in the GI fiber 1 propagates in all possible propagation modes of the other GI fiber.

A Fourier transformation of the output signal light obtains a frequency spectrum, and the band of the optical transmission path is determined as the frequency band where the amplitude of the frequency spectrum is less than half the amplitude of zero frequency.

Figure 4:
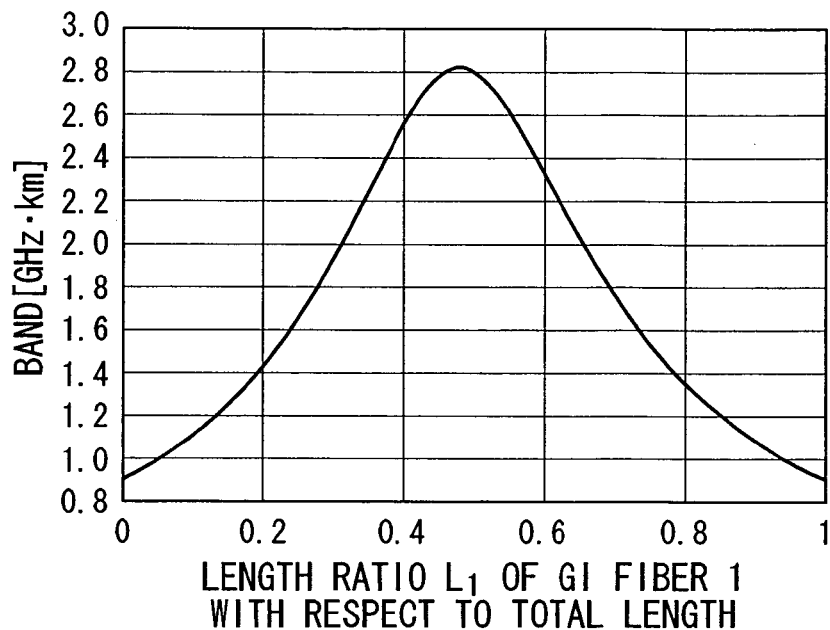
FIG. 4 is a diagram of the band of the optical transmission path of FIG. 2.

FIG. 4 is a diagram of bands in the over-filled launch condition (hereinafter referred to as "OFL") of the optical transmission path, calculated from simulation and plotted against a length ratio $L_1$ of GI fiber 1. The band of the optical transmission path exhibits an upward convex curve with respect to the length ratio $L_1$ of GI fiber 1 and has a maximum value. The band in FIG. 4 reaches it maximum when the length ratio $L_1$ of the GI fiber 1 with respect to the optical transmission path is 0.48.

The length ratio of the GI fibers 1 and 2 that constitute the optical transmission path is determined by calculating the bands of optical transmission paths constructed by coupling GI fibers 1 and 2 with various length ratios, and selecting the length ratio that achieves the maximum band.

Figure 5:
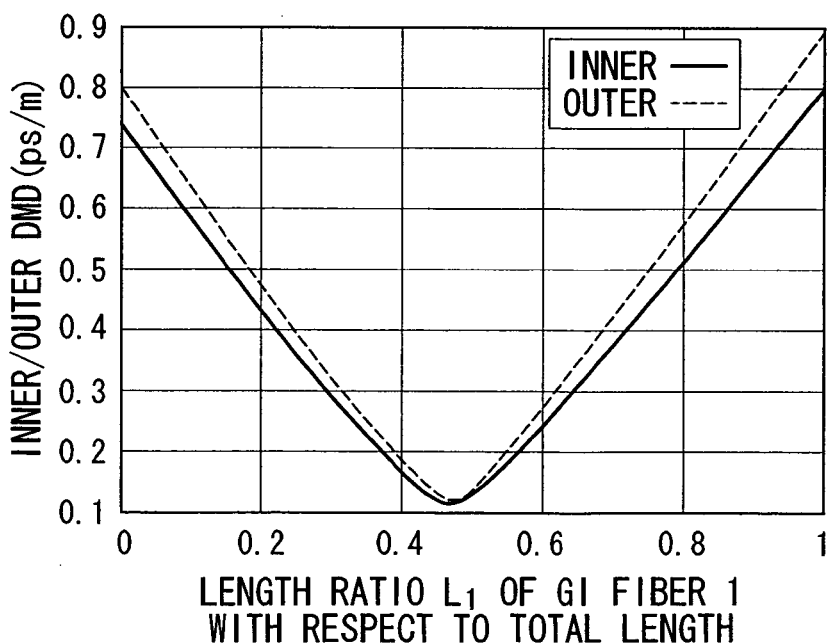
FIG. 5 is a diagram of inner/outer DMD of the optical transmission path of FIG. 2.

FIG. 5 is a diagram obtained by using simulation to calculate the arrival times at the output end of signal light propagated in all propagation modes along optical transmission paths constructed by coupling GI fibers 1 and 2 according to various length ratios, and plotting the difference between the slowest arrival times and fastest arrival times against the length ratio $L_1$ of GI fiber 1. In FIG. 5, the inner DMD is the difference between the slowest arrival time and the fastest arrival time when the offset is between 5 μm and 18 μm, and the outer DMD is the difference between the slowest arrival time and the fastest arrival time when the offset is between 0 μm and 23 μm.

When the length ratio $L_1$ of GI fiber 1 in the transmission path is 0.48, which obtains the maximum band, the inner DMD and the outer DMD are both at their minimum and substantially match.

Figure 6:
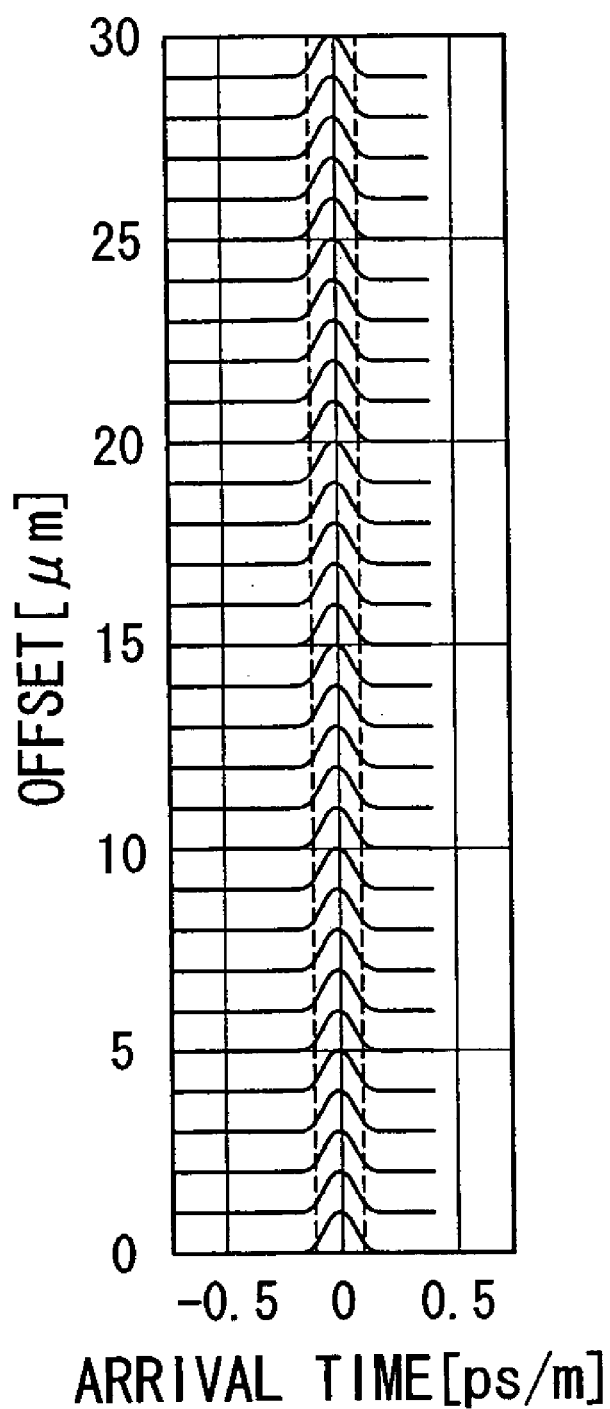
FIG. 6 is a diagram of DMD characteristics of a GI fiber whose refractive index profile exponential parameter has an optimum value $\alpha_0$.

FIG. 6 is a diagram of DMD characteristics of a GI fiber whose refractive index profile exponential parameter has the optimum value $\alpha_0$, calculated from simulation.

As shown in FIG. 3(c) and FIG. 6, when the optical transmission path is constructed after adjusting the length ratio of the GI fibers 1 and 2 to obtain the maximum band, it has almost the same DMD characteristics as the GI fiber having an optimum refractive index profile exponential parameter of $\alpha_0$.

The bands of optical transmission paths constructed by coupling the GI fiber 1, whose refractive index profile exponential parameter $\alpha$ is lower than the optimum value $\alpha_0$, and GI fiber 2, whose refractive index profile exponential parameter $\alpha$ is higher than the optimum value $\alpha_0$, at various length ratios, are calculated as shown in FIG. 4, and the length ratio of the GI fibers at the maximum band are determined. The GI fibers are then coupled with the calculated length ratio to construct an optical transmission path. As shown in FIG. 3(c), the arrival times at the output end of signal light propagated in all propagation modes are synchronized to obtain an optical transmission path having a broad band.

FIG. 7 is a diagram of DMD characteristics when the transmission path length is 0.3 km, FIG. 7(a) showing GI fiber 1, FIG. 7(b) showing GI fiber 2, and FIG. 7(c) showing a transmission path constructed by coupling GI fibers 1 and 2 at the same length ratio as that of FIG. 3. Even when the transmission path length is different, the output end arrival times of propagated signal light can be synchronized in all propagation modes if the length ratio is the same.

Figure 8:
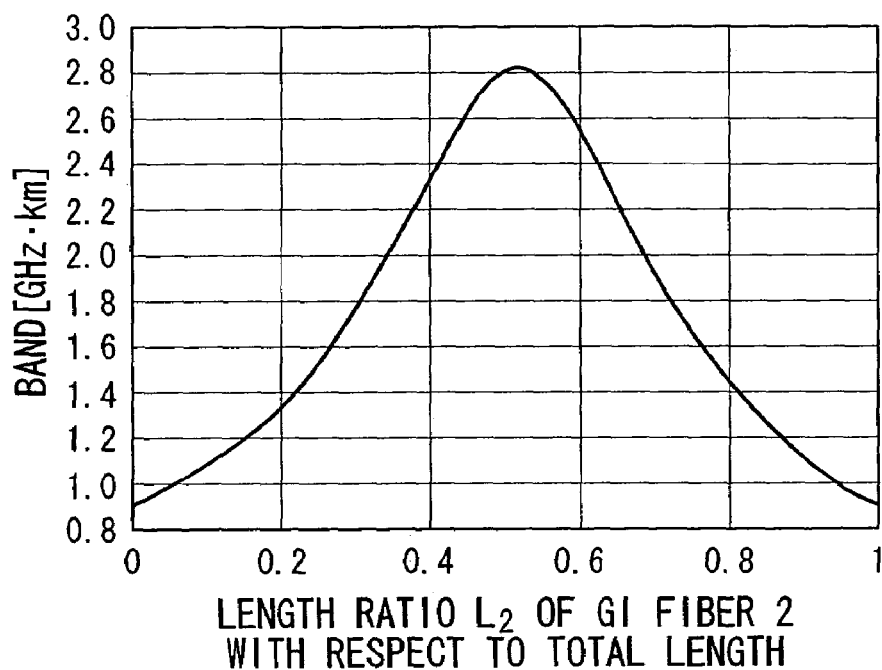
FIG. 8 is a diagram of the band of an optical transmission path in which the combination of the GI fibers is reversed.
Figure 9:
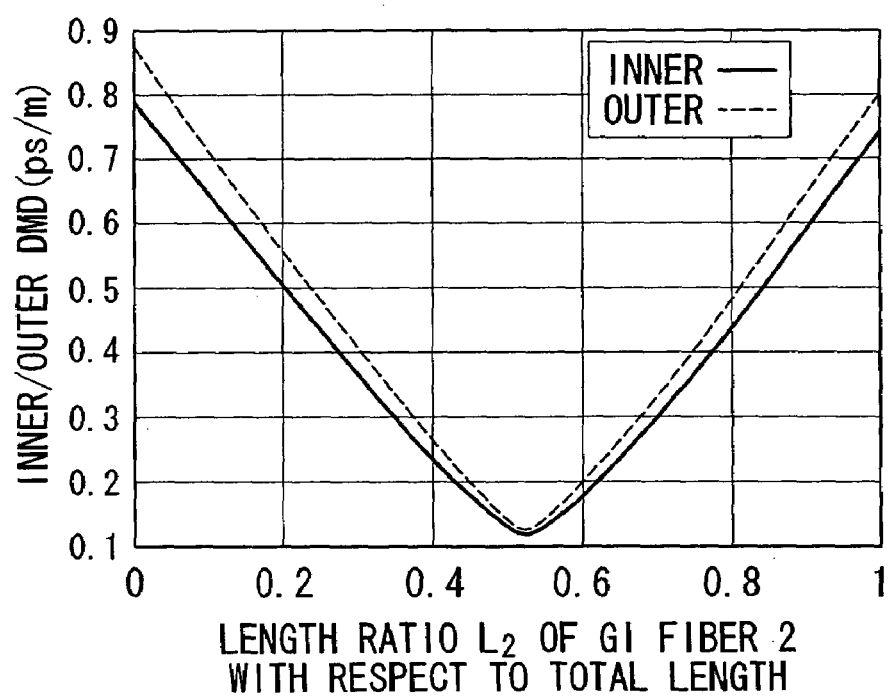
FIG. 9 is a diagram of inner/outer DMD characteristics of an optical transmission path in which the combination of the GI fibers is reversed.

FIG. 8 is a diagram that shows bands at the OFL of an optical transmission path constructed by attaching GI fiber 1 at the output end and GI fiber 2 at the input end, plotted against a length ratio $L_2$ of the input-end GI fiber 2. FIG. 9 plots inner/outer DMD characteristics of the same optical transmission path over a length ratio $L_2$ of the GI fiber 2.

When the length ratio $L_2$ of GI fiber 2 is 0.52, the band of the transmission path reaches its maximum; in addition, the inner DMD and the outer DMD are both at their minimum and substantially match. The length ratio of the GI fiber 1 in this case is 0.48, so that the output end arrival times of the propagated signals can be synchronized by optimizing the length ratio, irrespective of the combination in which the GI fibers 1 and 2 are coupled.

This optical transmission path can be manufactured by a conventionally known method that does not require the refractive index profiles of the GI fibers to be controlled precisely. This enables GI fibers used in the optical transmission path to be manufactured at high yield and reduces the cost of the optical transmission path.

For a GI fiber having any refractive index profile, it is possible to calculate the optimum length ratio that will obtain a transmission path with a broad band. This allows effective use of GI fibers that have already been manufactured. For example, a broad-band optical transmission path can be realized by coupling a GI fiber whose length ratio has been adjusted to a GI fiber that has already been laid. Since GI fibers that have already been laid can be used in this way, existing GI fibers can be used efficiently.

[Optical LAN]

An optical LAN of an exemplary embodiment of the present invention uses the optical transmission path described above. Otherwise, there are no restrictions on its configuration and a conventional one can be applied. For example, the optical transmission path can be a link between a computer and related devices.

As described above, the optical transmission path has a broad band that enables its transmission speed to be increased. This enables 10 GbE Ethernet® that transmits at 10 Gb/sec.

Specific examples of this invention are given below. The optical transmission path of an exemplary embodiment of the present invention was constructed using GI fibers having the refractive index profile exponential parameter shown in Table 1. When the wavelength of the signal light is 0.85 µm, the optimum value $\alpha_0$ for refractive index profile is 2.04.

TABLE 1

| Specific Example | Refractive index profile exponential parameter of GI Fiber 1 | Refractive index profile exponential parameter of GI Fiber 2 | Wavelength of Signal Light (µm) | Length Ratio of GI Fiber 1 (calculated value) |
|---|---|---|---|---|
| 1-1 | 1.94 | 2.06 | 0.85 | 0.16 |
| 1-2 | 2.02 | 2.14 | 0.85 | 0.83 |
| 1-3 | 2.02 | 2.06 | 0.85 | 0.51 |
| 1-4 | 1.94 | 2.02 | 0.85 | 0 |
| 1-5 | 1.84 | 2.04 | 1.3 | 0.48 |
| 1-6 | — | — | 0.85 | 0.43 |

Figure 10:
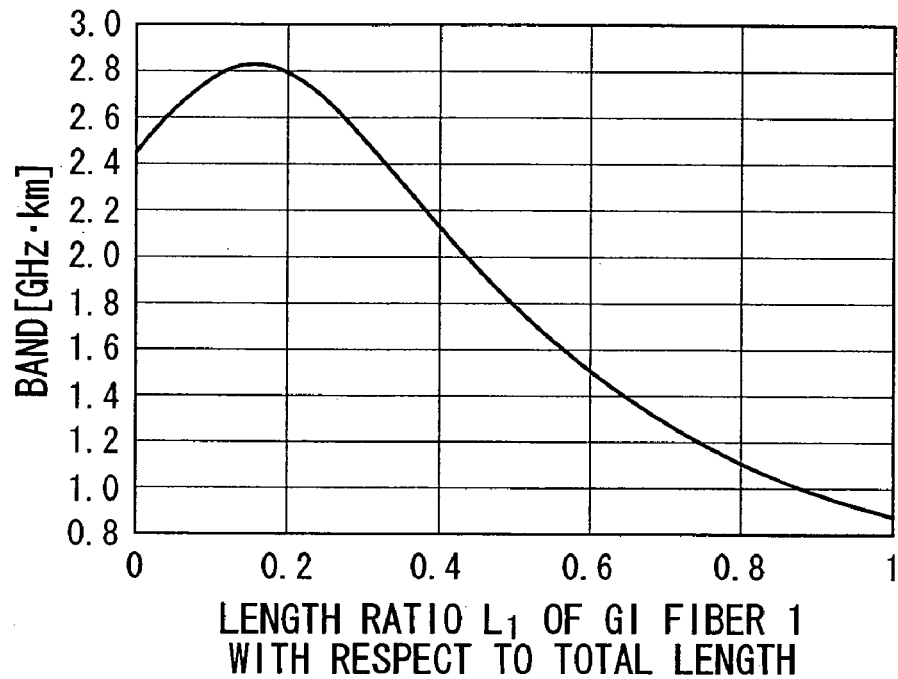
FIG. 10 is a diagram of the band of an optical transmission path according to Specific Example 1-1.
Figure 11:
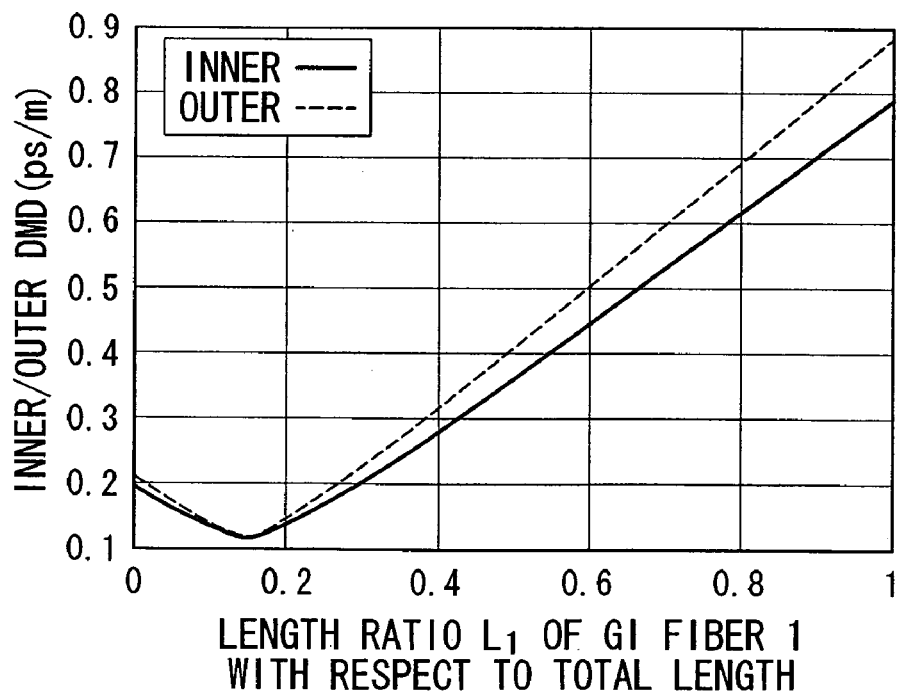
FIG. 11 is a diagram of inner/outer DMD characteristics of the optical transmission path according to Specific Example 1-1.

FIG. 10 is a diagram of bands at the OFL of an optical transmission path constructed by coupling the GI fibers of Specific Example 1-1 at various length ratios, calculated by simulation and plotted against the length ratio $L_1$ of the GI fiber 1. FIG. 11 plots inner/outer DMDs of the same optical transmission path against a length ratio $L_1$ of the GI fiber 1.

When the length ratio $L_1$ of the GI fiber 1 is 0.16, the band of the optical transmission path is at its maximum; in addition, the inner DMD and the outer DMD are both at their minimum and substantially match. In Specific Example 1-1, GI fibers 1 and 2 were coupled in an optical transmission path so that the length ratio $L_1$ of the GI fiber 1 is 0.16.

Figure 12A:
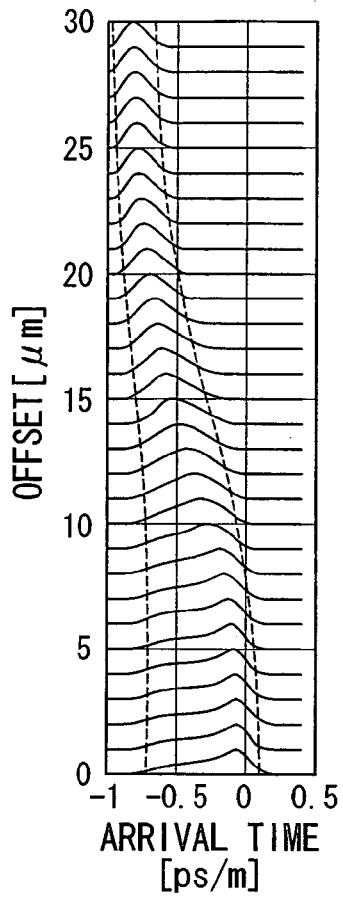
FIGS. 12(a), (b), and (c) are diagrams of DMD characteristics of GI fibers 1 and 2 and an optical transmission path according to Specific Example 1-1, respectively.
Figure 12B:
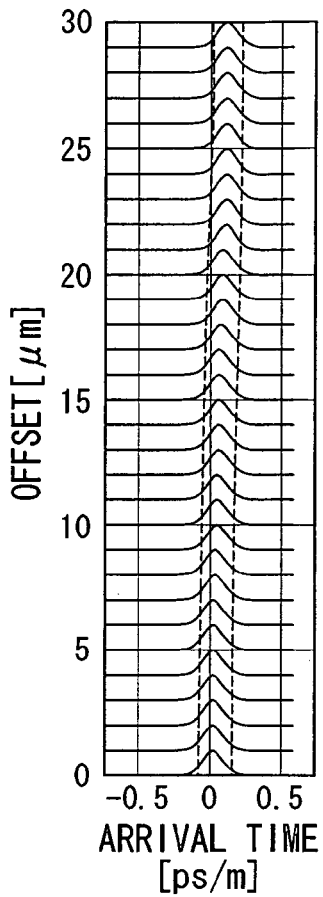
Figure 12C:
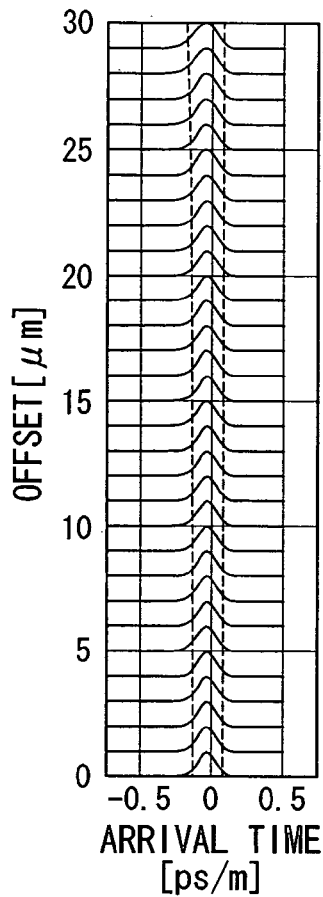

FIG. 12 is a diagram of DMD characteristics of the Specific Example 1-1 calculated by simulation, FIG. 12(a) showing DMD characteristics of GI fiber 1, FIG. 12(b) showing those of GI fiber 2, and FIG. 12(c) showing those when GI fibers 1 and 2 were coupled with the above length ratio to construct an optical transmission path.

As shown in FIG. 12(c), the arrival times at the output end of signal light propagated in every mode could be synchronized by determining a length ratio that obtains the maximum band and coupling the GI fibers 1 and 2 at this length ratio.

Figure 13:
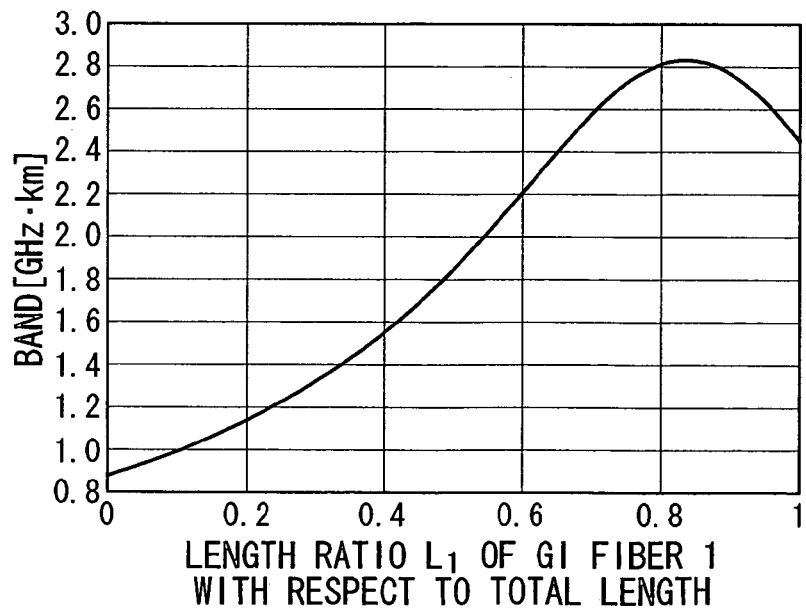
FIG. 13 is a diagram of the band of an optical transmission path according to Specific Example 1-2.
Figure 14:
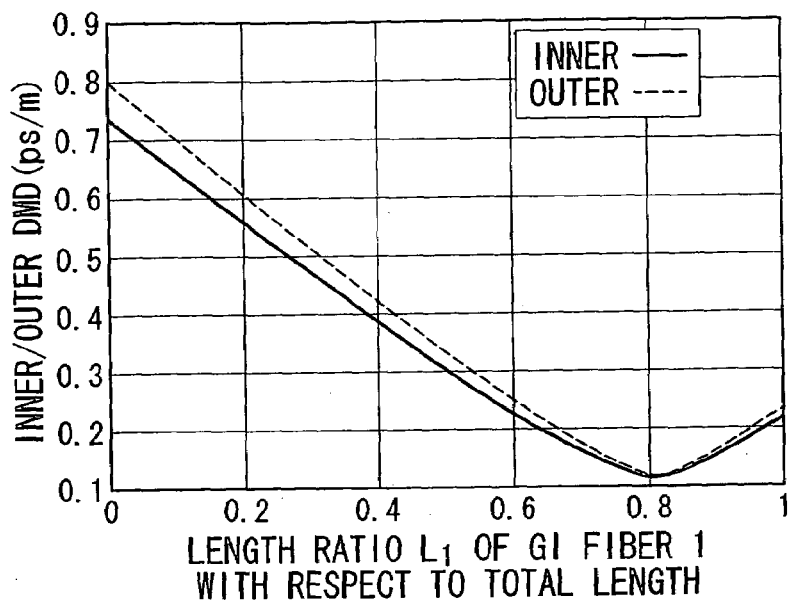
FIG. 14 is a diagram of inner/outer DMD characteristics of the optical transmission path according to Specific Example 1-2.

FIG. 13 is a diagram of bands at the OFL of an optical transmission path constructed by coupling the GI fibers of Specific Example 1-2 at various length ratios, calculated by simulation and plotted against the length ratio $L_1$ of GI fiber 1. FIG. 14 plots inner/outer DMDs of the same optical transmission path against the length ratio $L_1$ of the GI fiber 1.

When the length ratio $L_1$ of the GI fiber 1 is 0.83, the band of the optical transmission path is at its maximum; in addition, the inner DMD and the outer DMD are both at their minimum and substantially match. In Specific Example 1-2, GI fibers 1 and 2 were coupled in an optical transmission path so that the length ratio $L_1$ of the GI fiber 1 is 0.83.

Figure 15A:
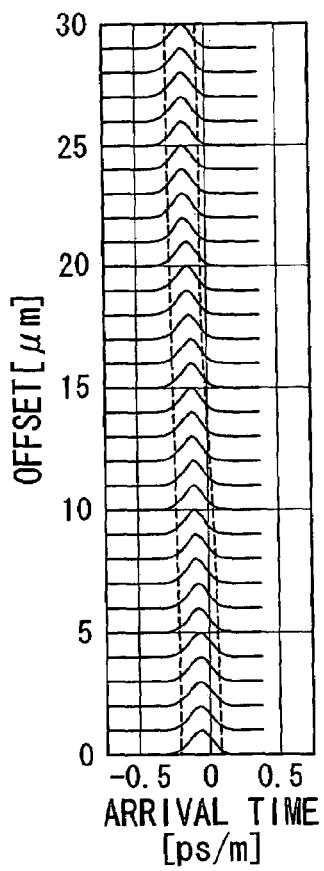
FIGS. 15(a), (b), and (c) are diagrams of DMD characteristics of GI fibers 1 and 2 and an optical transmission path according to Specific Example 1-2, respectively.
Figure 15B:
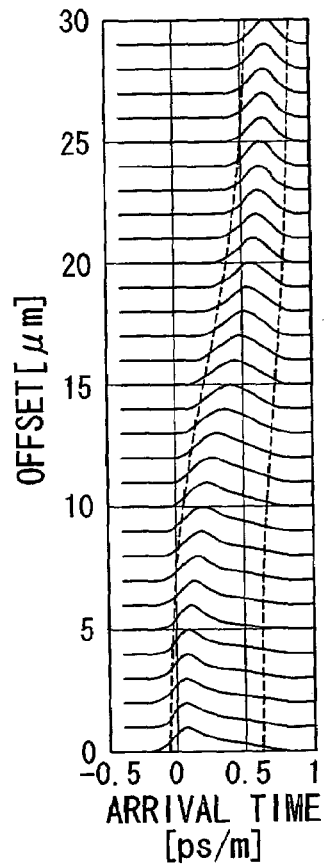
Figure 15C:
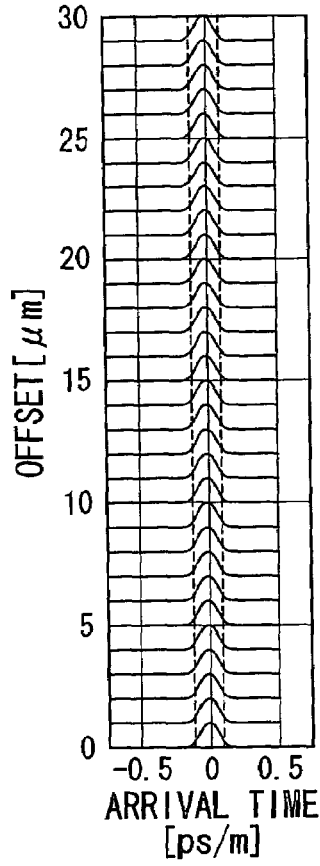

FIG. 15 is a diagram of DMD characteristics of the Specific Example 1-2 calculated by simulation, FIG. 15(a) showing DMD characteristics of GI fiber 1, FIG. 15(b) showing those of GI fiber 2, and FIG. 15(c) showing those when GI fibers 1 and 2 were coupled with the above length ratio to construct an optical transmission path.

As shown in FIG. 15(c), the arrival times at the output end of signal light propagated in every mode could be synchronized by determining the length ratio that obtains the maximum band, and coupling the GI fibers 1 and 2 at this length ratio.

Figure 16:
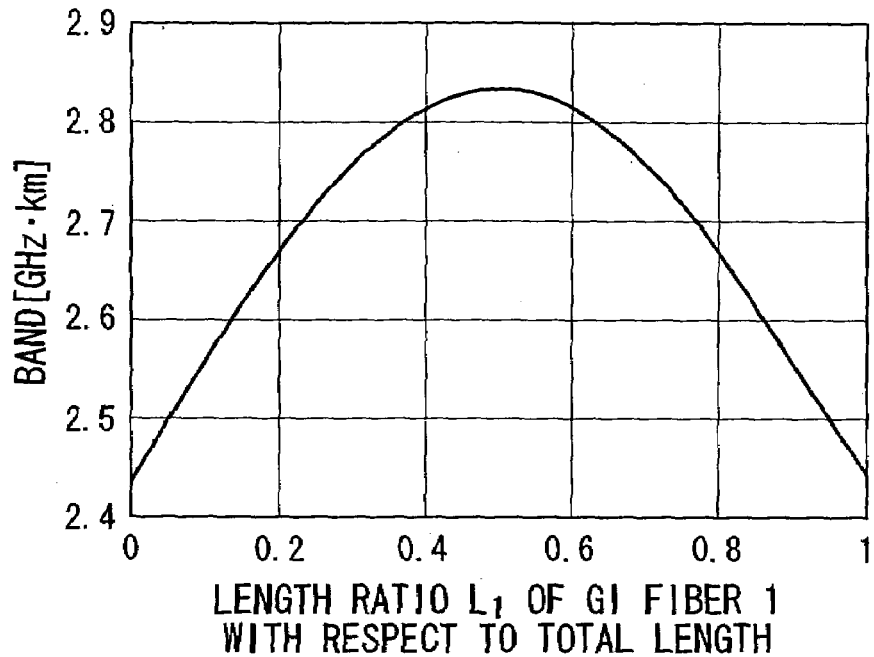
FIG. 16 is a diagram of the band of an optical transmission path according to Specific Example 1-3.
Figure 17:
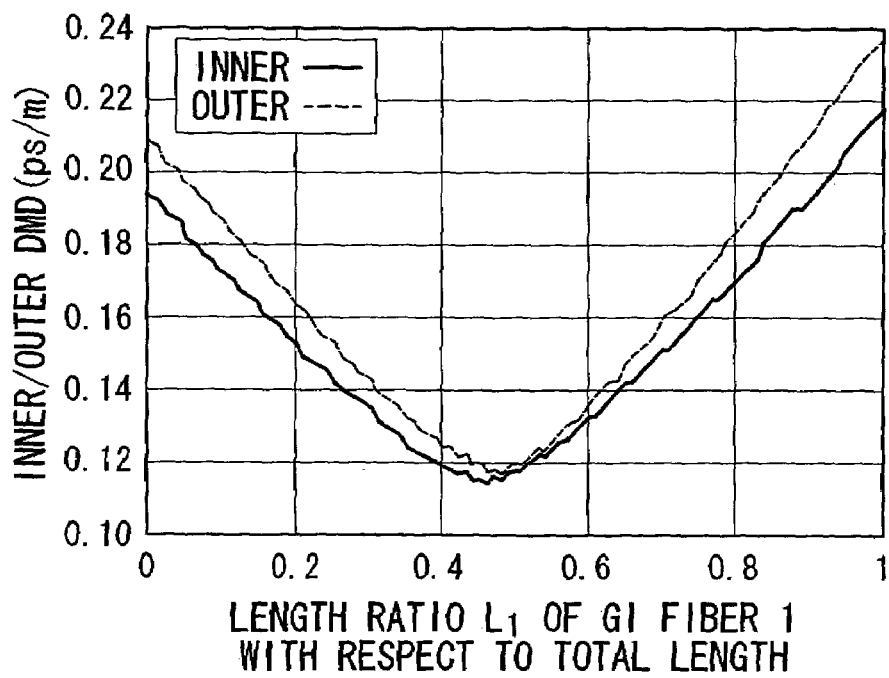
FIG. 17 is a diagram of inner/outer DMD characteristics of the optical transmission path according to Specific Example 1-3.

FIG. 16 is a diagram of bands at the OFL of an optical transmission path constructed by coupling the GI fibers of Specific Example 1-3 at various length ratios, calculated by simulation and plotted against the length ratio $L_1$ of GI fiber 1. FIG. 17 plots inner/outer DMDs of the same optical transmission path against the length ratio $L_1$ of the GI fiber 1.

When the length ratio $L_1$ of the GI fiber 1 is 0.51, the band of the optical transmission path is at its maximum; in addition, the inner DMD and the outer DMD are both at their minimum and substantially match. In Specific Example 1-3, GI fibers 1 and 2 were coupled in an optical transmission path so that the length ratio $L_1$ of the GI fiber 1 is 0.51.

Figure 18A:
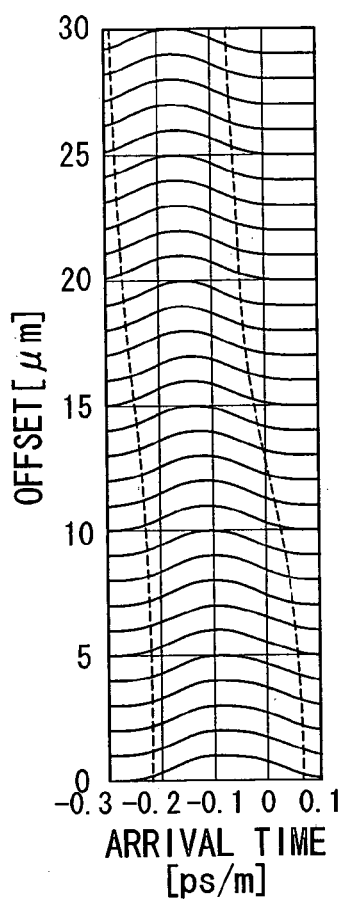
FIGS. 18(a), (b), and (c) are diagrams of DMD characteristics of GI fibers 1 and 2 and an optical transmission path according to Specific Example 1-3, respectively.
Figure 18B:
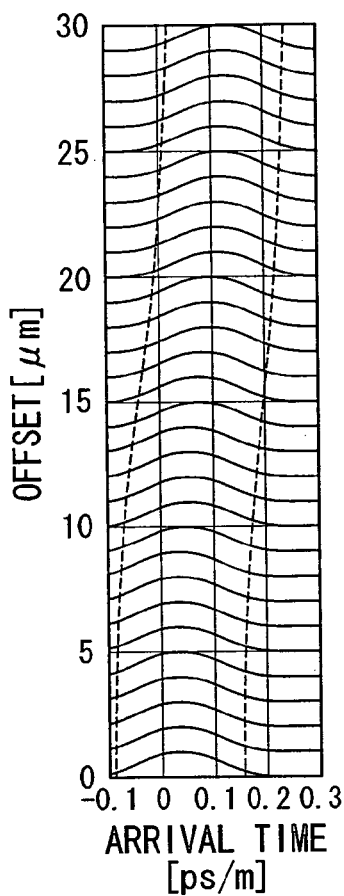
Figure 18C:
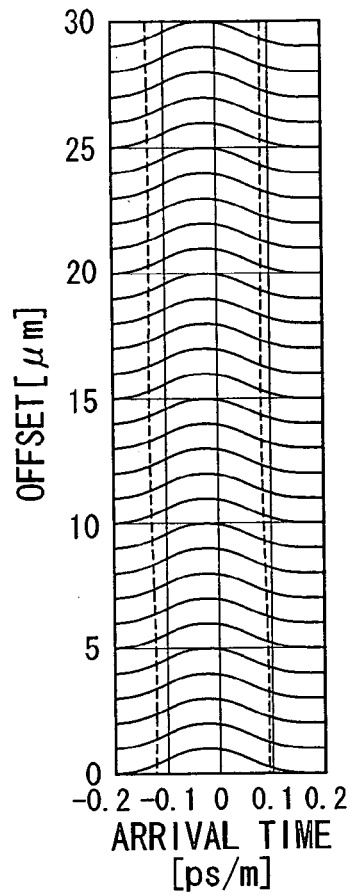

FIG. 18 is a diagram of DMD characteristics of the Specific Example 1-3 calculated by simulation, FIG. 18(a) showing DMD characteristics of GI fiber 1, FIG. 18(b) showing those of GI fiber 2, and FIG. 18(c) showing those when GI fibers 1 and 2 were coupled with the above length ratio to construct an optical transmission path.

As shown in FIG. 18(c), even when the refractive index profile exponential parameter of GI fibers 1 and 2 is close to the optimum value of 2.04, the arrival times at the output end of signal light propagated in every mode can be precisely synchronized by determining the length ratio that obtains the maximum band and coupling the GI fibers 1 and 2 at this length ratio.

Figure 19:
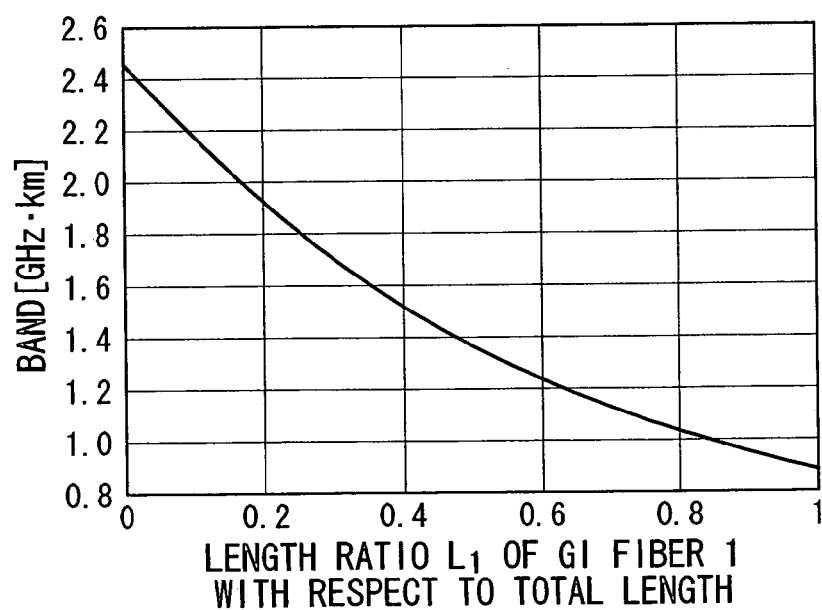
FIG. 19 is a diagram of the band of an optical transmission path according to Specific Example 1-4.
Figure 20:
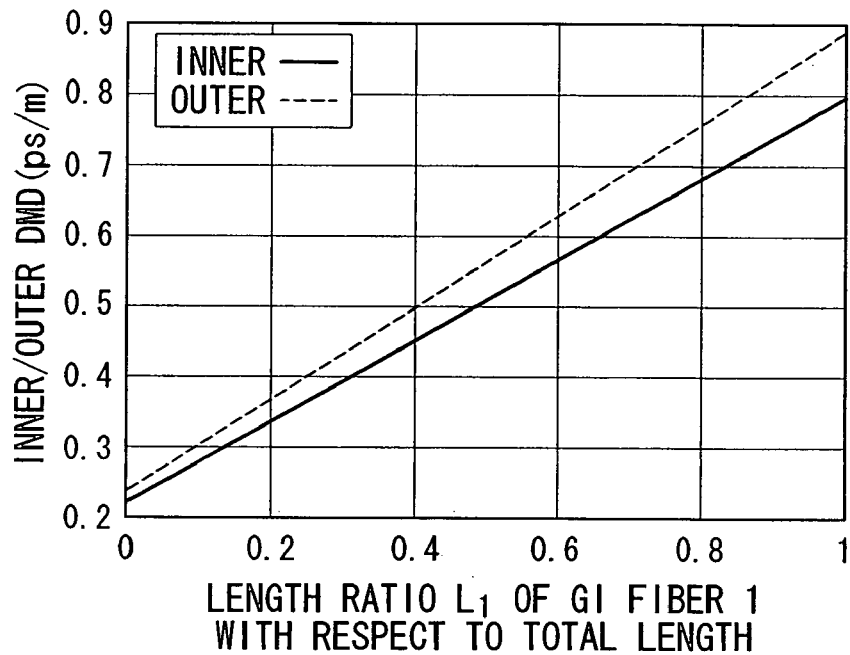
FIG. 20 is a diagram of inner/outer DMD characteristics of the optical transmission path according to Specific Example 1-4.

FIG. 19 is a diagram of bands at the OFL of an optical transmission path constructed by coupling the GI fibers of Specific Example 1-4 at various length ratios, calculated by simulation and plotted against the length ratio $L_1$ of GI fiber 1. FIG. 20 plots inner/outer DMDs of the same optical transmission path against the length ratio $L_1$ of the GI fiber 1.

Since the refractive index profile exponential parameters of GI fibers 1 and 2 are both lower than the optimum value 2.04, deviation in the arrival times caused by propagation modes along GI fiber 1 cannot be compensated by GI fiber 2 when the GI fibers 1 and 2 are coupled as an optical transmission path. Accordingly, as shown in FIG. 19, the transmission path bands do not exhibit an upper convex curve.

When the length ratio $L_1$ of GI fiber 1 is zero, the band of the optical transmission path reaches its maximum; in addition, the inner DMD and the outer DMD are both at their minimum. Therefore, it was found that a broader band can be obtained by using only GI fiber 2 without GI fiber 1 to constitute the optical transmission path. It is possible to determine whether a broader band can be obtained when the two GI fibers are coupled as an optical transmission path by using a simulation to calculate in advance the band of the optical transmission path.

Figure 21:
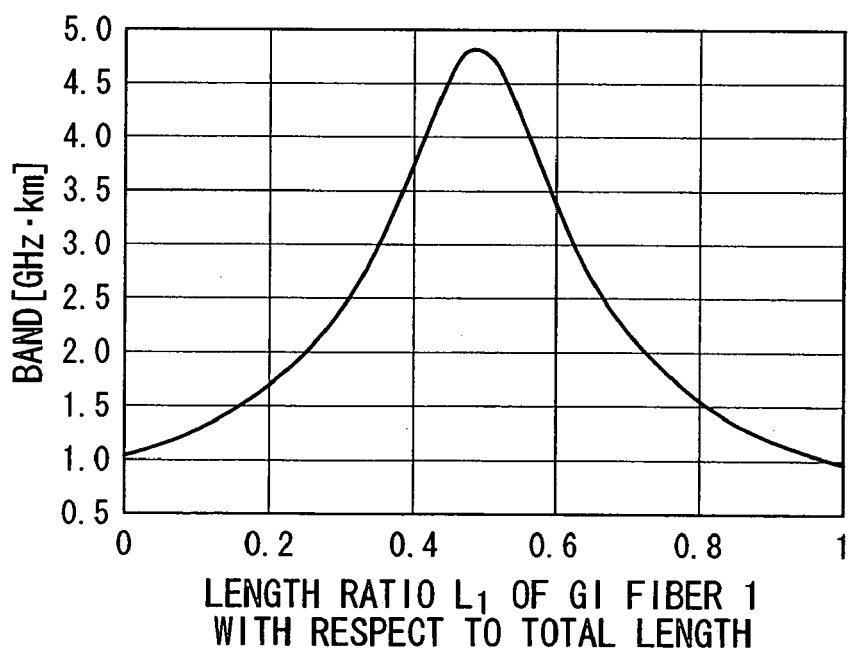
FIG. 21 is a diagram of the band of an optical transmission path according to Specific Example 1-5.
Figure 22:
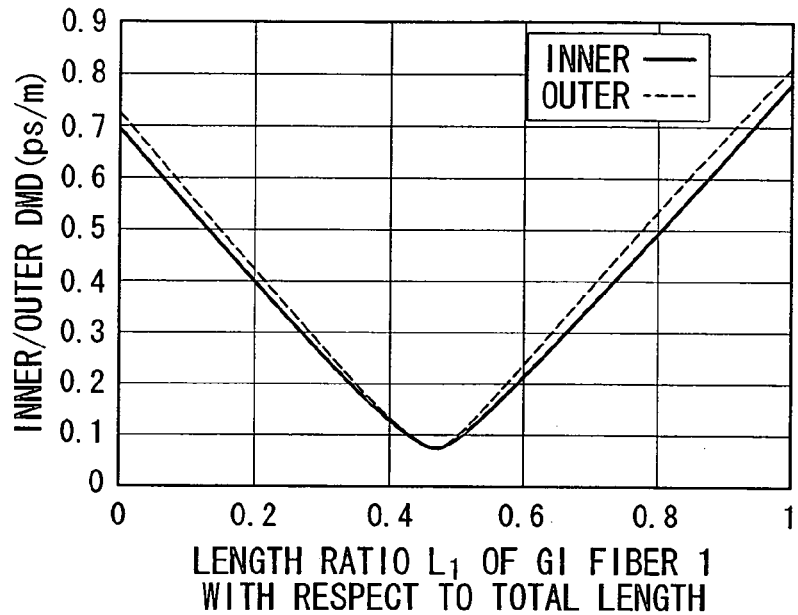
FIG. 22 is a diagram of inner/outer DMD characteristics of the optical transmission path according to Specific Example 1-5.

FIG. 21 is a diagram of bands at the OFL of an optical transmission path constructed by coupling the GI fibers of Specific Example 1-5 at various length ratios, calculated by simulation and plotted against the length ratio $L_1$ of GI fiber 1. FIG. 22 plots inner/outer DMDs of the same optical transmission path against the length ratio of the GI fiber. In this Specific Example 1-5, the wavelength of the signal light is 1.3 μm, the spectral full width at half maximum is 1.0 μm, the pulse full width at half maximum is 0.05 ns, and the optimum value $\alpha_0$ of the refractive index profile exponential parameter of GI fiber in this case is 1.94.

It can be seen that, when the length ratio $L_1$ of GI fiber 1 is 0.48, the band of the optical transmission path is at its maximum; in addition, the inner DMD and the outer DMD are both at their minimum and substantially match. In Specific Example 1-5, GI fibers 1 and 2 were coupled in an optical transmission path so that the length ratio $L_1$ of the GI fiber 1 is 0.48.

Figure 23A:
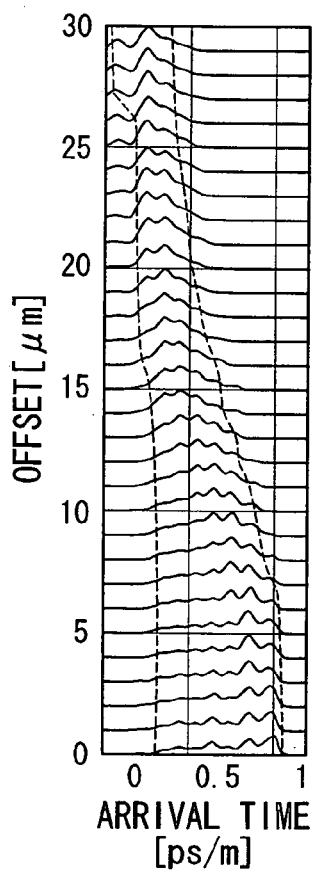
FIGS. 23(a), (b), and (c) are diagrams of DMD characteristics of GI fibers 1 and 2 and an optical transmission path according to Specific Example 1-5, respectively.
Figure 23B:
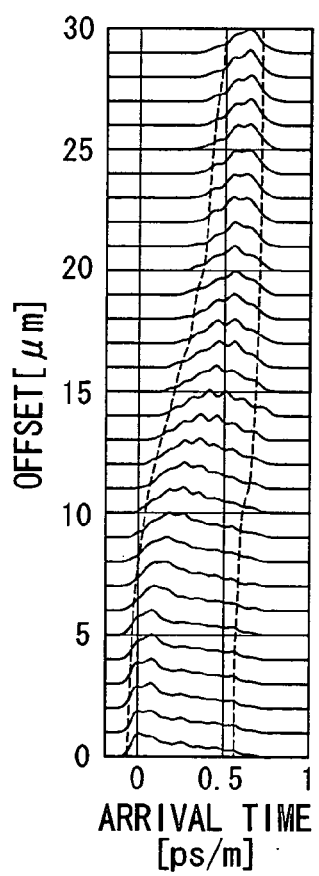
Figure 23C:
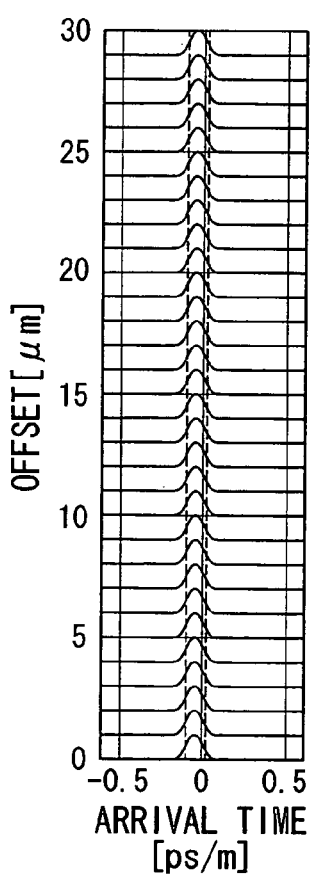

FIG. 23 is a diagram of DMD characteristics of Specific Example 1-5 calculated by simulation, FIG. 23(a) showing DMD characteristics of GI fiber 1, FIG. 23(b) showing those of GI fiber 2, and FIG. 23(c) showing those when GI fibers 1 and 2 were coupled with the above length ratio to construct an optical transmission path.

As shown in FIG. 23(c), the arrival times at the output end of signal light propagated in every mode can be synchronized by determining the length ratio that obtains the maximum band and coupling the GI fibers 1 and 2 at this length ratio.

Figure 24A:
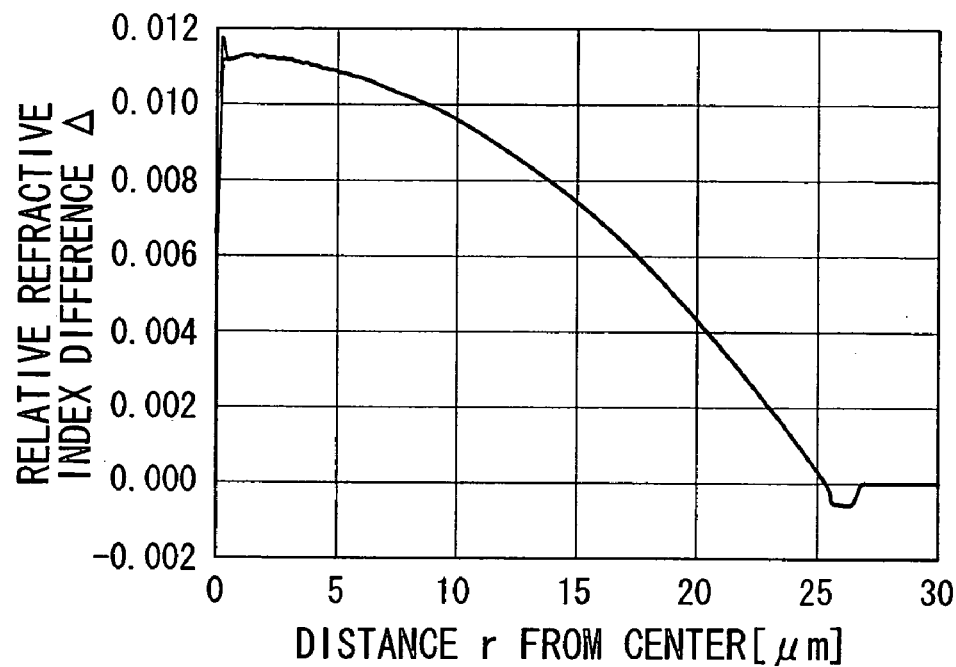
FIGS. 24(a) and (b) are diagrams of refractive index profile in GI fibers 1 and 2 according to Specific Example 1-6, respectively.
Figure 24B:
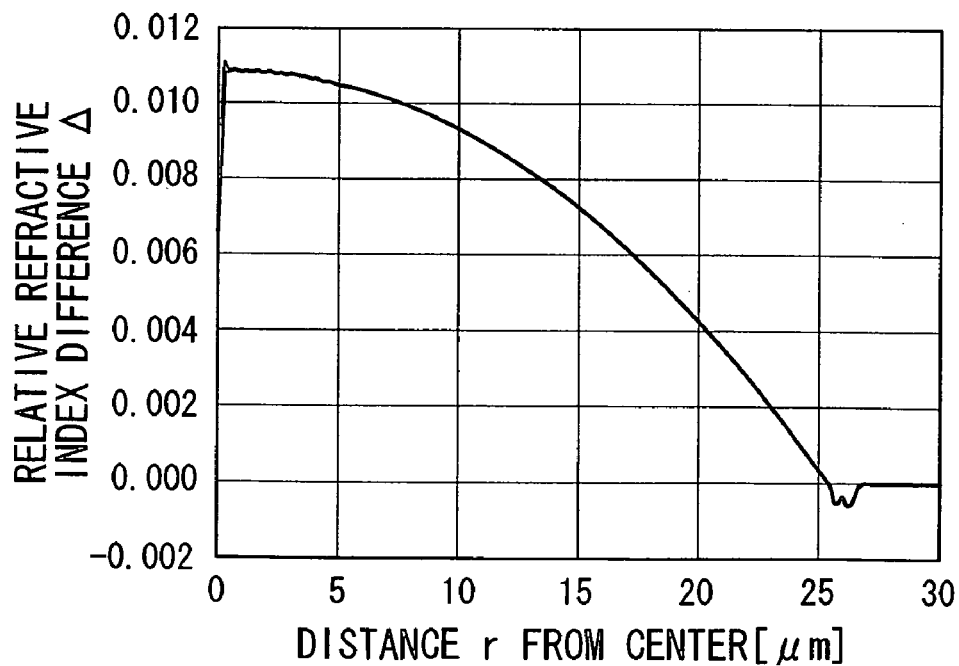

FIG. 24 is a diagram of measurements of the refractive index profiles of the GI fibers in Specific Example 1-6, FIG. 24(a) showing those of GI fiber 1, and FIG. 24(b) showing those of GI fiber 2. The relative refractive index difference $\Delta(r)$ is defined as follows:

$$\Delta(r) = \frac{n_1^2(r) - n_2^2}{2n_1^2(r)} \qquad (8)$$

where $n_1$ is the refractive index of the core, $n_2$ is the refractive index of the cladding, and r is the distance from the core center of the optical fiber.

Figure 25:
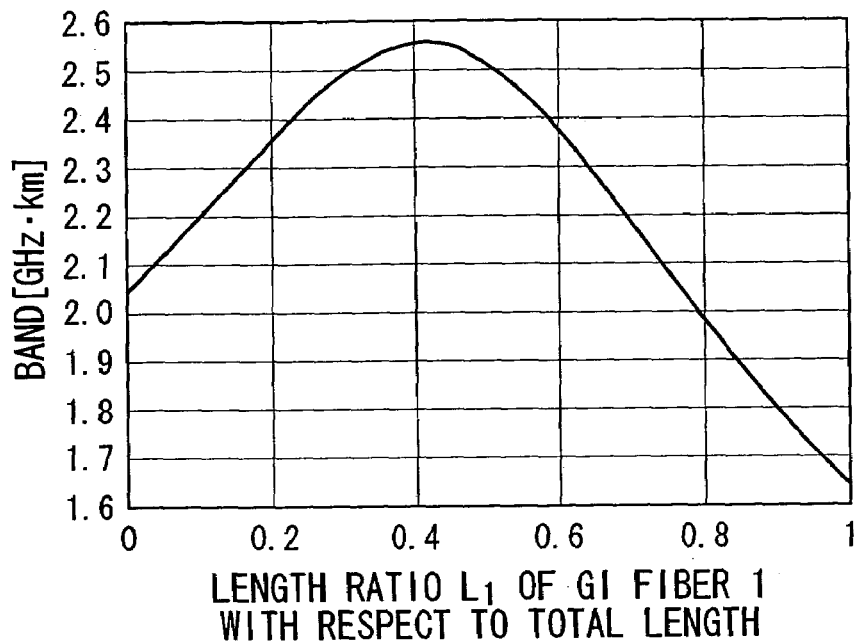
FIG. 25 is a diagram of the band of an optical transmission path according to Specific Example 1-6.
Figure 26:
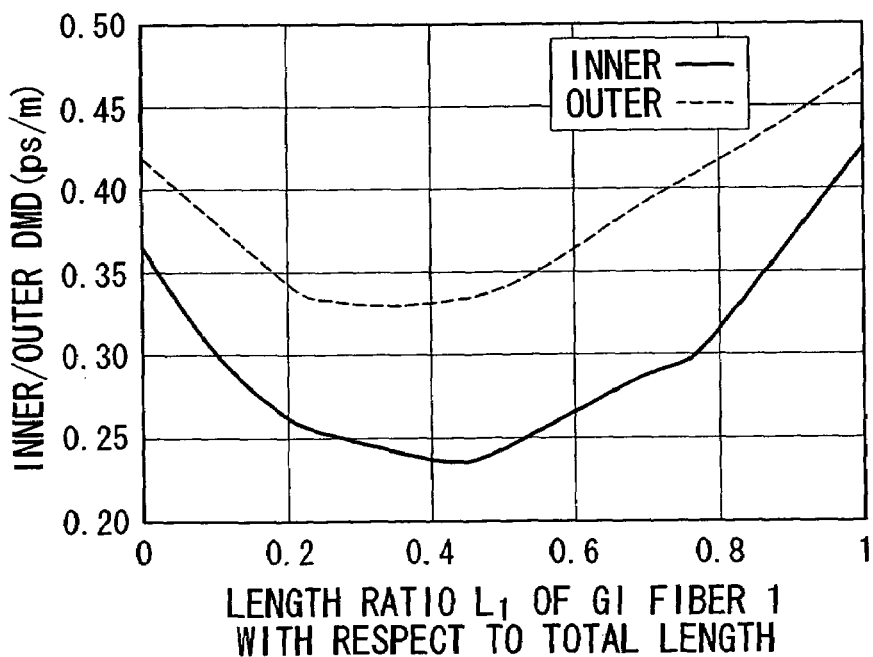
FIG. 26 is a diagram of inner/outer DMD characteristics of the optical transmission path according to Specific Example 1-6.

FIG. 25 is a diagram of bands at the OFL of an optical transmission path constructed by coupling GI fibers 1 and 2 at various length ratios using the above refractive index profile measurements, calculated by simulation and plotted against the length ratio $L_1$ of GI fiber 1. FIG. 26 plots inner/outer DMDs of the same optical transmission path against the length ratio $L_1$ of the GI fiber 1. In Specific Example 1-6, the length of the optical transmission path is 4 km. The wavelength of the signal light is 0.85 μm, the spectral full width at half maximum is 0.25 nm, the pulse full width at half maximum is 0.08 ns, and the optimum value $\alpha_0$ of the refractive index profile exponential parameter of GI fiber in this case is 2.04.

When the length ratio $L_1$ of GI fiber 1 is 0.43, the band of the optical transmission path reaches its maximum; in addition, the inner DMD and the outer DMD are both at their minimum and substantially match.

Figure 27A:
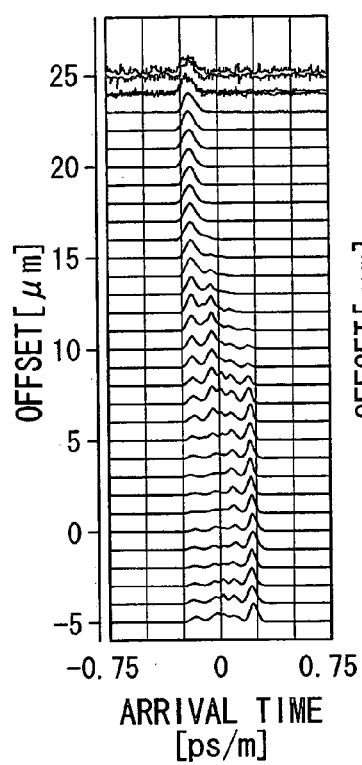
FIGS. 27(a), (b), and (c) are diagrams of DMD characteristics of GI fibers 1 and 2 and an optical transmission path according to Specific Example 1-6, respectively.
Figure 27B:
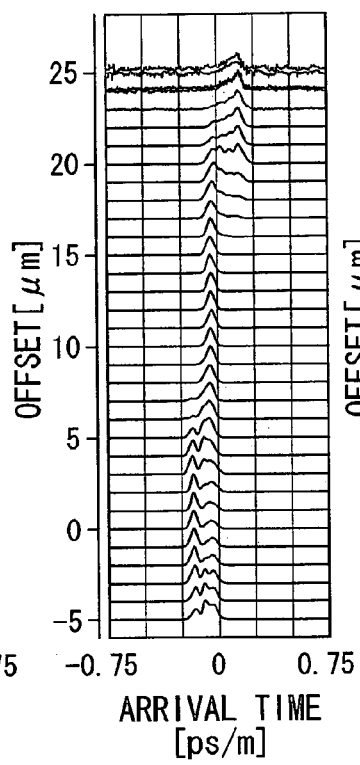
Figure 27C:
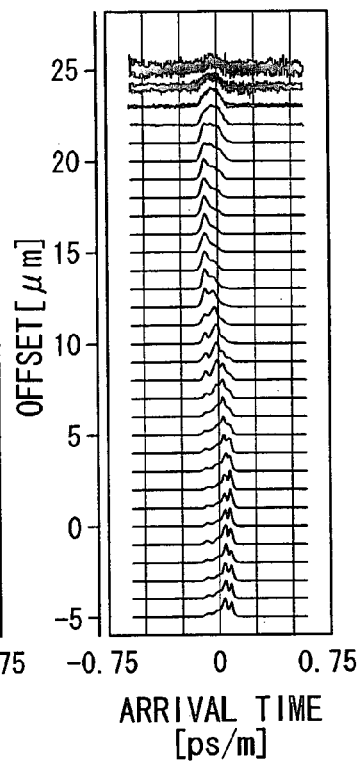

FIG. 27 is a diagram of actually measured DMD characteristics, FIG. 27(a) showing only those of a GI fiber 1 having a length of 2 km, and FIG. 27(b) showing only those of a GI fiber 2 having a length of 2.22 km. FIG. 27(c) shows DMD characteristics of an optical transmission path constructed by coupling the GI fibers 1 and 2 of FIGS. 27(a) and 27(b) respectively. In the optical transmission path of FIG. 27(c), the length ratio $L_1$ of the GI fiber 1 is 0.47, which is substantially similar to the length ratio $L_1$ of 0.43 of the GI fiber 1 that obtains the maximum transmission path band according to calculation by simulation.

As shown in FIG. 27(c), the arrival times at the output end of signal light propagated in every mode can be substantially synchronized.

The optimum length ratio for achieving an optical transmission path having a broad band can be calculated for a GI fiber with any refractive index profile in the same manner as above. By coupling the GI fibers together according to this length ratio, it is possible to construct an optical transmission path in which the arrival times at the output end of signal light propagated in every mode are synchronized. There is almost no modal dispersion due to deviation in arrival times caused by propagation modes, and a broad band can be obtained.

As described above, it is possible to realize an optical transmission path that has a broad band due to the synchronization of arrival times at the output end of signal light propagated in all propagation modes. There is no need to precisely control the refractive index profiles of the GI fibers, making it possible to use GI fibers that have already been manufactured. This enables GI fibers for use in the optical transmission path to be manufactured at good yield, and thereby reduces the cost of the transmission path. Since GI fibers having precisely controlled refractive index profiles are not required, a long-distance optical transmission path can be constructed easily.

It is also possible to calculate an optimum length ratio for constructing an optical transmission path having a broad band for a GI fiber of any given refractive index profile, and to use this optimum length ratio in forming the transmission path, enabling GI fibers that have already been manufactured to be used efficiently.

An optical transmission path having a broad band can be realized easily at low-cost, increasing the transmission rate of signal light.

Next, a second invention group will be explained in detail.

Firstly, the refractive index profile of a graded index optical fiber (hereinafter referred to as "GI fiber"), and the arrival times of signal light propagated through the GI fiber in all modes, will be explained.

Figure 28:
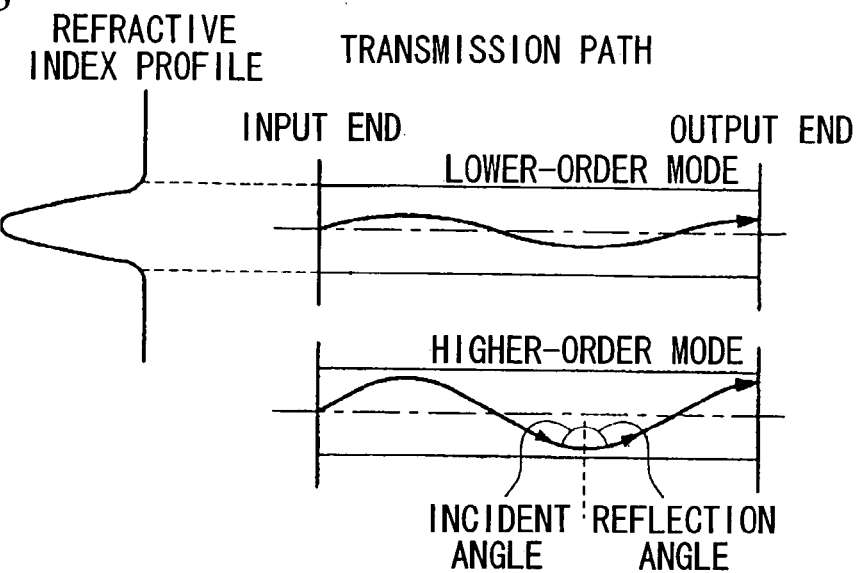
FIG. 28 is a schematic diagram of the refractive index profile of a GI fiber and propagation paths of each propagation mode.

FIG. 28 is a schematic diagram of the refractive index profile of a GI fiber, and paths of a plurality of modes in which the signal light propagates along the GI fiber.

In lower-order modes among propagation modes, the light propagates near to the core center and is strongest at the core center. In contrast, in higher-order modes, the distribution of light strength is at its maximum away from the core center so that the light is totally reflected in a large angle at the interface between the core and the cladding, whereby the propagation path is longer than in lower-order modes.

The refractive index profile of the GI fiber is shaped so that the refractive index reaches its maximum at the core center, and gradually decreases as the radius distance increases; consequently, although signal light in lower-order modes has a short propagation path, it propagates slowly. In contrast, while signal light in higher-order modes has a long transmission path, its refractive index is small around the outer periphery of the core and it propagates at high speed.

Accordingly, the arrival times at the output end of the light signals propagating in different modes can be synchronized by controlling the refractive index profile. This reduces modal dispersion to its theoretical minimum and achieves the maximum band of wavelengths.

When the refractive index profile differs from the one that obtains the maximum wavelength band, this refractive index difference causes a difference in the arrival times at the output end of signal light propagating in a higher-order mode and a lower-order mode, generating modal dispersion.

In an exemplary embodiment of the present invention, an optical fiber whose refractive index profile differs from the one that obtains the maximum wavelength band for signal light is deemed a compensated fiber. A mode dispersion-compensating fiber having the predetermined refractive index profile is coupled to the compensated fiber to obtain a broad band. The refractive index profile of the mode dispersion-compensating fiber will be explained below.

Figure 29:
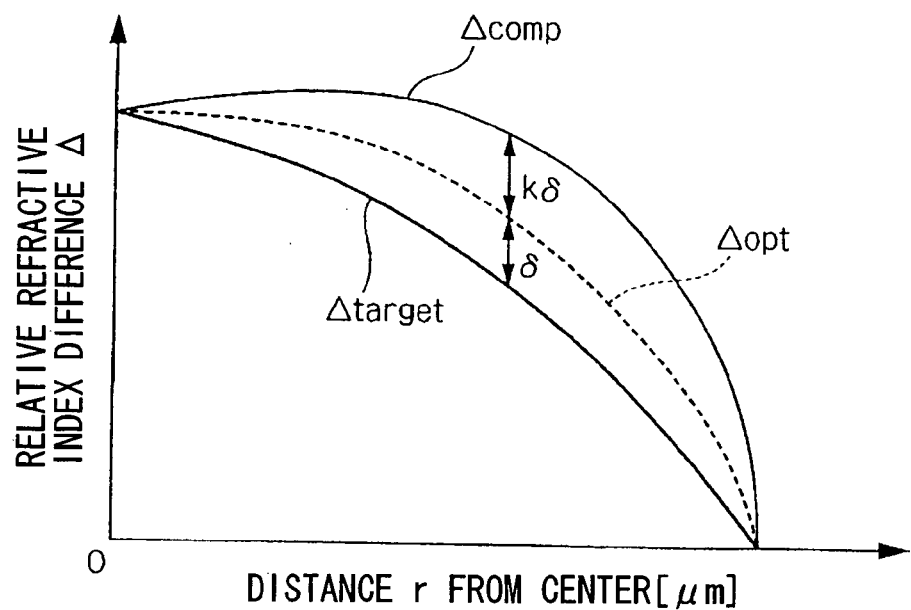
FIG. 29 is a schematic diagram of examples of refractive index profiles of a compensated fiber and a mode dispersion-compensating fiber, and an example of a refractive index profile that obtains the maximum band of wavelengths of the signal light used.

FIG. 29 is a schematic diagram of examples of refractive index profiles of a compensated fiber and a mode dispersion-compensating fiber, and a refractive index profile that obtains the maximum band of wavelengths of the signal light used. The relative refractive index difference at a distance r from the core center of the compensated fiber is here termed $\Delta_{target}(r)$, and the relative refractive index difference at a distance r from the core center of the mode dispersion-compensating fiber is termed $\Delta_{comp}(r)$. The relative refractive index difference at a distance r from the core center in the refractive index profile that obtains the maximum wavelength band is termed $\Delta_{opt}(r)$. The value for $\Delta_{opt}(r)$ is calculated from simulation.

As mentioned earlier, the difference δ between $\Delta_{target}(r)$ and $\Delta_{opt}(r)$ causes a difference in the arrival times of signal light propagated through the compensated fiber in a higher-order mode and a lower-order mode. The relative difference in the arrival times in a higher-order mode and a lower-order mode is substantially proportional to the difference δ.

An optical fiber having a sign of the difference between $\Delta_{comp}(r)$ and $\Delta_{opt}(r)$ that is the reverse of the sign of the difference between $\Delta_{target}(r)$ and $\Delta_{opt}(r)$, wherein $\Delta_{comp}(r)$ of the optical fiber has an absolute value that satisfies a proportional relationship, is used as the mode dispersion-compensating fiber. The relative difference between the arrival times of signal light propagated in a higher-order mode and a lower-order mode is thereby made proportional to the difference kδ between $\Delta_{comp}(r)$ and $\Delta_{opt}(r)$. Based on $\Delta_{target}(r)$ and $\Delta_{opt}(r)$, $\Delta_{comp}(r)$ is expressed by Equation (3) above The mode dispersion-compensating fiber and the compensated fiber are then coupled to constitute the optical transmission path shown in FIG. 30, the ratio $L_{comp}/L_{target}$ between the length $L_{comp}$ of the mode dispersion-compensating fiber and the length $L_{target}$ of the compensated fiber being 1/k.

Since the relative difference between the arrival times of signal light in a higher-order mode and a lower-order mode is proportional to the length of the optical fiber along which they propagate, the relative difference between the arrival times of signal light propagated along the compensated fiber in a higher-order mode and a lower-order mode can be compensated by the relative difference between the arrival times of signal light propagated along the mode dispersion-compensating fiber in a higher-order mode and a lower-order mode by coupling the mode dispersion-compensating fiber and the compensated fiber in an optical waveguide wherein $L_{comp}/L_{target}$ is 1/k.

The relative refractive index difference at a distance r from the core center throughout the entire optical transmission path becomes $\Delta_{opt}(r)$, thereby synchronizing the arrival times at the output end of the signal light propagated in all modes and obtaining a broad band.

The length L comp to be coupled can be shortened by determining a $\Delta_{comp}$ that obtains a large numerical constant k.

The above compensation principles will be explained more specifically using the refractive index profiles $\Delta_{target}(r)$, $\Delta_{opt}(r)$, and $\Delta_{comp}(r)$, shown in FIG. 29.

$\Delta_{target}(r)$ has a smaller refractive index around the outer periphery of the core than that of $\Delta_{opt}(r)$, so that signal light propagates through the compensated fiber faster in the higher-order modes, and arrives earlier at the output end. Consequently, the relative difference between the arrival times of signal light propagating along the compensated fiber in a higher-order mode and a lower-order mode is a minus value.

The absolute value of the relative difference between arrival times in a higher-order mode and a lower-order mode is proportional to the difference δ between $\Delta_{target}(r)$ and $\Delta_{opt}(r)$.

In contrast, $\Delta_{comp}(r)$ satisfies Equation (3) above, and has a larger refractive index around the outer periphery of the core than that of $\Delta_{opt}(r)$, so that signal light propagates through the compensated fiber more slowly in the higher-order modes, and arrives later at the output end. Consequently, the relative difference between the arrival times of signal light propagating along the compensated fiber in a higher-order mode and a lower-order mode is a plus value.

The absolute value of the relative difference between arrival times in a higher-order mode and a lower-order mode is proportional to the difference kδ between $\Delta_{comp}(r)$ and $\Delta_{opt}(r)$.

Since the relative difference between the arrival times in a higher-order mode and a lower-order mode is proportional to the length of the optical fiber, the mode dispersion-compensating fiber and the compensated fiber are coupled in an optical waveguide so that $L_{comp}/L_{target}$ is 1/k.

Thus, the minus relative difference between the arrival times of signal light propagated along the compensated fiber in a higher-order mode and a lower-order mode is almost completely compensated by the plus relative difference between the arrival times of signal light propagated along the mode dispersion-compensating fiber in a higher-order mode and a lower-order mode.

As described above, an exemplary embodiment of the present invention uses an optical fiber having the refractive index profile expressed by Equation (3) as the mode dispersion-compensating fiber. When the mode dispersion-compensating fiber is coupled to a compensated fiber in an optical transmission path, modal dispersion of the compensated fiber can be efficiently compensated by the mode dispersion-compensating fiber, achieving an optical transmission path with a broad band.

An optical LAN can be established by connecting a computer, related devices, and the like, to this type of optical transmission path. The broad band of the optical transmission path enables the transmission rate of the optical LAN to be increased. This enables an Ethernet capable of transmitting at 10 Gbit/s such as 10 GbE.

Exemplary embodiments of the present invention will be explained in greater detail using Specific Examples.

SPECIFIC EXAMPLE 2-1

Figure 31:
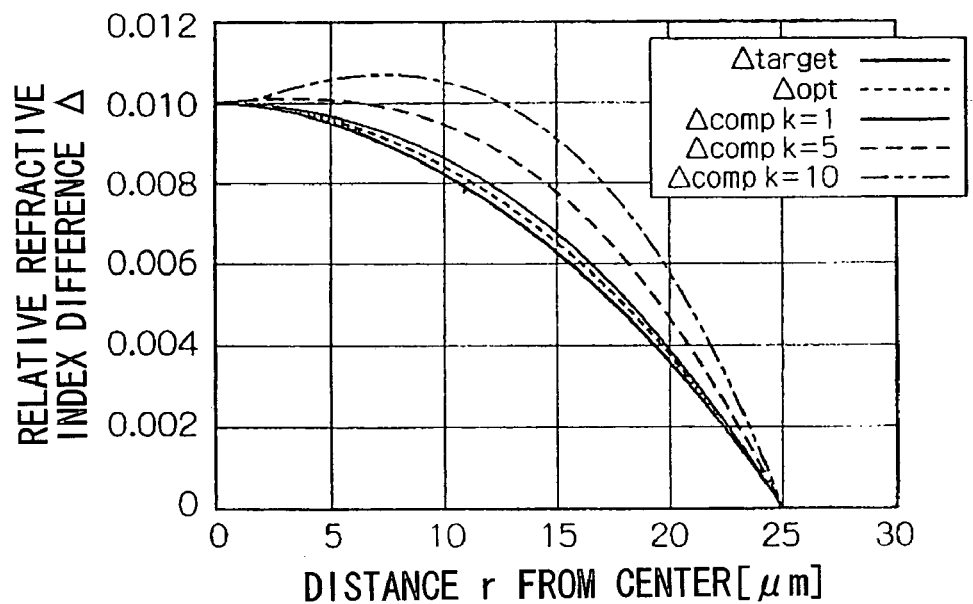
FIG. 31 is a diagram of refractive index profiles of a compensated fiber and a mode dispersion-compensating fiber, and a refractive index profile that obtains the maximum band of wavelengths of the signal light used, according to Specific Example 2-1.

FIG. 31 is a diagram of refractive index profiles of a compensated fiber and a mode dispersion-compensating fiber, and a refractive index profile that obtains the maximum band of wavelengths of the signal light used, according to Specific Example 2-1.

The refractive index $n_{target}(r)$ of the compensated fiber at a distance r from its core center is formed so as to approximate to Equation (9) below.

In Equation (9), n(r) is the refractive index at a distance r from the core center of the optical fiber, $n_1$ is a refractive index at the core center, $\Delta_1$ is a relative refractive index difference of the core center with respect to a cladding, a is a core radius, and α is a refractive index profile exponential parameter.

$$n(r) = \begin{cases} n_1\{1 - 2\Delta_1(r/a)^\alpha\}^{1/2} & (0 \leq r \leq a) \\ n_1\{1 - 2\Delta_1\}^{1/2} & (a < r) \end{cases} \quad (9)$$

The refractive index profile exponential parameter $\alpha_{target}$, obtained when $n_{target}(r)$ is approximated by Equation (9), is 1.90. The relative refractive index difference of the core center with respect to the cladding $\Delta_1$ is 0.01, and the core radius a is 25 μm.

The center wavelength of the signal light is 0.85 μm, the spectral full width at half maximum is 0.16 nm, and the pulse full width at half maximum is 0.09 ns. The $\Delta_{opt}(r)$ at signal light wavelength of 0.85 μm is that of the refractive index profile exponential parameter α of 2.04 in Equation (9).

The $\Delta_{comp}(r)$ is calculated by using the $\Delta_{target}$ and the $\Delta_{opt}$ shown in FIG. 31 in Equation (3). FIG. 31 represents a numerical constant k in Equation (3) of 1, 5, and 10. The relative refractive index difference $\Delta_{1comp}$ of the core center with respect to the cladding, and the core radius a, of the mode dispersion-compensating fiber are the same as those of the compensated fiber.

Subsequently, the optimum length ratio when coupling the mode dispersion-compensating fiber whose $\Delta_{comp}$ is calculated by the method described above to the compensated fiber is determined.

Figure 32:
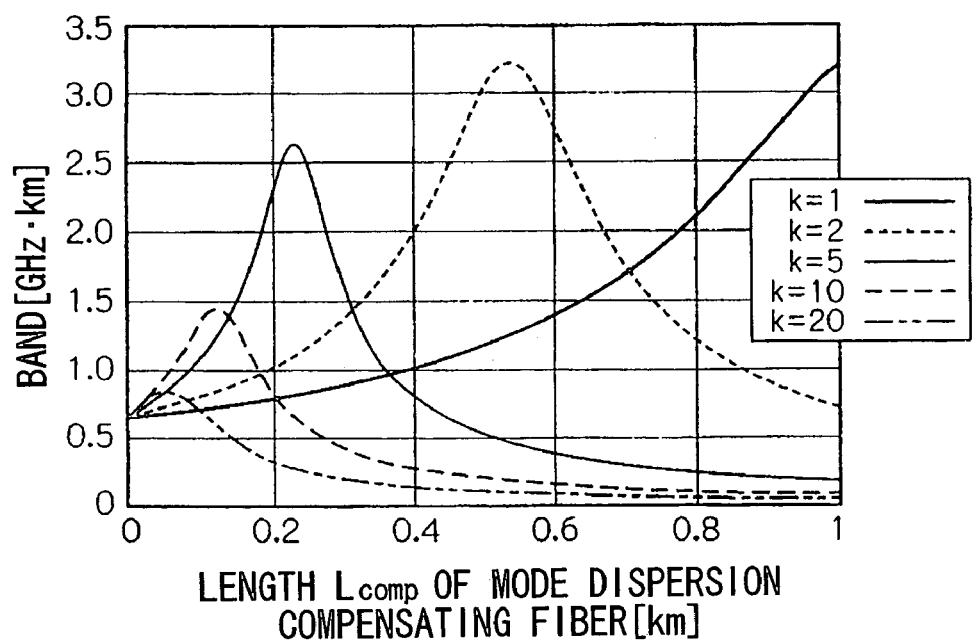
FIG. 32 is a diagram of the relationship between the band of the optical transmission path and the length of the mode dispersion-compensating fiber according to Specific Example 2-1.

FIG. 32 is a diagram of the bands the over-filled launch condition (hereinafter referred to as "OFL") of an optical transmission path constructed by coupling the mode dispersion-compensating fiber to the compensated fiber, the band being calculated by simulation and plotted against the length ratio $L_{comp}$ of the mode dispersion-compensating fiber. The length $L_{target}$ of the compensated fiber is 1 km.

Bearing in mind that the input signal light is transmitted uniformly in all possible propagation modes, an output signal light is determined from the refractive index profiles of the compensated fiber and the mode dispersion-compensating fiber, and is mapped into a frequency spectrum by a Fourier transformation. The bands of all OFL of the optical transmission path are then calculated as the frequency band at which the power of this frequency spectrum is less than half the power of zero frequency.

The band of the optical transmission path is an upper convex curve with respect to the length ratio $L_{comp}$ of the mode dispersion-compensating fiber, and has a maximum value. The reason for this is that the relative difference between the arrival times in a higher-order mode and a lower-order mode increases in proportion to the length of the optical fiber. The band of the optical transmission path reaches its maximum when the relative difference between arrival times in a higher-order mode and a lower-order mode on the compensated fiber matches the relative difference between arrival times in a higher-order mode and a lower-order mode on the mode dispersion-compensating fiber. The length ratio $L_{comp}/L_{target}$ in this case is approximately 1/k.

For example, when using a mode dispersion-compensating fiber whose $\Delta_{comp}$ has a numerical constant k of 2 in Equation (3), the optical transmission path has its maximum band when the length $L_{comp}$ of the mode dispersion-compensating fiber is 0.54 km, as shown in FIG. 32.

As described above, the length $L_{comp}$ of the mode dispersion-compensating fiber that achieves the maximum band is determined by plotting the band of an optical transmission path, formed by coupling the mode dispersion-compensating fiber to the compensated fiber using their respective refractive index profiles, and plotting the band against the length $L_{comp}$ of the mode dispersion-compensating fiber.

This method enables determination of a mode dispersion-compensating fiber length $L_{comp}$ that obtains the maximum band more accurately than the method of determining one that achieves a length ratio $L_{comp}/L_{target}$ of 1/k.

The mode dispersion-compensating fiber having a length of $L_{comp}$ is then coupled to the compensated fiber.

Figure 33A:
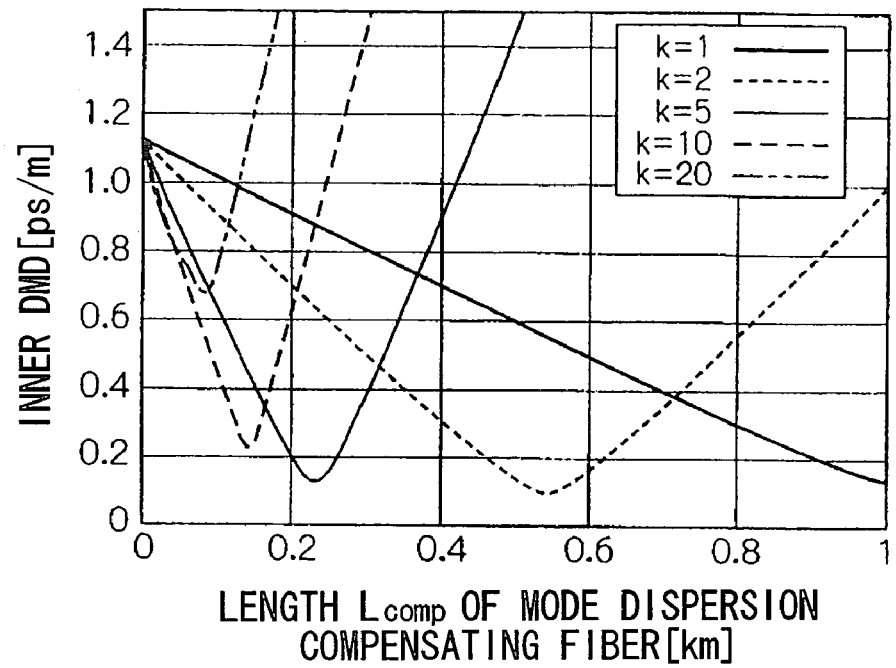
FIGS. 33(a) and (b) are diagrams of the relationship between inner/outer DMD of the optical transmission path and the length of the mode dispersion-compensating fiber according to Specific Example 2-1, respectively.
Figure 33B:
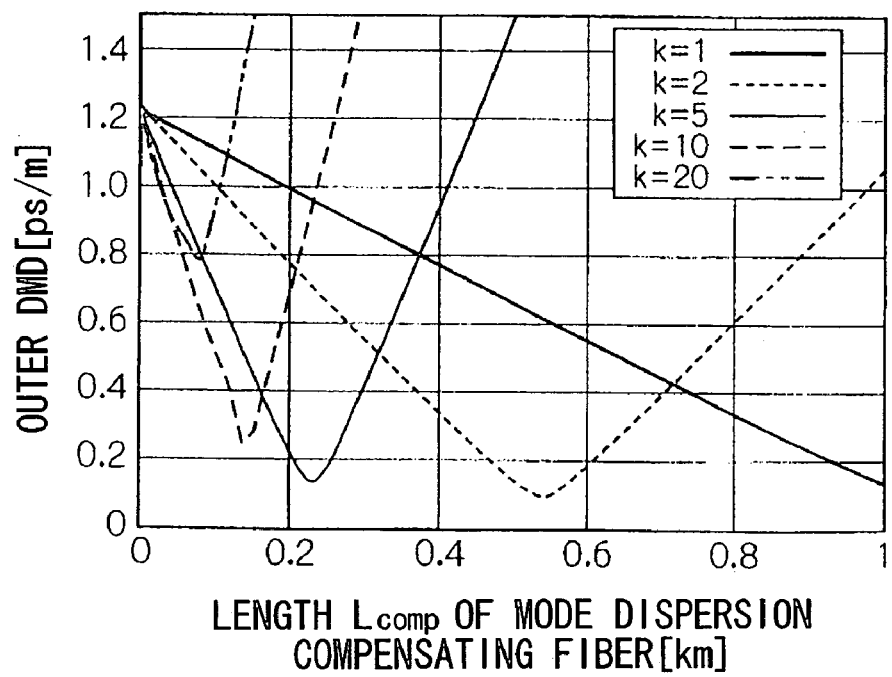

FIG. 33 plots (a) the inner DMD and (b) the DMD of an optical transmission path against the length $L_{comp}$ of the mode dispersion-compensating fiber. The inner DMD is the calculated difference between the slowest and fastest arrival times of signal light propagated in lower-order modes. The outer DMD is the calculated difference between the slowest and fastest arrival times of the light that propagates to the output end of signal light in all modes, including higher-order modes.

The calculations are made as follows. Firstly, a simulation is used to calculate the arrival time at the output end of signal light that is propagated in a specific mode by launching signal light incident into the fiber while offsetting the center of the incident light from the center of the fiber.

At a distance of 5 μm to 18 μm from the center of the signal light incident into the optical fiber to the core center (this distance is hereinafter referred to as "offset"), the difference between the slowest and fastest arrival times at the output end of signal light propagated in each mode is calculated, and the width of the input pulse is subtracted from the calculated value to obtain the inner DMD. The smaller the offset, the lower the order of the mode that the signal light follows. This fact enables the inner DMD to be used in determining whether the arrival times of light propagating in lower-order modes are synchronized.

At an offset of 0 μm to 23 μm, the difference between the slowest and fastest arrival times at the output end of signal light propagated in each mode is calculated, and the width of the input pulse is subtracted from the calculated value to obtain the outer DMD. The outer DMD can be used in determining whether the arrival times of light propagating in each transmission mode, including higher-order modes, are synchronized.

The inner DMD and the outer DMD are both at the minimum when the length $L_{comp}$ of the mode dispersion-compensating fiber obtains the maximum band of wavelengths for the optical transmission path, and the output end arrival times of signal light propagated in each mode are approximately synchronous.

FIG. 34 is a diagram of differential mode delay (DMD) characteristics of (a) a compensated fiber and (b) a transmission path respectively, calculated by simulation. The DMD characteristics are determined by simulation to calculate the waveform of light that propagates to the output end after launching it into the fiber while offsetting it from the core center.

The more the center of the incident signal light deviates from the core center, the higher the order of mode that the light propagates in. Accordingly, DMD characteristics are a plot of the intensity of light propagated in every mode against the relative difference in arrival times. A waveform with an offset of zero is signal light propagated in lower-order modes, the order of the mode increasing as the offset increases.

Figure 34A:
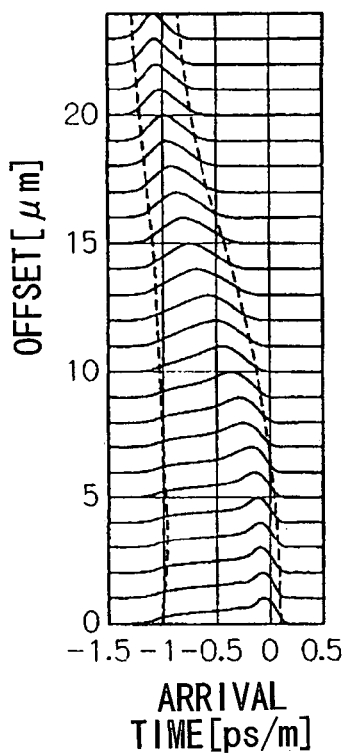
FIG. 34 is a diagram of DMD characteristics of (a) a compensated fiber and (b) an optical transmission path according to Specific Example 2-1.
Figure 34B:
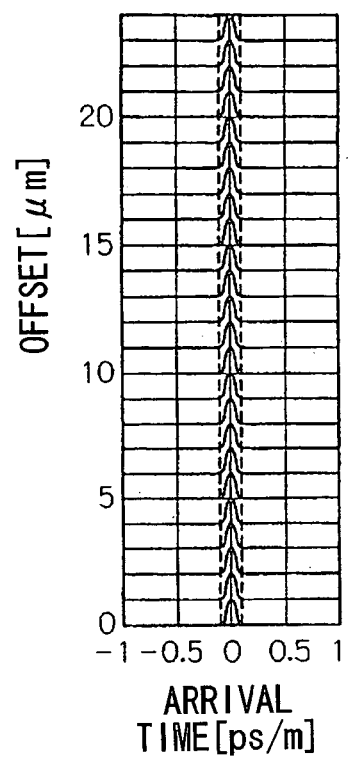

FIG. 34(a) shows DMD characteristics of the compensated fiber, and FIG. 34(b) shows DMD characteristics of an optical transmission path constructed by coupling 0.54 km of mode dispersion-compensating fiber having a refractive index profile of k=2 to 1 km of the compensated fiber.

As shown in FIG. 34(a), the higher the mode that the signal light propagates in along the compensated fiber, the slower its arrival at the output end, so that signals in different modes do not arrive at the same time. In contrast, as shown in FIG. 34(b), the arrival times of light in all modes can be synchronized by coupling a mode dispersion-compensating fiber whose $\Delta_{comp}(r)$ satisfies the above-mentioned Equation (3) to the compensated fiber, the length $L_{comp}$ of the mode dispersion-compensating fiber being one that obtain se maximum band of wavelengths for the optical transmission path.

Incidentally, while the numerical constant k in Equation (3) can take any value, in order to determine the $\Delta_{comp}(r)$ of the mode dispersion-compensating fiber that will efficiently compensate wavelength dispersion in the compensated fiber and obtain an optical transmission path having a broad band, the following method can also be used.

As shown in FIG. 32, the larger the numerical constant k in Equation (3) expressing $\Delta_{comp}(r)$, the shorter the mode dispersion-compensating fiber length $L_{comp}$ that obtains the maximum band of wavelengths for the optical transmission path, and the smaller the maximum value of the transmission path band.

Accordingly, $\Delta_{comp}(r)$ is calculated for various numerical constants k, and, for each mode dispersion-compensating fiber, the relationship between the band of the optical transmission path and the length $L_{comp}$ of the mode dispersion-compensating fiber is calculated by simulation as shown in FIG. 32. The length $L_{comp}$ of the mode dispersion-compensating fiber when the band of the optical transmission path is at its maximum is then calculated for each numerical constant k, and the maximum band is determined.

From the maximum values for the optical transmission path band, a range of numerical constants k of the mode dispersion-compensating fiber that obtain a required target value or a large value is determined. From this range, a maximum value for numerical constant k that gives the shortest mode dispersion-compensating fiber length $L_{comp}$ at maximum band is determined.

For example, in FIG. 32, while the maximum band value increases as the numerical constant k in Equation (3) expressing $\Delta_{comp}(r)$ increases, the maximum band value does not noticeably decrease when the numerical constant k is 2 or less, and remains approximately constant. Accordingly, an optical transmission path is constructed by coupling a mode dispersion-compensating fiber, whose $\Delta_{comp}(r)$ has a numerical constant k of 2 in Equation (3) and whose length $L_{comp}$ is 0.54 km, to the compensated fiber. This optical transmission path efficiently obtains the maximum band using the shortest length.

As described above, $\Delta_{comp}(r)$ is calculated for various numerical constants k, and the relationship between the band of an optical transmission path constructed by coupling the mode dispersion-compensating fiber and the length $L_{comp}$ of the mode dispersion-compensating fiber is determined. The length $L_{comp}$ of the mode dispersion-compensating fiber at maximum band is then calculated, and the maximum value of the band is determined. Optimum values for $\Delta_{comp}(r)$ and the length $L_{comp}$ should preferably be determined after considering the above length $L_{comp}$ and the maximum band value.

Thus, it becomes possible, for example, to determine a $\Delta_{comp}(r)$ and a length $L_{comp}$ that obtain the target band using the shortest length.

SPECIFIC EXAMPLE 2-2

An optical transmission path is constructed in the same way as Specific Example 2-1, using a mode dispersion-compensating fiber and a compensated fiber having the refractive index profile exponential parameters shown in Table 2. When the wavelength of the signal light is 0.85 µm, the optimum value $\alpha_0$ for refractive index profile is 2.04.

TABLE 2

| Specific Example | Wavelength of Signal Light (µm) | Refractive index profile exponential parameter α of Compensated Fiber | Numerical Constant k of Refractive index profile of Mode dispersion-compensating Fiber | Length $L_{comp}$ of Mode dispersion-compensating Fiber (km) |
|---|---|---|---|---|
| 2-2 | 0.85 | 1.90 | 2 | 0.162 |
| 2-3 | 0.85 | 2.00 | 10 | 0.11 |
| 2-4 | 0.85 | 2.03 | 20 | 0.05 |
| 2-5 | 0.85 | 2.05 | 20 | 0.05 |
| 2-6 | 0.85 | 2.10 | 10 | 0.09 |
| 2-7 | 0.85 | 2.20 | 2 | 0.47 |
| 2-8 | 0.85 | — | 10 | 0.11 |
| 2-9 | 1.3 | 1.84 | 5 | 0.22 |

Figure 35:
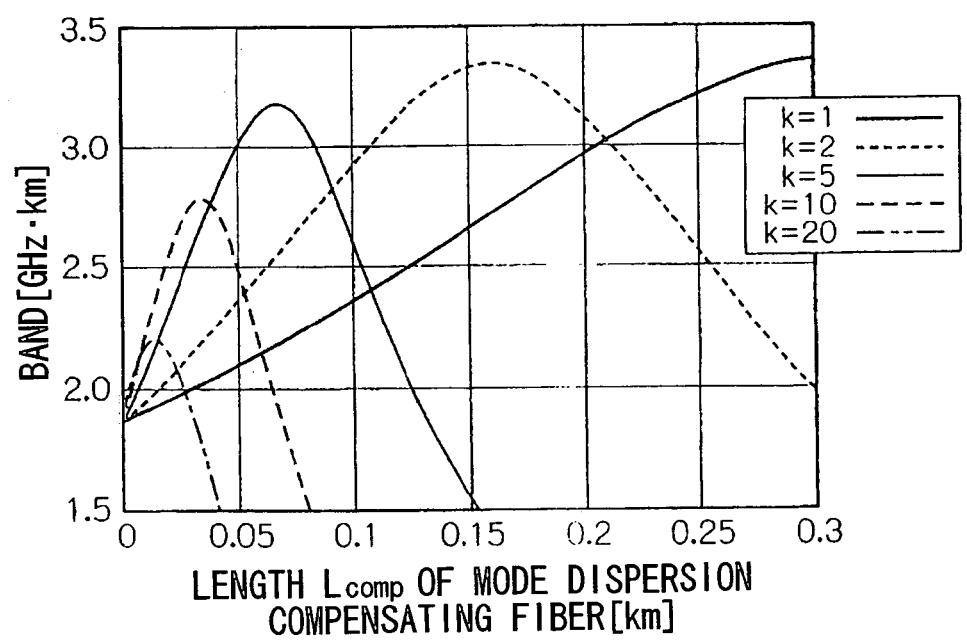
FIG. 35 is a diagram of the band of an optical transmission path according to Specific Example 2-2.

FIG. 35 is a diagram of bands in the OFL of an optical transmission path that uses the compensated fiber of Specific Example 2-2, calculated by simulation and plotted against mode dispersion-compensating fiber length $L_{comp}$.

Specific Example 2-2 differs from Specific Example 2-1 in that the length $L_{target}$ of the compensated fiber is 0.3 km. When a mode dispersion-compensating fiber whose refractive index profile has a numerical constant k of 2 in Equation (3) is coupled, maximum band is achieved when the length $L_{comp}$ of the mode dispersion-compensating fiber is 0.162 km.

The length ratio $L_{comp}/L_{target}$ of the mode dispersion-compensating fiber and the compensated fiber when the optical transmission path has its maximum band is 0.164/0.3=0.54, the same as that in Specific Example 2-1 shown in FIG. 32. The length ratio $L_{comp}/L_{target}$ of the mode dispersion-compensating fiber and the compensated fiber when the optical transmission path has its maximum band is the same even when the length $L_{target}$ of the compensated fiber changes.

Figure 36A:
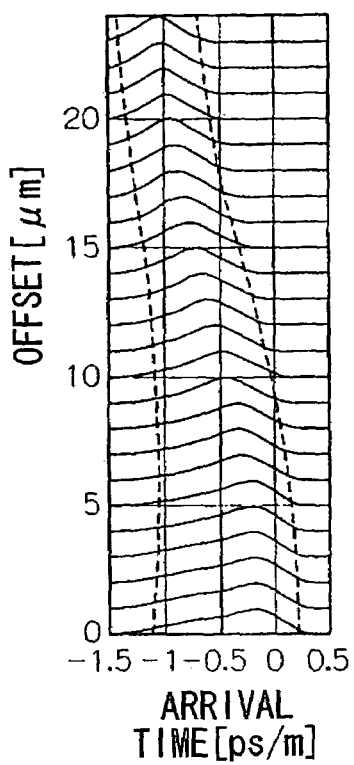
FIG. 36 is a diagram of DMD characteristics of (a) a compensated fiber and (b) an optical transmission path according to Specific Example 2-2.
Figure 36B:
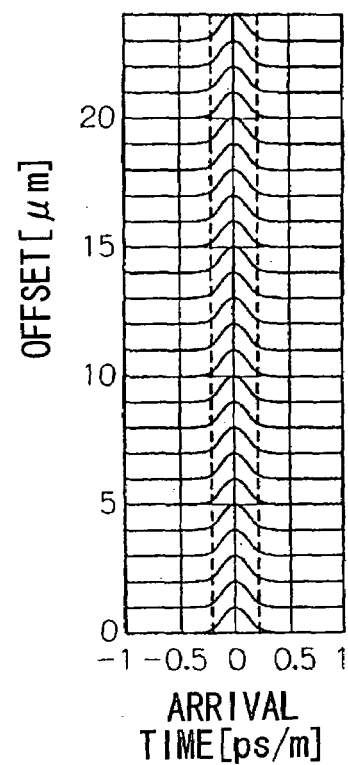

FIG. 36 is a diagram of DMD characteristics of a compensated fiber and an optical transmission path, calculated by simulation. FIG. 36(a) shows DMD characteristics of a compensated fiber, and FIG. 36(b), those of an optical transmission path constructed by coupling 0.164 km of a mode dispersion-compensating fiber, that has a refractive index profile in which k=2, to 0.3 km of the compensated fiber. As shown in FIG. 36(b), it can be seen that the arrival times of signal light propagated in all modes are synchronized.

Thus, it can be seen that, in a case where the compensated fiber is for example extended, more of the mode dispersion-compensating fiber should be coupled so that the length ratio $L_{comp}/L_{target}$ of the mode dispersion-compensating fiber and the compensated fiber stays the same.

SPECIFIC EXAMPLE 2-3

Figure 37:
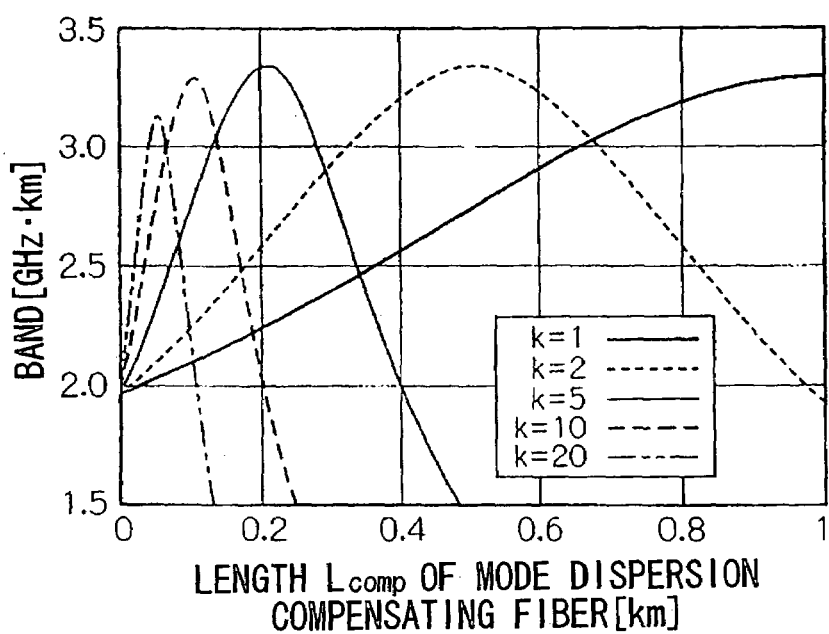
FIG. 37 is a diagram of the band of an optical transmission path according to Specific Example 2-3.

FIG. 37 is a diagram of bands in the OFL of an optical transmission path that uses the compensated fiber of Specific Example 2-3, calculated by simulation and plotted against mode dispersion-compensating fiber length $L_{comp}$. This differs from Specific Example 2-1 in that the refractive index profile exponential parameter $\alpha_{target}$ of the compensated fiber is 2.00.

Although the maximum band value tends to decrease as the numerical constant k in Equation (3) expressing $\Delta_{comp}(r)$ increases, it does not noticeably decrease when the numerical constant k is 10 or less, and remains approximately constant.

Accordingly, to compensate modal dispersion in the compensated fiber of Specific Example 2-3, the optical transmission path is constructed by coupling a mode dispersion-compensating fiber, whose $\Delta_{comp}(r)$ has a numerical constant k of 10 in Equation (3) and whose length $L_{comp}$ when the band reaches its maximum is 0.11 km, to the compensated fiber.

Figure 38A:
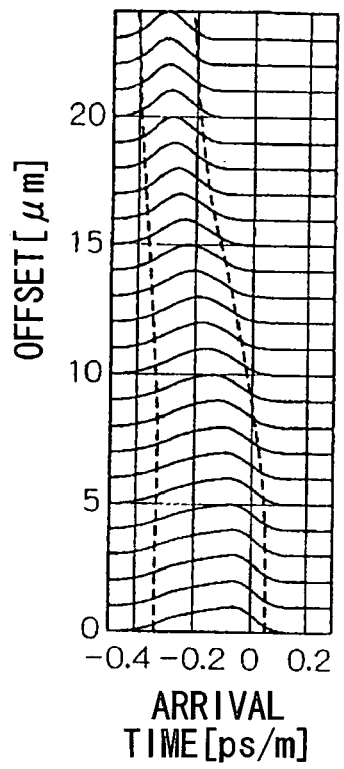
FIG. 38 is a diagram of DMD characteristics of (a) a compensated fiber and (b) an optical transmission path according to Specific Example 2-3.
Figure 38B:
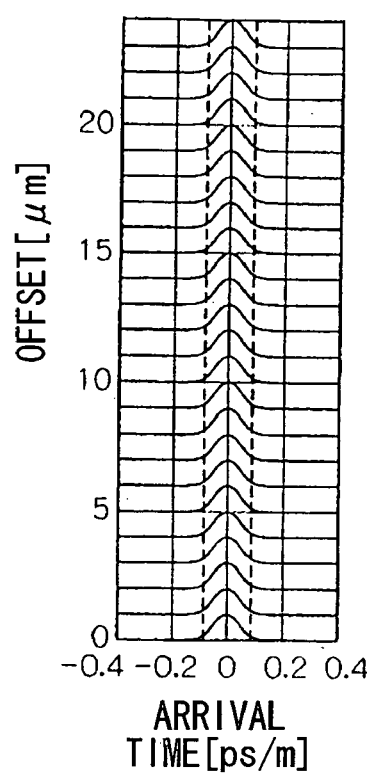

FIG. 38 is a diagram of DMD characteristics of a compensated fiber and an optical transmission path, calculated by simulation. FIG. 38(a) shows DMD characteristics of the compensated fiber, and FIG. 38(b), those of an optical transmission path constructed by coupling 0.11 km of the mode dispersion-compensating fiber, that has a refractive index profile in which k=10, to 1 km of the compensated fiber. As shown in FIG. 38(b), it can be seen that the arrival times of signal light propagated in all modes are synchronized.

Thus, an optical transmission path having a wide band can be efficiently obtained using the shortest length.

SPECIFIC EXAMPLE 2-4

Figure 39:
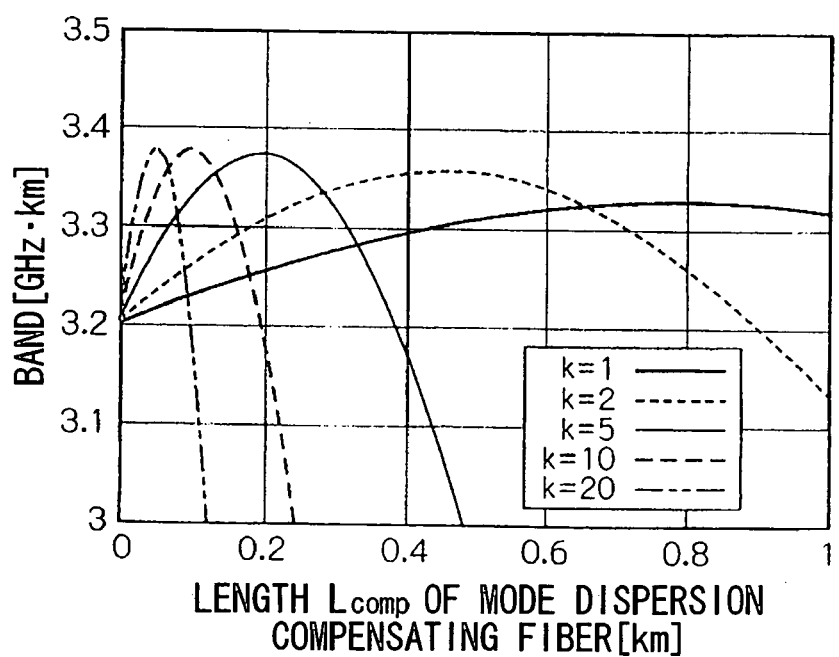
FIG. 39 is a diagram of the band of an optical transmission path according to Specific Example 2-4.

FIG. 39 is a diagram of bands in the OFL of an optical transmission path that uses the compensated fiber of Specific Example 2-4, calculated by simulation and plotted against mode dispersion-compensating fiber length $L_{comp}$. This example differs from Specific Example 2-1 in that the refractive index profile exponential parameter $\alpha_{target}$ of the compensated fiber is 2.03.

The maximum band value tends to increase as the numerical constant k in Equation (3) expressing $\Delta_{comp}(r)$ increases. The reason for this is that the relative refractive index difference of the compensated fiber is extremely close to the relative refractive index difference of the optical fiber that obtains the maximum band, so that the band of the optical transmission path is primarily affected by the length of the mode dispersion-compensating fiber.

Accordingly, to compensate modal dispersion in the compensated fiber of Specific Example 2-4, the optical transmission path is constructed by coupling a mode dispersion-compensating fiber, whose $\Delta_{comp}(r)$ has a numerical constant k of 20 in Equation (3) and whose length $L_{comp}$ when the band reaches its maximum is 0.05 km, to the compensated fiber.

Figure 40A:
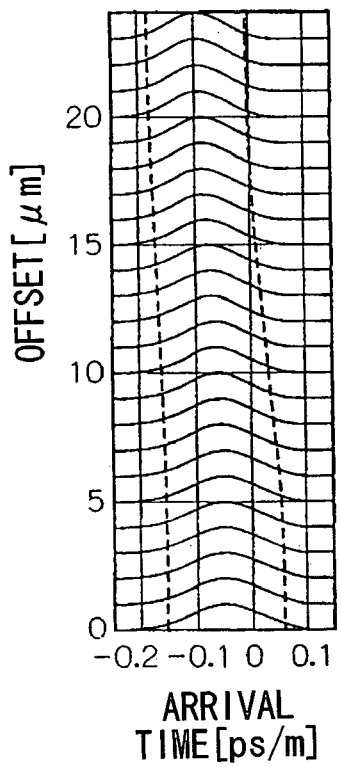
FIG. 40 is a diagram of DMD characteristics of (a) a compensated fiber and (b) an optical transmission path according to Specific Example 2-4.
Figure 40B:
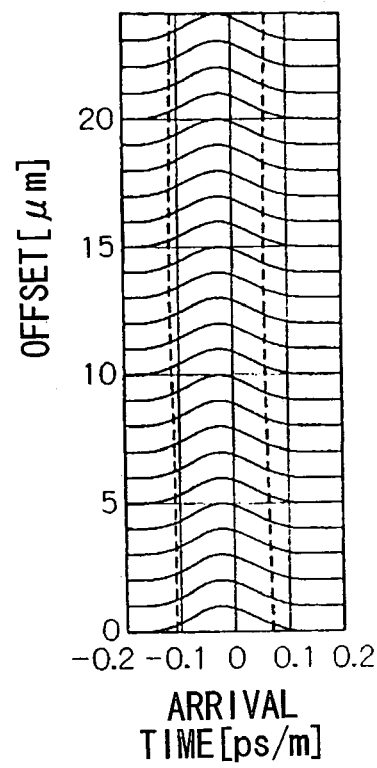

FIG. 40 is a diagram of DMD characteristics of a compensated fiber and an optical transmission path, calculated by simulation. FIG. 40(a) shows DMD characteristics of the compensated fiber, and FIG. 40(b), those of an optical transmission path constructed by coupling 0.05 km of the mode dispersion-compensating fiber, that has a refractive index profile in which k=20, to 1 km of the compensated fiber. As shown in FIG. 40(b), it can be seen that the arrival times of signal light propagated in all modes are synchronized.

Thus, an optical transmission path having a wide band can be efficiently obtained using the shortest length.

SPECIFIC EXAMPLE 2-5

Figure 41:
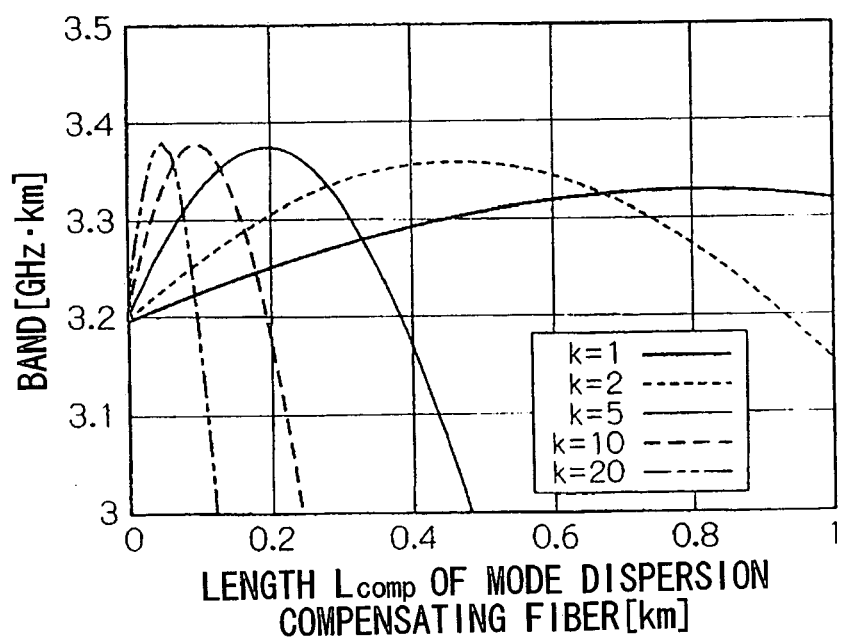
FIG. 41 is a diagram of the band of an optical transmission path according to Specific Example 2-5.

FIG. 41 is a diagram of bands in the OFL of an optical transmission path that uses the compensated fiber of Specific Example 2-5, calculated by simulation and plotted against mode dispersion-compensating fiber length $L_{comp}$. This example differs from Specific Example 2-1 in that the refractive index profile exponential parameter $\alpha_{target}$ of the compensated fiber is 2.05.

As in Specific Example 2-4, the maximum band value tends to increase as the numerical constant k in Equation (3) expressing $\Delta_{comp}(r)$ increases. As before, the reason is that the relative refractive index difference of the compensated fiber is extremely close to the relative refractive index difference of the optical fiber that obtains the maximum band, so that the band of the optical transmission path is primarily affected by the length of the mode dispersion-compensating fiber.

Accordingly, to compensate modal dispersion in the compensated fiber of Specific Example 2-5, the optical transmission path is constructed by coupling a mode dispersion-compensating fiber, whose $\Delta_{comp}(r)$ has a numerical constant k of 20 in Equation (3) and whose length $L_{comp}$ when the band reaches its maximum is 0.05 km, to the compensated fiber.

Figure 42A:
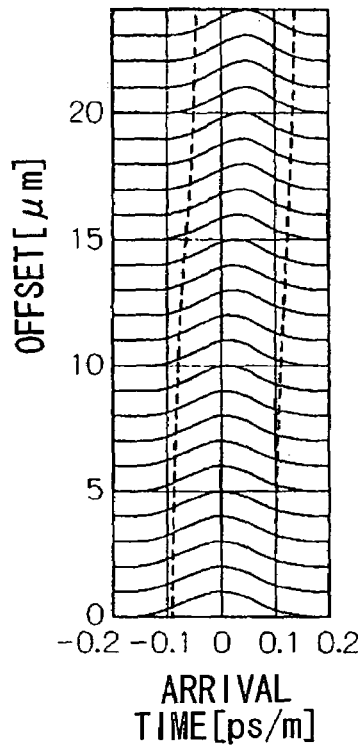
FIG. 42 is a diagram of DMD characteristics of (a) a compensated fiber and (b) an optical transmission path according to Specific Example 2-5.
Figure 42B:
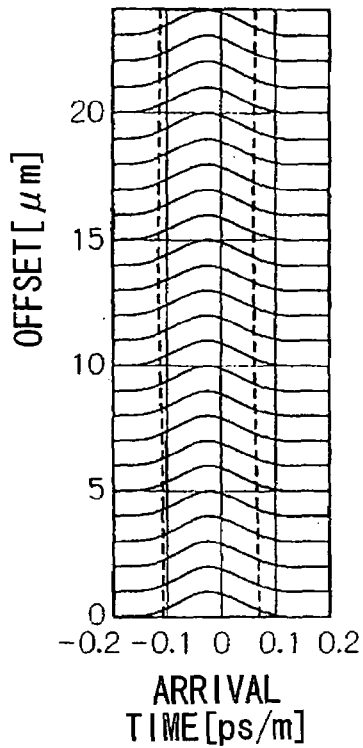

FIG. 42 is a diagram of DMD characteristics of a compensated fiber and an optical transmission path, calculated by simulation. FIG. 42(a) shows DMD characteristics of the compensated fiber, and FIG. 42(b), those of an optical transmission path constructed by coupling 0.05 km of the mode dispersion-compensating fiber, that has a refractive index profile in which k=20, to 1 km of the compensated fiber. As shown in FIG. 42(b), it can be seen that the arrival times of signal light propagated in all modes are synchronized.

Thus, an optical transmission path having a wide band can be efficiently obtained using the shortest length.

SPECIFIC EXAMPLE 2-6

Figure 43:
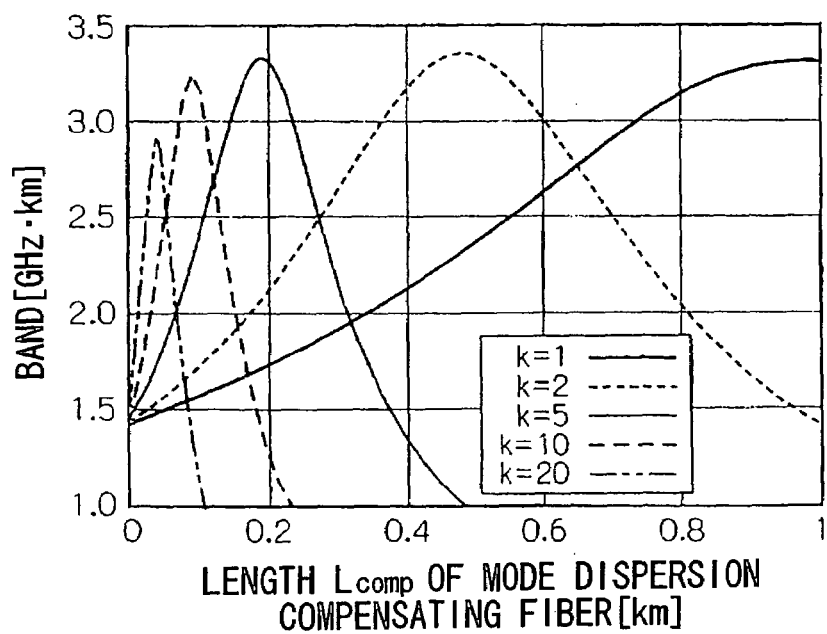
FIG. 43 is a diagram of the band of an optical transmission path according to Specific Example 2-6.

FIG. 43 is a diagram of bands in the OFL of an optical transmission path that uses the compensated fiber of Specific Example 2-6, calculated by simulation and plotted against mode dispersion-compensating fiber length $L_{comp}$. This example differs from Specific Example 2-1 in that the refractive index profile exponential parameter $\alpha_{target}$ of the compensated fiber is 2.10.

As in Specific Example 2-3, while the maximum band value decreases as the numerical constant k in Equation (3) expressing $\Delta_{comp}(r)$ increases, it does not noticeably decrease when the numerical constant k is 10 or less, and remains approximately constant.

Accordingly, to compensate modal dispersion in the compensated fiber of Specific Example 2-6, the optical transmission path is constructed by coupling a mode dispersion-compensating fiber, whose $\Delta_{comp}(r)$ has a numerical constant k of 10 in Equation (3) and whose length $L_{comp}$ when the band reaches its maximum is 0.09 km, to the compensated fiber.

Figure 44A:
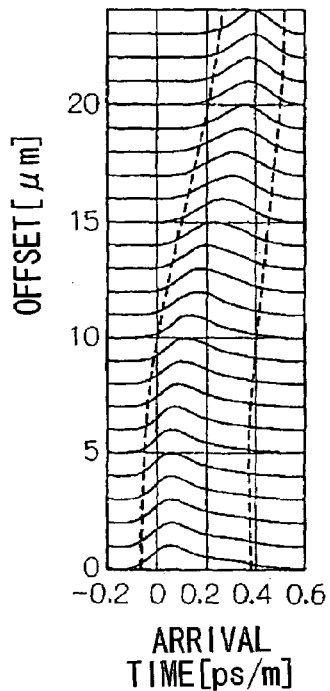
FIG. 44 is a diagram of DMD characteristics of (a) a compensated fiber and (b) an optical transmission path according to Specific Example 2-6.
Figure 44B:
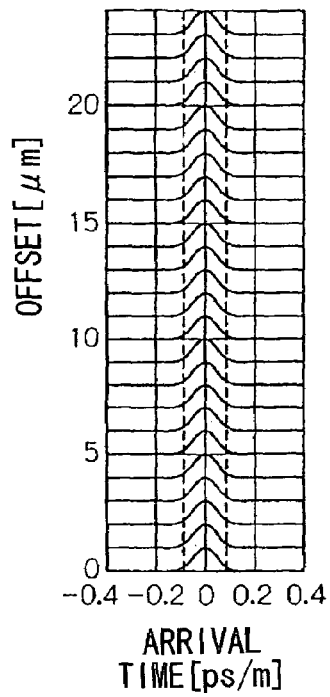

FIG. 44 is a diagram of DMD characteristics of a compensated fiber and an optical transmission path, calculated by simulation. FIG. 44(a) shows DMD characteristics of the compensated fiber, and FIG. 44(b), those of an optical transmission path constructed by coupling 0.09 km of the mode dispersion-compensating fiber, that has a refractive index profile in which k=10, to 1 km of the compensated fiber. As shown in FIG. 44(b), it can be seen that the arrival times of signal light propagated in all modes are synchronized.

Thus, an optical transmission path having a wide band can be efficiently obtained using the shortest length.

SPECIFIC EXAMPLE 2-7

Figure 45:
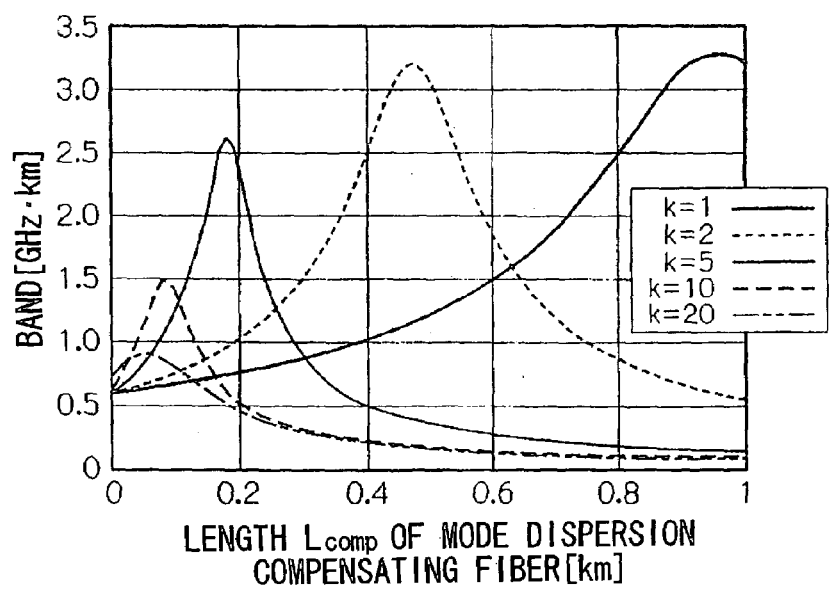
FIG. 45 is a diagram of the band of an optical transmission path according to Specific Example 2-7.

FIG. 45 is a diagram of bands in the OFL of an optical transmission path that uses the compensated fiber of Specific Example 2-7, calculated by simulation and plotted against mode dispersion-compensating fiber length $L_{comp}$. This example differs from Specific Example 2-1 in that the refractive index profile exponential parameter $\alpha_{target}$ of the compensated fiber is 2.20.

As in Specific Example 2-2, while the maximum band value decreases as the numerical constant k in Equation (3) expressing $\Delta_{comp}(r)$ increases, it does not noticeably decrease when the numerical constant k is 2 or less, and remains approximately constant.

Accordingly, to compensate modal dispersion in the compensated fiber of Specific Example 2-7, the optical transmission path is constructed by coupling a mode dispersion-compensating fiber, whose $\Delta_{comp}(r)$ has a numerical constant k of 2 in Equation (3) and whose length $L_{comp}$ when the band reaches its maximum is 0.47 km, to the compensated fiber.

FIG. 46 is a diagram of DMD characteristics of a compensated fiber and an optical transmission path, calculated by simulation. FIG. 46(a) shows DMD characteristics of the compensated fiber, and FIG. 46(b), those of an optical transmission path constructed by coupling 0.47 km of the mode dispersion-compensating fiber, that has a refractive index profile in which k=2, to 1 km of the compensated fiber. As shown in FIG. 46(b), it can be seen that the arrival times of signal light propagated in all modes are synchronized.

Thus, an optical transmission path having a wide band can be efficiently obtained using the shortest length.

SPECIFIC EXAMPLE 2-8

Specific Example 2-8 uses an optical fiber that was already manufactured as the compensated fiber, an optical transmission path being formed by coupling a mode dispersion-compensating fiber to the compensated fiber.

FIG. 47 is a diagram of refractive index profiles of the mode dispersion-compensating fiber and the compensated fiber that was already manufactured in Specific Example 2-8, and a refractive index profile that obtains the maximum band of wavelengths of the signal light used. The refractive index profile of the compensated fiber is obtained by smoothing of measurements.

Figure 48:
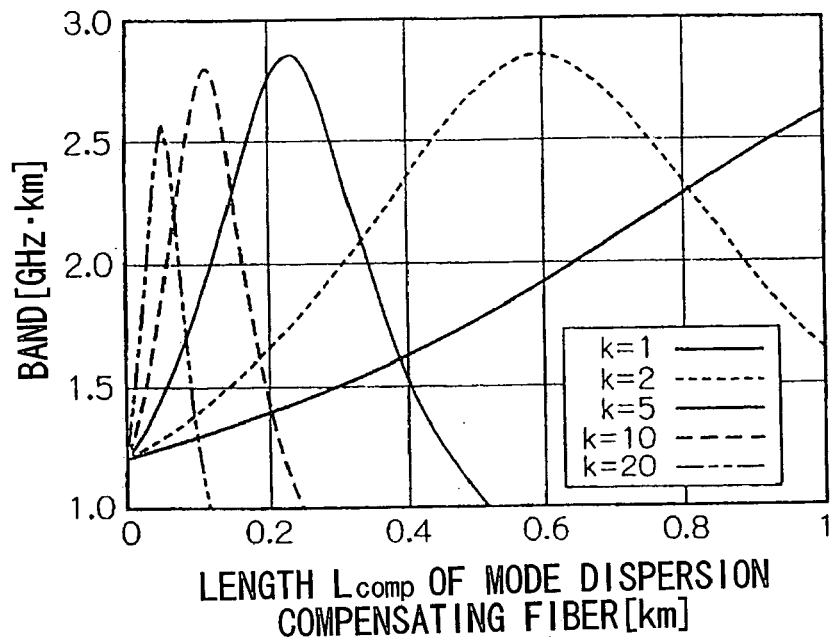
FIG. 48 is a diagram of the band of an optical transmission path according to Specific Example 2-8.

FIG. 48 is a diagram of the OFL band of an optical transmission path that uses the compensated fiber of Specific Example 2-8, calculated by simulation and plotted against the mode dispersion-compensating fiber length $L_{comp}$.

As in Specific Example 2-3, while the maximum band value decreases as the numerical constant k in Equation (3) expressing $\Delta_{comp}(r)$ increases, it does not noticeably decrease when the numerical constant k is 10 or less, and remains approximately constant.

Accordingly, to compensate modal dispersion in the compensated fiber of Specific Example 2-8, the optical transmission path is constructed by coupling a mode dispersion-compensating fiber, whose $\Delta_{comp}(r)$ has a numerical constant k of 10 in Equation (3) and whose length $L_{comp}$ when the band reaches its maximum is 0.11 km, to the compensated fiber.

Figure 49A:
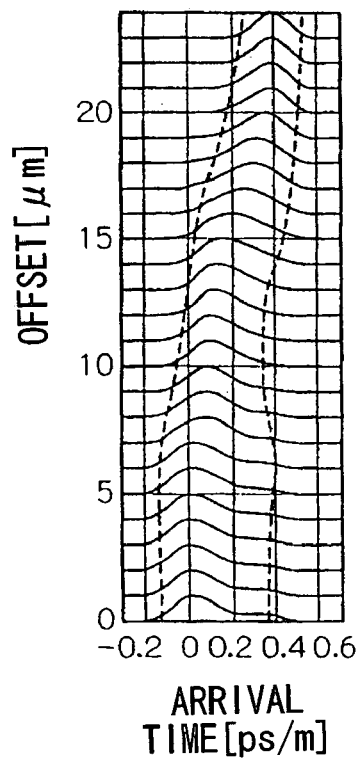
FIG. 49 is a diagram of DMD characteristics of (a) a compensated fiber and (b) an optical transmission path according to Specific Example 2-8.
Figure 49B:
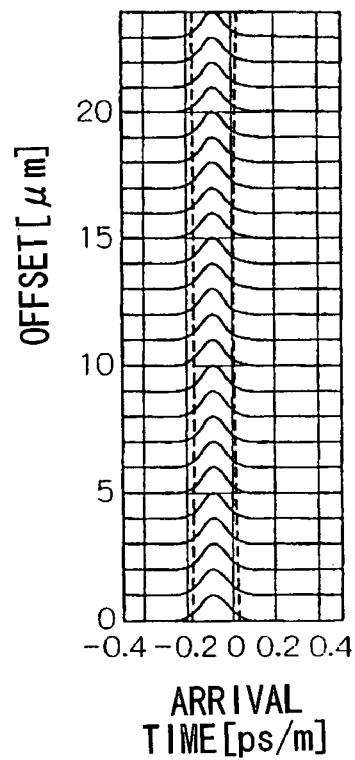

FIG. 49 is a diagram of DMD characteristics of a compensated fiber and an optical transmission path, calculated by simulation. FIG. 49(a) shows DMD characteristics of the compensated fiber, and FIG. 49(b) shows DMD characteristics of an optical transmission path constructed by coupling 0.11 km of the mode dispersion-compensating fiber, that has a refractive index profile in which k=10, to 1 km of the compensated fiber. As shown in FIG. 49(b), it can be seen that the arrival times of signal light propagated in all modes are synchronized.

Thus, an optical transmission path having a wide band can be efficiently obtained using the shortest length.

SPECIFIC EXAMPLE 2-9

Specific Example 2-9 uses signal light having a center wavelength of 1.3 μm, a spectral full width at half maximum of 1.0 nm, and a pulse full width at half maximum of 0.05 ns. The optical fiber that obtains the maximum band for signal light wavelength of 1.3 μm has a refractive index profile exponential parameter $\alpha_{opt}$ of 1.94. This example differs from Specific Example 2-1 in that the refractive index profile exponential parameter $\alpha_{target}$ of the compensated fiber is 1.84.

Figure 50:
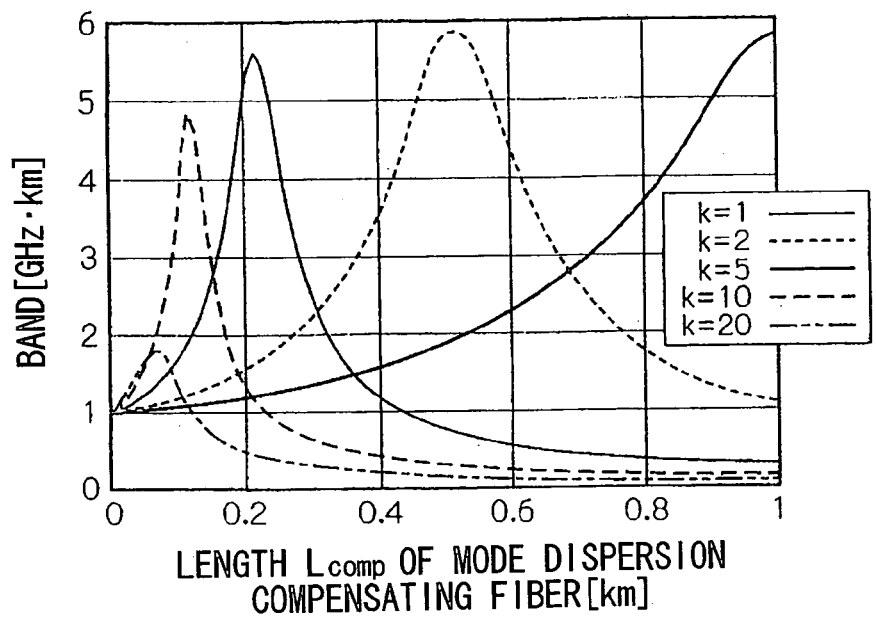
FIG. 50 is a diagram of the band of an optical transmission path according to Specific Example 2-9.

FIG. 50 is a diagram of the OFL band of an optical transmission path that uses the compensated fiber of Specific Example 2-9, calculated by simulation and plotted against the mode dispersion-compensating fiber length $L_{comp}$.

While the maximum band value decreases as the numerical constant k in Equation (3) expressing $\Delta_{comp}(r)$ increases, it does not noticeably decrease when the numerical constant k is 5 or less, and remains approximately constant.

Accordingly, to compensate modal dispersion in the compensated fiber of Specific Example 2-9, the optical transmission path is constructed by coupling a mode dispersion-compensating fiber, whose $\Delta_{comp}(r)$ has a numerical constant k of 5 in Equation (3) and whose length $L_{comp}$ when the band reaches its maximum is 0.22 km, to the compensated fiber.

Figure 51A:
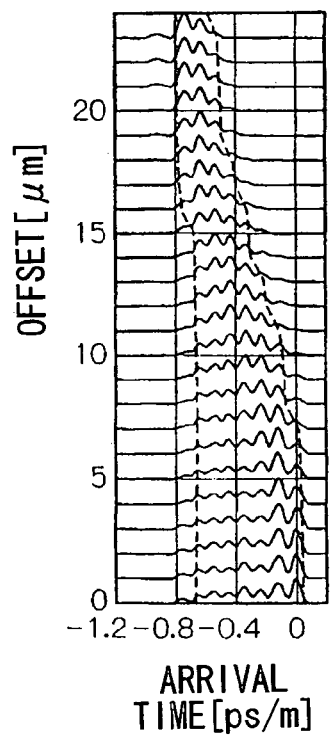
FIG. 51 is a diagram of DMD characteristics of (a) a compensated fiber and (b) an optical transmission path according to Specific Example 2-9.
Figure 51B:
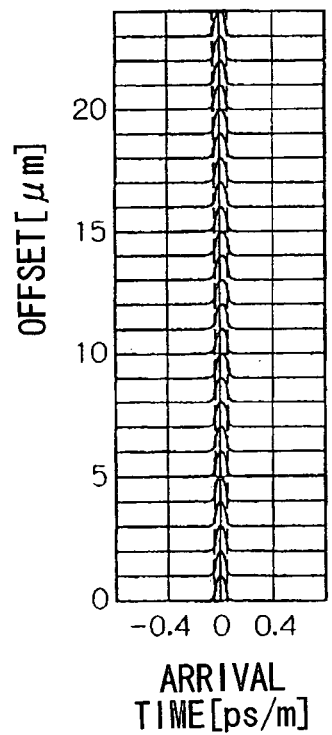

FIG. 51 is a diagram of DMD characteristics of a compensated fiber and an optical transmission path, calculated by simulation. FIG. 51(a) shows DMD characteristics of the compensated fiber, and FIG. 51(b) shows DMD characteristics of an optical transmission path constructed by coupling 0.22 km of the mode dispersion-compensating fiber, that has a refractive index profile in which k=5, to 1 km of the compensated fiber. As shown in FIG. 51(b), it can be seen that the arrival times of signal light propagated in all modes are synchronized.

Thus, an optical transmission path having a wide band can be efficiently obtained using the shortest length.

As shown in the specific examples, by coupling the mode dispersion-compensating fiber to the compensated fiber, modal dispersion in the compensated fiber can be efficiently and precisely compensated, achieving an optical transmission path that propagates a broad band of signal light, particularly signals having a center wavelength of 0.85 μm or 1.3 μm.

Even when the compensated fiber is one whose $\Delta_{target}(r)$ cannot precisely be approximated with Equation (9), modal dispersion of the compensated fiber can be compensated in the same way as in this embodiment by using a mode dispersion-compensating fiber whose $\Delta_{comp}(r)$ is expressed by Equation (3).

As described above, by using a mode dispersion-compensating fiber whose $\Delta_{comp}(r)$ is expressed by Equation (3), modal dispersion in the compensated fiber can be efficiently compensated, and an optical transmission path having a broad band can be realized. This optical transmission path can be used in realizing an optical LAN that has a broad band and can handle high-speed communication.

Subsequently, a third invention group will be explained in detail.

In this invention group, an optical fiber that has a different refractive index profile to the refractive index profile that obtains the maximum band of signal light wavelengths is used as the compensated fiber, and a mode dispersion-compensating fiber is coupled to the compensated fiber at a predetermined length ratio, thereby compensating modal dispersion in the compensated fiber and obtaining a broad band. The length ratio for coupling the compensated fiber and the mode dispersion-compensating fiber will be explained below.

FIG. 29 is a schematic diagram of examples of refractive index profiles of a compensated fiber and a mode dispersion-compensating fiber, and a refractive index profile that obtains the maximum band of wavelengths of the signal light used. The relative refractive index difference at a distance r from the core center of the compensated fiber is here termed $\Delta_{target}(r)$, and the relative refractive index difference at a distance r from the core center of the mode dispersion-compensating fiber is termed $\Delta_{comp}(r)$. The relative refractive index difference at a distance r from the core center in the refractive index profile that obtains the maximum wavelength band is termed $\Delta_{opt}(r)$. The value for $\Delta_{opt}(r)$ is calculated from simulation.

As mentioned earlier, the difference between $\Delta_{target}(r)$ and $\Delta_{opt}(r)$ causes a difference in the arrival times of signal light propagated through the compensated fiber in a higher-order mode and a lower-order mode. The relative difference in the arrival times in a higher-order mode and a lower-order mode is substantially proportional to the difference between $\Delta_{target}(r)$ and $\Delta_{opt}(r)$.

Accordingly, an optical fiber whose sign of the difference between $\Delta_{comp}(r)$ and $\Delta_{opt}(r)$ is the reverse of the sign of the difference between $\Delta_{target}(r)$ and $\Delta_{opt}(r)$ is used as the mode dispersion-compensating fiber. The sign of the relative difference between the arrival times of signal light propagated through the mode dispersion-compensating fiber in a higher-order mode and a lower-order mode is thereby made the reverse of the sign of the relative difference between the arrival times of signal light propagated through the compensated fiber in a higher-order mode and a lower-order mode.

Figure 30:
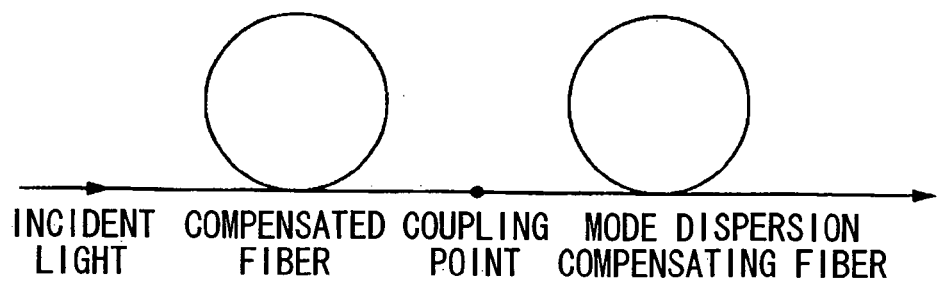
FIG. 30 is a schematic diagram of an example of an optical transmission path of an exemplary embodiment of the present invention.

As shown in FIG. 30, the mode dispersion-compensating fiber and the compensated fiber are coupled to construct an optical transmission path, the ratio $L_{comp}/L_{target}$ between the length $L_{comp}$ of the mode dispersion-compensating fiber and the length $L_{target}$ of the compensated fiber being one that satisfies Equation (10) below.

In Equation (10), $a_{comp}$ is a core radius of the mode dispersion-compensating fiber, and $a_{target}$ is the core radius of the compensated fiber.

$$L_{comp}/L_{target} = \frac{\int_0^{a_{target}} \{\Delta_{target}(r) - \Delta_{opt}(r)\}dr}{\int_0^{a_{comp}} \{\Delta_{opt}(r) - \Delta_{comp}(r)\}dr} \quad (10)$$

The relative difference between arrival times in a higher-order mode and a lower-order mode is proportional to the length of the optical fiber that the signal light propagates along. It follows that the relative difference between arrival times in a higher-order mode and a lower-order mode is proportional to the product of the difference between the relative refractive index profile at a distance r from the core center of the optical fiber and $\Delta_{opt}(r)$, and the length of the optical fiber.

Therefore, when an optical waveguide is constructed by coupling the mode dispersion-compensating fiber to the compensated fiber with a length ratio $L_{comp}/L_{target}$ that satisfies Equation (10), the absolute value of the relative difference in arrival times of signal light propagated through the compensated fiber in a higher-order mode and a lower-order mode matches the absolute value of the relative difference in arrival times of light propagated through the mode dispersion-compensating fiber in a higher-order mode and a lower-order mode, thereby compensating modal dispersion in the compensated fiber and achieving a broad band.

The relative refractive index profile at a distance r from the core center of the entire optical transmission path becomes $\Delta_{opt}(r)$, the arrival times at the output end of signal light propagated in all modes are approximately synchronous, and a broad band is obtained.

When the refractive index profile n(r) at a distance r from the core center of the compensated fiber and the mode dispersion-compensating fiber is approximated by Equation (11) below, Equation (10) can be modified as follows.

In Equation (11), n(r) is the refractive index in the core radial direction at a distance r from the core center of the optical fiber, $n_1$ is a refractive index at the core center, $\Delta_1$ is a relative refractive index difference of the core center with respect to a cladding, a is a core radius, and $\alpha$ is a refractive index profile exponential parameter.

$$n(r) = \begin{cases} n_1\{1 - 2\Delta_1(r/a)^\alpha\}^{1/2} & (0 \leq r \leq a) \\ n_1\{1 - 2\Delta_1\}^{1/2} & (a < r) \end{cases} \quad (11)$$

Here, the relative refractive index difference $\Delta(r)$ at a distance r from the core center of the compensated fiber and the mode dispersion-compensating fiber is approximated with Equation (13) below.

$$\Delta(r) = \frac{n^2(r) - n^2(a)}{2n^2(r)} \approx \Delta_1\{1 - (r/a)^\alpha\} \quad (13)$$

Integration of $\Delta(r)$ in Equation (13) with the distance r from the core center obtains Equation (14) below, whereby Equation (10) becomes Equation (12) below.

$$\int_0^a \Delta(r)dr \approx a\Delta_1 \frac{\alpha}{1+\alpha} \quad (14)$$

$$L_{comp}/L_{target} = \left(\frac{\alpha_{target} - \alpha_{opt}}{\alpha_{opt} - \alpha_{comp}}\right) \times \left(\frac{1 + \alpha_{comp}}{1 + \alpha_{target}}\right) \quad (12)$$

When the refractive index profile n(r) at a distance r from the core center of the compensated fiber and the mode dispersion-compensating fiber is approximated by Equation (11), an optical transmission path is constructed by coupling the mode dispersion-compensating fiber to the compensated fiber so that their length ratio $L_{comp}/L_{target}$ satisfies Equation (12).

Consequently, the absolute value of the relative difference in arrival times of signal light propagated through the compensated fiber in a higher-order mode and a lower-order mode matches the absolute value of the relative difference in arrival times of light propagated through the mode dispersion-compensating fiber in a higher-order mode and a lower-order mode, thereby compensating modal dispersion in the compensated fiber and achieving a broad band.

An optical LAN can be established by connecting a computer, related devices, and the like, to this type of optical transmission path. The broad band of the optical transmission path enables the transmission rate of the optical LAN to be increased. This enables an Ethernet capable of transmitting at 10 Gbit/s such as 10 GbE.

This will be explained in greater detail using Specific Examples.

SPECIFIC EXAMPLE 3-1

Optical transmission paths are constructed using compensated fibers and mode dispersion-compensating fibers having the refractive index profile exponential parameters shown in Table 3.

TABLE 3

| Specific Example | Wavelength of Signal Light (μm) | Refractive index profile exponential parameter $\alpha_{target}$ of Compensated Fiber | Refractive index profile exponential parameter $\alpha_{target}$ of Mode dispersion-compensating Fiber | Mode dispersion-compensating Fiber Length $L_{comp}$ (km) |
|---|---|---|---|---|
| 3-1 | 0.85 | 1.90 | 3.00 | 0.201 |
| 3-2 | 0.85 | 2.00 | 2.60 | 0.086 |
| 3-3 | 0.85 | 2.03 | 2.20 | 0.066 |
| 3-4 | 0.85 | 2.05 | 1.90 | 0.068 |
| 3-5 | 0.85 | 2.10 | 1.00 | 0.037 |
| 3-6 | 0.85 | 2.20 | 1.40 | 0.187 |
| 3-7 | 0.85 | — | 1.50 | 0.092 |
| 3-8 | 0.85 | 1.90 | 2.30 | 0.494 |
| 3-9 | 1.3 | 1.84 | 2.80 | 0.156 |

The refractive index $n_{target}(r)$ of the compensated fiber at a distance r from its core center is approximated with Equation (12), and its refractive index profile exponential parameter $\alpha_{target}$ is 1.90. The relative refractive index difference $\Delta_{1\,target}$ of the core center with respect to the cladding is 0.01, and the core radius is 25 μm.

The center wavelength of the signal light used is 0.85 μm, the spectral full width at half maximum is 0.16 nm, and the pulse full width at half maximum is 0.09 ns. The refractive index profile exponential parameter $\alpha_{opt}$ that obtains the maximum band at signal wavelength of 0.85 μm is 2.04.

Accordingly, the refractive index of $\Delta_{target}(r)$ has a smaller shape around the outer periphery of the core than $\Delta_{opt}(r)$, and the relative difference in arrival times of signal light propagated in a higher-order mode and a lower-order mode has a minus value.

The refractive index profile of the mode dispersion-compensating fiber is approximated with Equation (12), as is that of the compensated fiber, $\alpha_{target}$ having a larger value than $\alpha_{opt}$, and the refractive index of $\Delta_{target}(r)$ having a larger shape around the outer periphery of the core than $\Delta_{opt}(r)$. Accordingly, the relative difference in arrival times of signal light propagated along the mode dispersion-compensating fiber in a higher-order mode and a lower-order mode has a plus value.

This enables the relative difference between arrival times of signal light propagating through the compensated fiber in a higher-order mode and a lower-order mode to be compensated by the relative difference between arrival times of signal light propagating through the mode dispersion-compensating fiber in a higher-order mode and a lower-order mode.

The relative refractive index difference $\Delta_{1comp}$ of the core center with respect to the cladding, and the core radius a, are the same as those of the compensated fiber.

The mode dispersion-compensating fiber and the compensated fiber are coupled to construct an optical transmission path, with a length ratio $L_{comp}/L_{target}$ that satisfies Equation (12).

Figure 52:
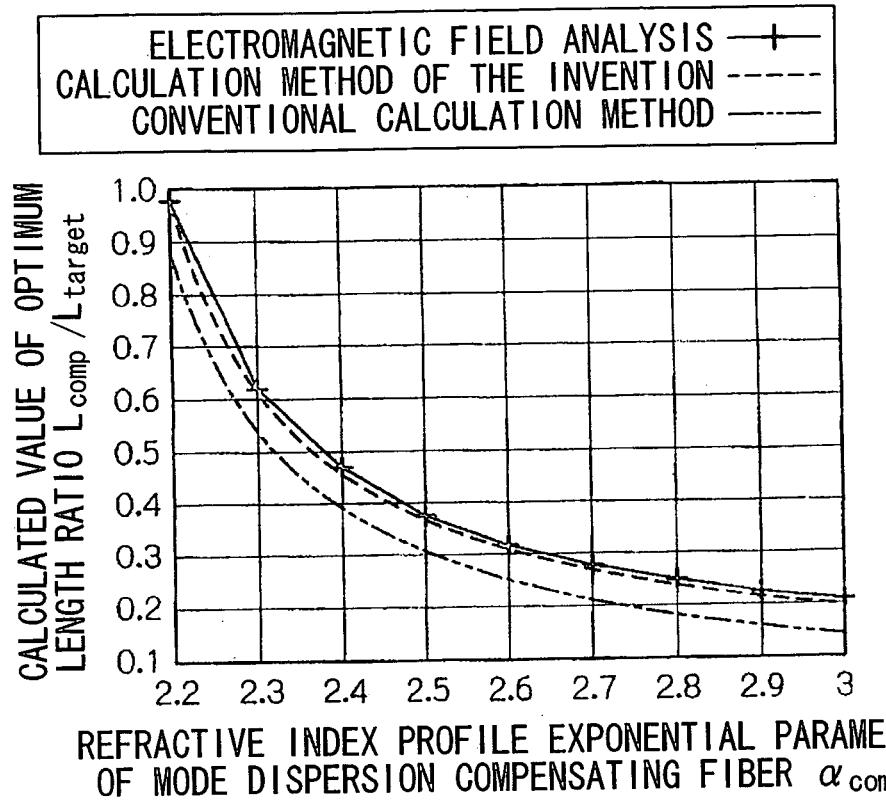
FIG. 52 is a diagram showing the relationship between $\alpha_{comp}$ and the length ratio $L_{comp}/L_{target}$ calculated in Specific Example 3-1.

FIG. 52 is a diagram of length ratios $L_{comp}/L_{target}$ obtained by inputting the conditions of Specific Example 3-1 ($\alpha_{target}$=1.90, $\alpha_{opt}$=2.04) to Equation (12), plotted against $\alpha_{comp}$.

For comparison, FIG. 52 also plots values calculated by using a conventional empirical method, and values calculated by a method of electromagnetic field analysis simulation.

The conventional empirical method calculates the values using the following Equation (15):

$$\frac{L_{comp}}{L_{target}} = \frac{\alpha_{target} - \alpha_{opt}}{\alpha_{opt} - \alpha_{comp}} \quad (15)$$

The conventional method of using electromagnetic field analysis simulation to determine the length ratio $L_{comp}/L_{target}$ of the mode dispersion-compensating fiber and the compensated fiber that obtains maximum band is as follows.

Figure 71:
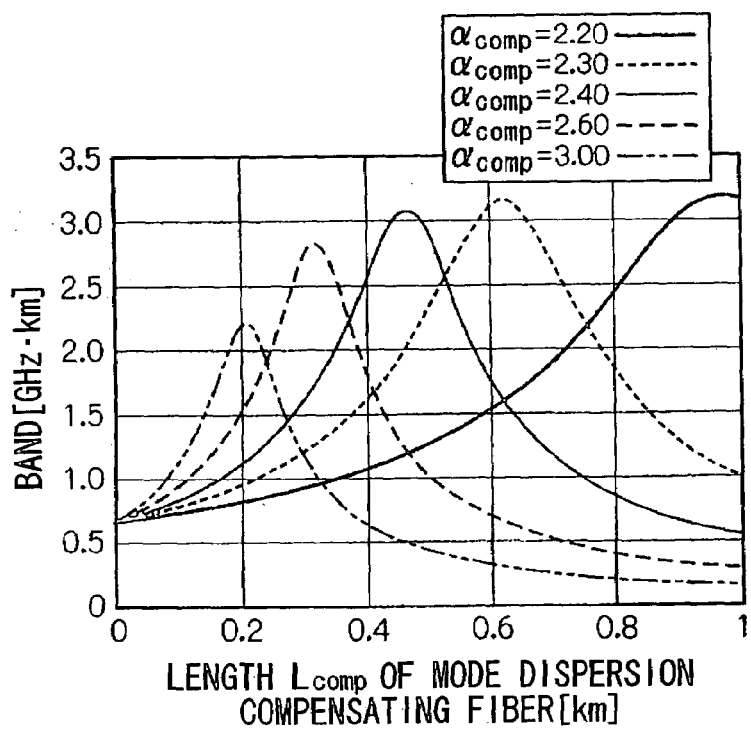
FIG. 71 is a diagram showing the relationship between the band of an optical transmission path calculated using a conventional electromagnetic field analysis simulation and the length of a mode dispersion-compensating fiber.

FIG. 71 is a diagram of bands in the OFL of an optical transmission path constructed by coupling a mode dispersion-compensating fiber to a compensated fiber, calculated by electromagnetic field analysis simulation and plotted against the length $L_{comp}$. The $L_{target}$ is 1 km.

The length ratio $L_{comp}/L_{target}$ that achieves the maximum band of wavelengths is determined using the relationship between the band of the optical transmission path and the length $L_{comp}$ shown in FIG. 71.

Figure 72A:
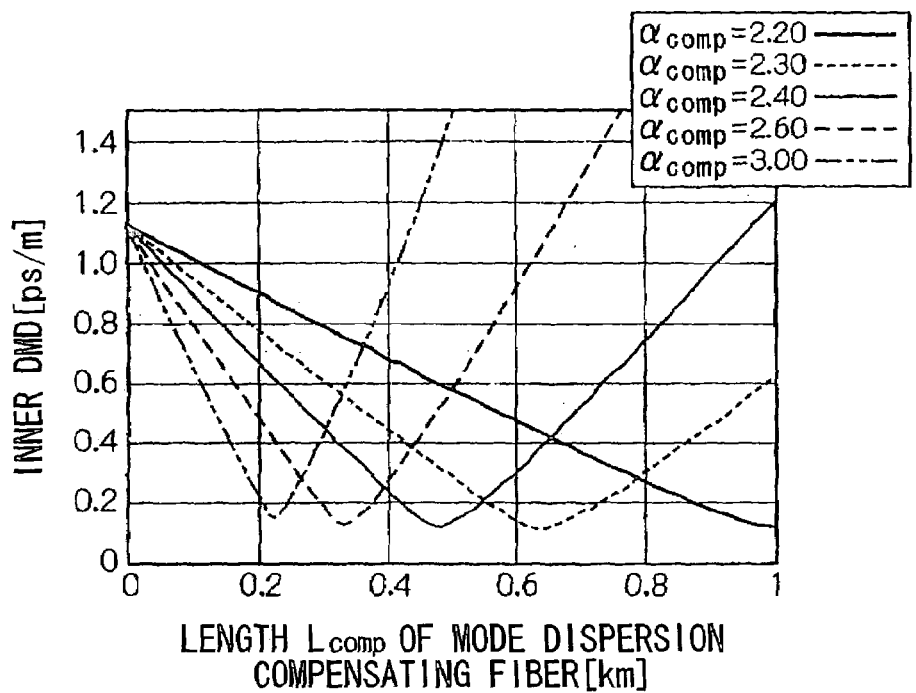
FIG. 72 is a diagram showing the relationship between (a) the inner DMD and (b) the outer DMD of an optical transmission path constructed by coupling a compensated fiber and a mode dispersion-compensating fiber using a conventional method, and the length of the mode dispersion-compensating fiber.
Figure 72B:
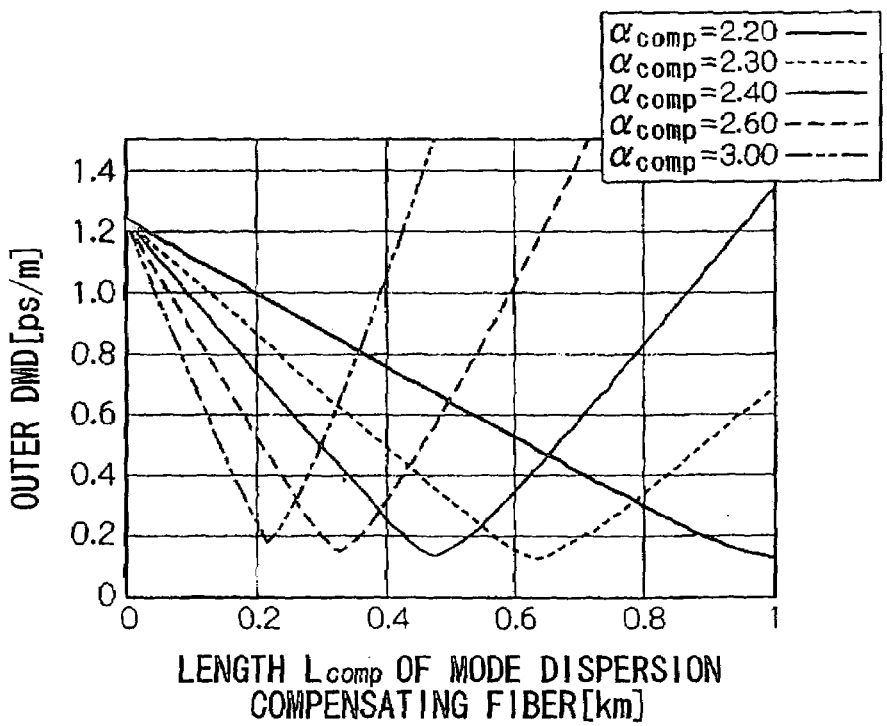

FIG. 72 is a diagram of (a) the inner DMD and (b) the outer DMD of the optical transmission path plotted against the length $L_{comp}$ of the mode dispersion-compensating fiber. The inner DMD is the value obtained by subtracting the width of the input pulse from the value obtained by calculating the difference between the slowest arrival time and the fastest arrival time when the distance from the center of the signal light incident into the optical fiber to the center of the core (hereinafter referred to as "offset") is between 5 μm and 18 μm. The outer DMD is the value obtained by subtracting the width of the input pulse from the value obtained by calculating the difference between the slowest arrival time and the fastest arrival time when the offset is between 0 μm and 23 μm.

The arrival time at the output end of signal light propagated in each mode is calculated by simulation as the arrival time of signal light, launched into the optical fiber so as to be shifted from the core center and propagate in a specific mode, at the output end.

It can be seen that, when the length $L_{comp}$ of the mode dispersion-compensating fiber is one that obtains the maximum band of wavelengths of the optical transmission path in FIG. 71, the inner DMD and the outer DMD of FIG. 72 are at their minimum and the arrival times of signal light propagated in every mode are approximately synchronous.

The conventional method of simulation by electromagnetic field analysis calculates a length ratio $L_{comp}/L_{target}$ that approximately synchronizes the arrival times of the signal light and completely compensates modal dispersion of the optical transmission path.

In the specific examples below, the length ratio $L_{comp}/L_{target}$ calculated by the conventional method of simulation by electromagnetic field analysis is deemed as a theoretical analysis value, and is compared with the $L_{comp}/L_{target}$ obtained in the specific examples.

Figure 53A:
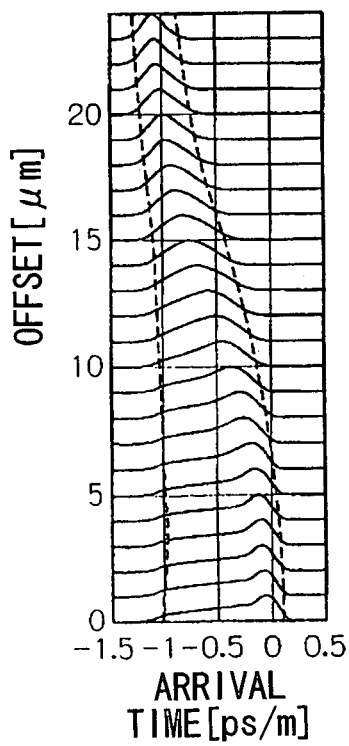
FIG. 53 is a diagram of DMD characteristics in (a) the compensated fiber, (b) an optical transmission path configured with a length ratio $L_{comp}/L_{target}$ calculated by a conventional method, and (c) an optical transmission path configured with a length ratio $L_{comp}/L_{target}$ calculated by the method of an exemplary embodiment of the present invention according to Specific Example 3-1.

As shown in FIG. 53, the $L_{comp}/L_{target}$ calculated in Specific Example 3-1 has approximately the same value as the theoretical analysis value. In comparison, the value calculated by using the conventional empirical method is considerably different from the theoretical analysis value.

By way of example, an optical transmission path constructed by coupling a mode dispersion-compensating fiber having a refractive index profile exponential parameter $\alpha_{comp}$ of 2.60 to the compensated fiber of Specific Example 3-1 will be explained.

The length ratio $L_{comp}/L_{target}$ for coupling is determined using Equation (12) as $L_{comp}/L_{target}$=0.201. It can also be determined from the relationship between length ratio $L_{comp}/L_{target}$ and $\alpha_{comp}$ in FIG. 52, as the length ratio $L_{comp}/L_{target}$ when $\alpha_{comp}$=2.60.

An optical transmission path is constructed by coupling the mode dispersion-compensating fiber to the compensated fiber according to these lengths.

FIG. 53 is a diagram of DMD characteristics of (a) the compensated fiber and (b) and (c) the optical transmission path, calculated by simulation. DMD characteristics are simulation-calculated waveforms of signal light that is launched so as to be shifted from the core center, and propagates to the output end.

The greater the distance of the center of the incident signal light from the core center, the higher the mode that it propagates in. Accordingly, DMD characteristics are obtained by plotting the optical strength of signal light propagated in each mode against the relative difference in arrival times. When the distance between the center of the signal light and the core center (hereinafter referred to as "offset") is small, the signal light propagates in lower-order modes, and propagates in higher-order modes when the offset is large. The larger the offset, the higher the mode that the signal light propagates in, as indicated by the waveform.

Figure 53B:
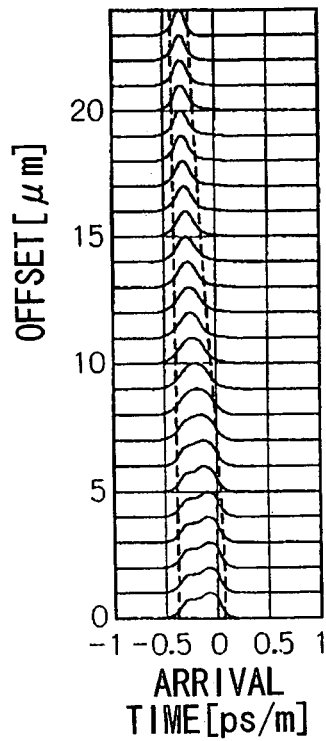
Figure 53C:
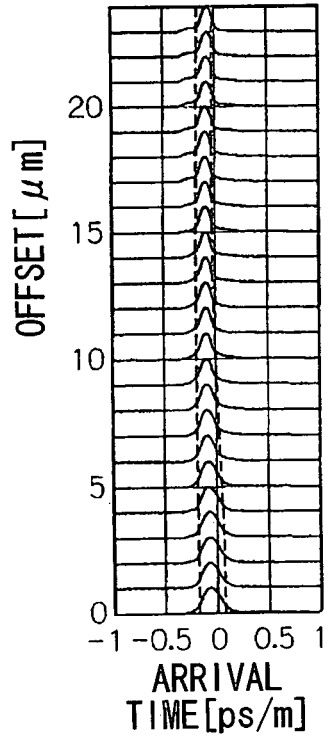

FIG. 53(c) shows the compensated fiber. FIGS. 53(b) and 53(c) are the DMD of an optical transmission path constructed by coupling a mode dispersion-compensating fiber whose $\alpha_{comp}$=3.00 to 1 km of the compensated fiber, FIG. 53(b) showing the DMD when the fibers are coupled at a length ratio $L_{comp}/L_{target}$=0.146, calculated by the conventional method, and FIG. 53(c) showing the DMD when the fibers are coupled at a length ratio $L_{comp}/L_{target}$=0.201, calculated in Specific Example 3-1.

As shown in FIG. 53(c), it can be seen that when coupled according to the length ratio $L_{comp}/L_{target}$ of 0.201 calculated in Specific Example 3-1, the arrival times of signal light propagated in all modes are approximately synchronous, compensating modal dispersion in the compensated fiber. In contrast, when coupled according to the length ratio $L_{comp}/L_{target}$ of 0.146 calculated by the conventional method, the arrival times of signal light propagated in all modes are not sufficiently synchronous, as shown in FIG. 53(b).

In comparison with the optical transmission path coupled with the length ratio $L_{comp}/L_{target}$ of 0.146 calculated by the conventional empirical method, the arrival times of signal light propagated in each mode along the optical transmission path can be approximately synchronized by coupling according to the length ratio $L_{comp}/L_{target}$ of 0.201 calculated in Specific Example 3-1, thereby precisely compensating modal dispersion along the compensated fiber. This enables an optical transmission path having a broad band.

Using Equation (3) to calculate the length of the mode dispersion-compensating fiber obtains approximately the same value as the theoretical analysis value calculated by electromagnetic field analysis simulation, and makes the calculation simpler, with no need for complex calculations such as electromagnetic field analysis simulation.

SPECIFIC EXAMPLE 3-2

Figure 54:
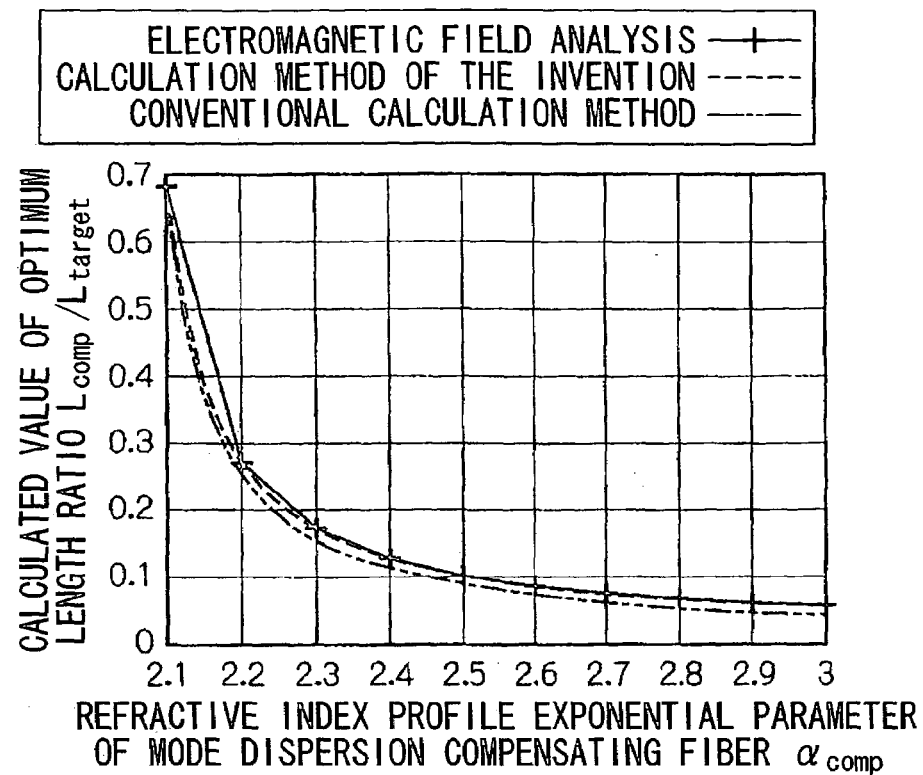
FIG. 54 is a diagram showing the relationship between $\alpha_{comp}$ and the length ratio $L_{comp}/L_{target}$ calculated in Specific Example 3-2.

FIG. 54 is a diagram of the length ratio $L_{comp}/L_{target}$ calculated using Equation (12), in a case where a mode dispersion-compensating fiber is coupled to the compensated fiber of Specific Example 3-2 shown in Table 3, plotted against $\alpha_{comp}$. It can be seen that the length ratio $L_{comp}/L_{target}$ calculated using Equation (12) has approximately the same value as the theoretical analysis value calculated by electromagnetic field analysis simulation.

By way of example, an optical transmission path constructed by coupling a mode dispersion-compensating fiber having a refractive index profile exponential parameter $\alpha_{comp}$ of 2.60 to the compensated fiber of Specific Example 3-2 will be explained.

The length ratio $L_{comp}/L_{target}$ for coupling is determined using Equation (12) as $L_{comp}/L_{target}=0.086$. The optical transmission path is constructed by coupling the mode dispersion-compensating fiber to the compensated fiber according to these lengths.

Figure 55A:
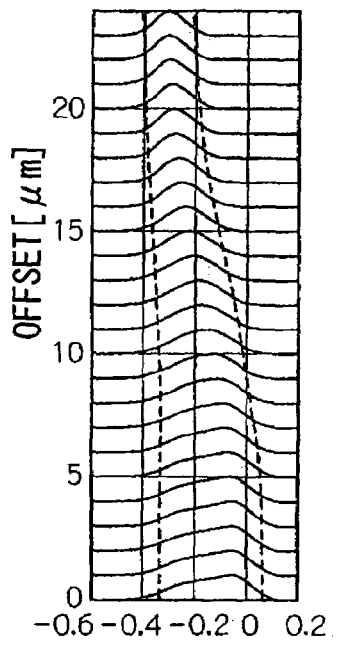
FIG. 55 is a diagram of DMD characteristics in (a) the compensated fiber, (b) an optical transmission path configured with a length ratio $L_{comp}/L_{target}$ calculated by a conventional method, and (c) an optical transmission path configured with a length ratio $L_{comp}/L_{target}$ calculated by the method of an exemplary embodiment of the present invention according to Specific Example 3-2.
Figure 55B:
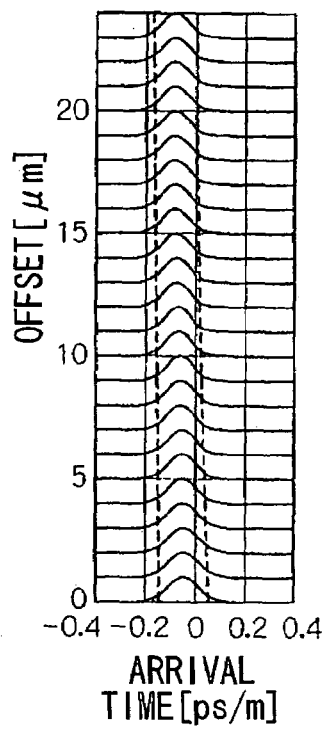
Figure 55C:
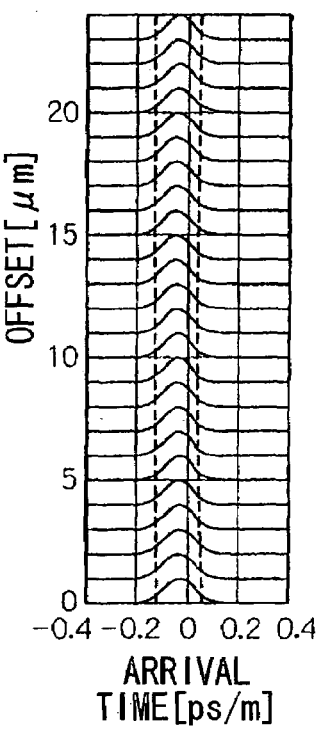

FIG. 55 is a diagram of DMD characteristics of the compensated fiber and the optical transmission path, calculated by simulation. FIG. 55($a$) shows the DMD of the compensated fiber. FIGS. 55($b$) and 55($c$) show the DMD of an optical transmission path constructed by coupling the above-mentioned mode dispersion-compensating fiber to 1 km of the compensated fiber, FIG. 55($b$) showing the DMD when the fibers are coupled at a length ratio $L_{comp}/L_{target}$ 0.071, calculated by the conventional method, and FIG. 55($c$) showing the DMD when the fibers are coupled at a length ratio $L_{comp}/L_{target}=0.086$, calculated in Specific Example 3-2.

As shown in FIG. 55($c$), it can be seen that when coupled according to the length ratio $L_{comp}/L_{target}$ calculated by this method, the arrival times of signal light propagated in all modes are approximately synchronous, precisely compensating modal dispersion of the compensated fiber.

SPECIFIC EXAMPLE 3-3

Figure 56:
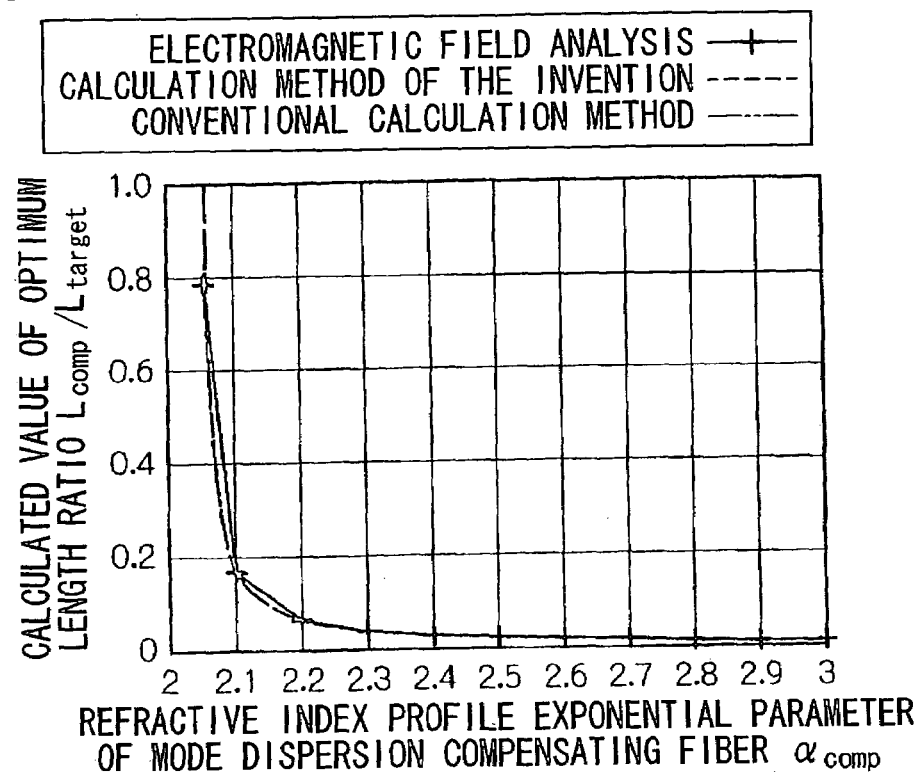
FIG. 56 is a diagram showing the relationship between $\alpha_{comp}$ and the length ratio $L_{comp}/L_{target}$ calculated in Specific Example 3-3.

FIG. 56 is a diagram of the length ratio $L_{comp}/L_{target}$ calculated using Equation (12), in a case where a mode dispersion-compensating fiber is coupled to the compensated fiber of Specific Example 3-3 shown in Table 3, plotted against $\alpha_{comp}$. It can be seen that the length ratio $L_{comp}/L_{target}$ calculated using Equation (12) has approximately the same value as the theoretical analysis value calculated by electromagnetic field analysis simulation.

By way of example, an optical transmission path constructed by coupling a mode dispersion-compensating fiber having a refractive index profile exponential parameter $\alpha_{comp}$ of 2.20 to the compensated fiber of Specific Example 3-3 will be explained.

The length ratio $L_{comp}/L_{target}$ for coupling the optical fibers is determined using Equation (12) as $L_{comp}/L_{target}=0.066$. The optical transmission path is constructed by coupling the mode dispersion-compensating fiber to the compensated fiber according to these lengths.

Figure 57A:
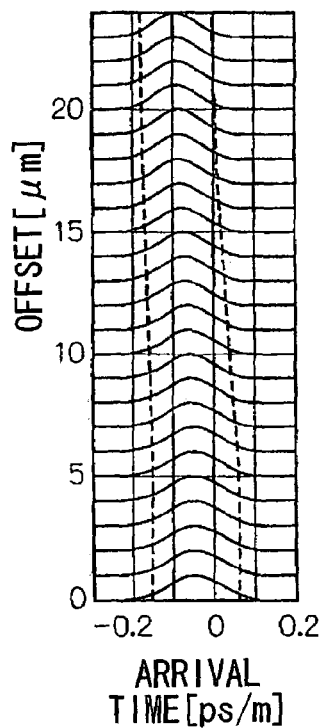
FIG. 57 is a diagram of DMD characteristics in (a) the compensated fiber, (b) an optical transmission path configured with a length ratio $L_{comp}/L_{target}$ calculated by a conventional method, and (c) an optical transmission path configured with a length ratio $L_{comp}/L_{target}$ calculated by the method of an exemplary embodiment of the present invention according to Specific Example 3-3.
Figure 57B:
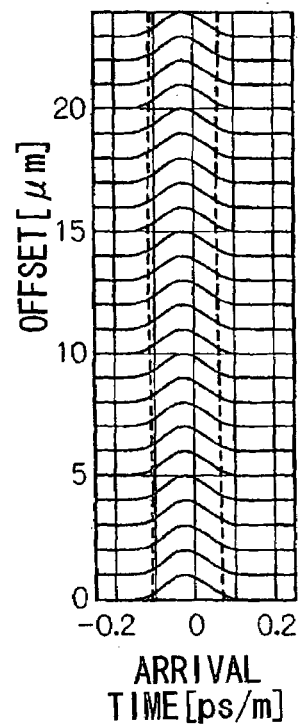
Figure 57C:
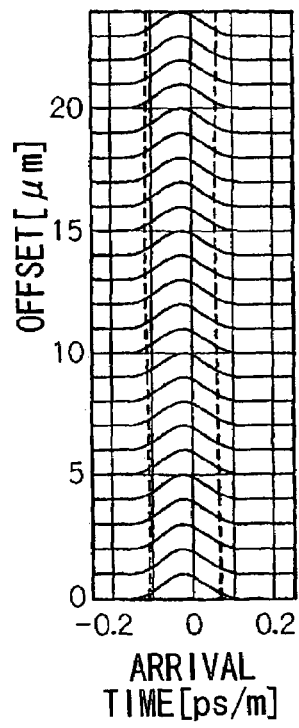

FIG. 57 is a diagram of DMD characteristics of the compensated fiber and the optical transmission path, calculated by simulation. FIG. 57($a$) shows the DMD of the compensated fiber. FIGS. 57($b$) and 57($c$) show the DMD of an optical transmission path constructed by coupling the above-mentioned mode dispersion-compensating fiber to 1 km of the compensated fiber, FIG. 57($b$) showing the DMD when the fibers are coupled at a length ratio $L_{comp}/L_{target}=0.063$, calculated by the conventional method, and FIG. 57($c$) showing the DMD when the fibers are coupled at a length ratio $L_{comp}/L_{target}=0.066$, calculated in Specific Example 3-3.

As shown in FIG. 57($c$), it can be seen that when coupled according to the length ratio $L_{comp}/L_{target}$ calculated by this method, the arrival times of signal light propagated in all modes are approximately synchronous, precisely compensating modal dispersion of the compensated fiber.

SPECIFIC EXAMPLE 3-4

FIG. 58 is a diagram of the length ratio $L_{comp}/L_{target}$ calculated using Equation (12), in a case where a mode dispersion-compensating fiber is coupled to the compensated fiber of Specific Example 3-4 shown in Table 3, plotted against $\alpha_{comp}$. It can be seen that the length ratio $L_{comp}/L_{target}$ calculated using Equation (12) has approximately the same value as the theoretical analysis value calculated by electromagnetic field analysis simulation.

By way of example, an optical transmission path constructed by coupling a mode dispersion-compensating fiber having a refractive index profile exponential parameter $\alpha_{comp}$ of 1.90 to the compensated fiber of Specific Example 3-4 will be explained.

The length ratio $L_{comp}/L_{target}$ for coupling the optical fibers is determined using Equation (12) as $L_{comp}/L_{target}=0.068$. The optical transmission path is constructed by coupling the mode dispersion-compensating fiber to the compensated fiber according to these lengths.

FIG. 59 is a diagram of DMD characteristics of the compensated fiber and the optical transmission path, calculated by simulation. FIG. 59($a$) shows the DMD of the compensated fiber. FIGS. 59($b$) and 59($c$) show the DMD of an optical transmission path constructed by coupling the above-mentioned mode dispersion-compensating fiber to 1 km of the compensated fiber, FIG. 59($b$) showing the DMD when the fibers are coupled at a length ratio $L_{comp}/L_{target}=0.071$, calculated by the conventional method, and FIG. 59($c$) showing the DMD when the fibers are coupled at a length ratio $L_{comp}/L_{target}=0.068$, calculated in Specific Example 3-4.

As shown in FIG. 59($c$), it can be seen that when coupled according to the length ratio $L_{comp}/L_{target}$ by this method, the arrival times of signal light propagated in all modes are approximately synchronous, enabling modal dispersion of the compensated fiber to be precisely compensated.

SPECIFIC EXAMPLE 3-5

Figure 60:
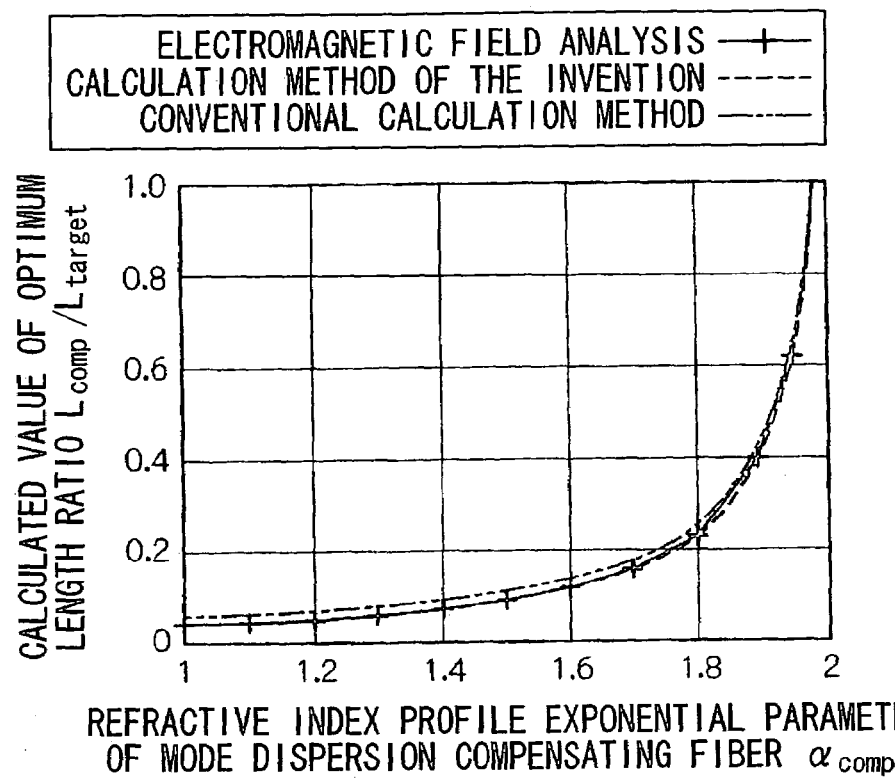
FIG. 60 is a diagram showing the relationship between $\alpha_{comp}$ and the length ratio $L_{comp}/L_{target}$ calculated in Specific Example 3-5.

FIG. 60 is a diagram of the length ratio $L_{comp}/L_{target}$ calculated using Equation (12), in a case where a mode dispersion-compensating fiber is coupled to the compensated fiber of Specific Example 3-5 shown in Table 3, plotted against $\alpha_{comp}$. It can be seen that the length ratio $L_{comp}/L_{target}$ calculated using Equation (12) has approximately the same value as the theoretical analysis value calculated by electromagnetic field analysis simulation.

By way of example, an optical transmission path constructed by coupling a mode dispersion-compensating fiber having a refractive index profile exponential parameter $\alpha_{comp}$ of 1.00 to the compensated fiber of Specific Example 3-5 will be explained.

The length ratio $L_{comp}/L_{target}$ for coupling the optical fibers is determined using Equation (12) as $L_{comp}/L_{target}=0.037$. The optical transmission path is constructed by coupling the mode dispersion-compensating fiber to the compensated fiber according to these lengths.

Figure 61A:
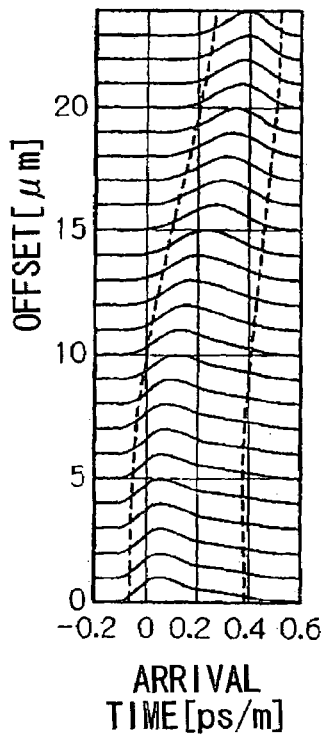
FIG. 61 is a diagram of DMD characteristics in (a) the compensated fiber, (b) an optical transmission path configured with a length ratio $L_{comp}/L_{target}$ calculated by a conventional method, and (c) an optical transmission path configured with a length ratio $L_{comp}/L_{target}$ calculated by the method of an exemplary embodiment of the present invention according Specific Example 3-5.
Figure 61B:
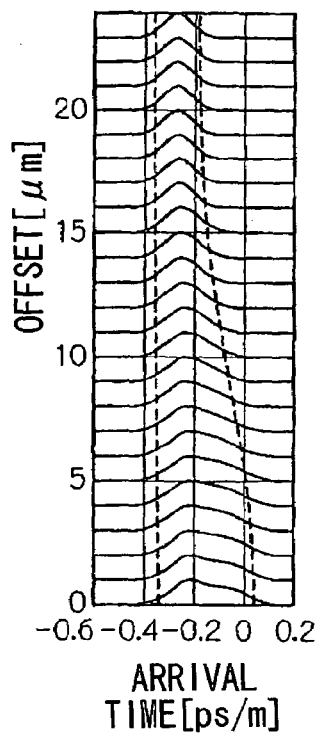
Figure 61C:
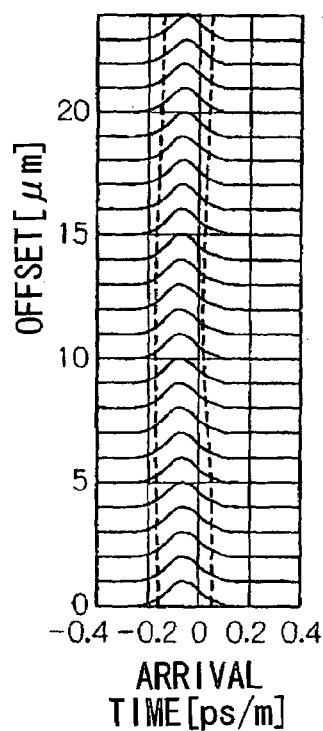

FIG. 61 is a diagram of DMD characteristics of the compensated fiber and the optical transmission path, calculated by simulation. FIG. 61(a) shows the DMD of the compensated fiber. FIGS. 61(b) and 61(c) show the DMD of an optical transmission path constructed by coupling the above-mentioned mode dispersion-compensating fiber to 1 km of the compensated fiber, FIG. 61(b) showing the DMD when the fibers are coupled at a length ratio $L_{comp}/L_{target}=0.058$, calculated by the conventional method, and FIG. 61(c) showing the DMD when the fibers are coupled at a length ratio $L_{comp}/L_{target}=0.037$, calculated in Specific Example 3-5.

As shown in FIG. 61(c), it can be seen that when coupled according to the length ratio $L_{comp}/L_{target}$ calculated in Specific Example 3-5, the arrival times of signal light propagated in all modes are approximately synchronous, enabling modal dispersion of the compensated fiber to be precisely compensated. The band is clearly superior to that achieved when the optical transmission path is coupled at a length ratio $L_{comp}/L_{target}$ calculated by the conventional method.

SPECIFIC EXAMPLE 3-6

Figure 62:
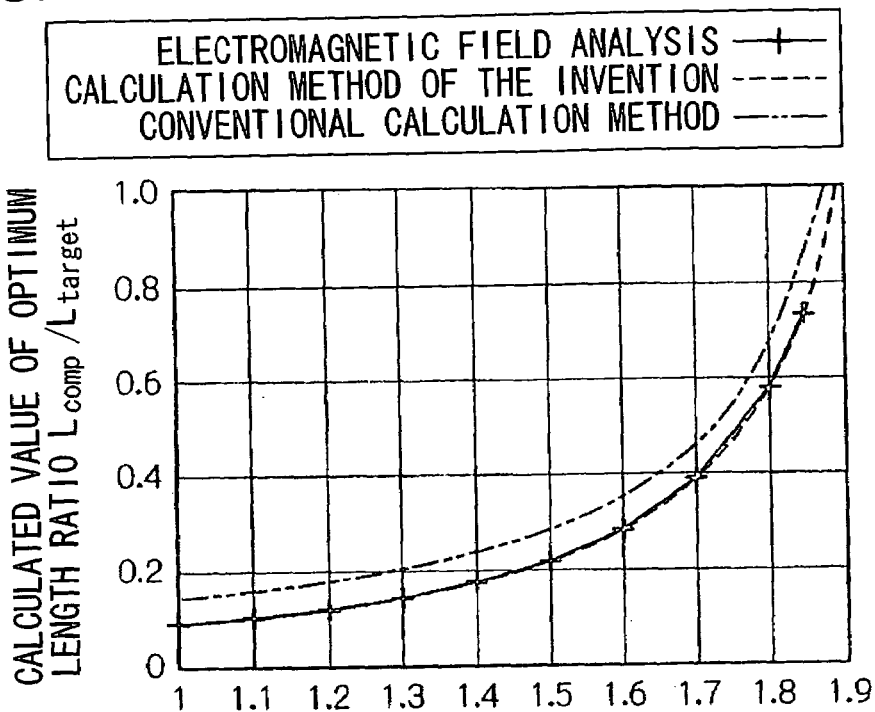
FIG. 62 is a diagram showing the relationship between $\alpha_{comp}$ and the length ratio $L_{comp}/L_{target}$ calculated in Specific Example 3-6.

FIG. 62 is a diagram of the length ratio $L_{comp}/L_{target}$ calculated using Equation (12), in a case where a mode dispersion-compensating fiber is coupled to the compensated fiber of Specific Example 3-6 shown in Table 3, plotted against $\alpha_{comp}$. It can be seen that the length ratio $L_{comp}/L_{target}$ calculated using Equation (12) has approximately the same value as the theoretical analysis value calculated by electromagnetic field analysis simulation.

By way of example, an optical transmission path constructed by coupling a mode dispersion-compensating fiber having a refractive index profile exponential parameter $\alpha_{comp}$ of 1.40 to the compensated fiber of Specific Example 3-6 will be explained.

The length ratio $L_{comp}/L_{target}$ for coupling the optical fibers is determined using Equation (12) as $L_{comp}/L_{target}=0.187$. The optical transmission path is constructed by coupling the mode dispersion-compensating fiber to the compensated fiber according to these lengths.

Figure 63A:
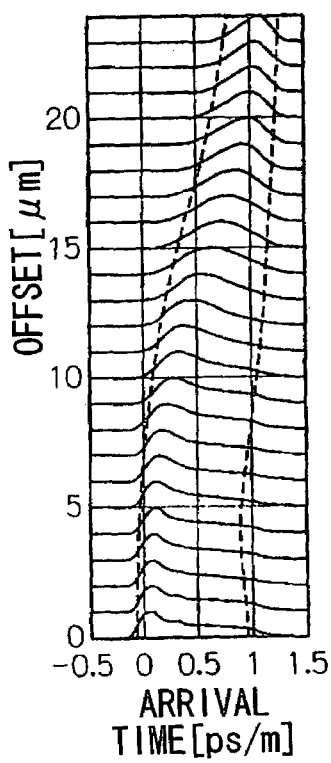
FIG. 63 is a diagram of DMD characteristics in (a) the compensated fiber, (b) an optical transmission path configured with a length ratio $L_{comp}/L_{target}$ calculated by a conventional method, and (c) an optical transmission path configured with a length ratio $L_{comp}/L_{target}$ calculated by the method of an exemplary embodiment of the present invention according to Specific Example 3-6.
Figure 63B:
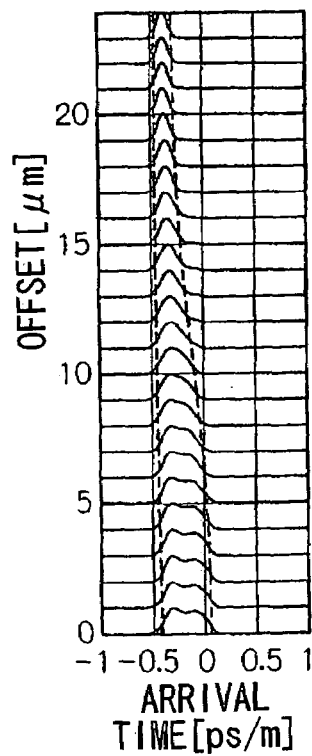
Figure 63C:
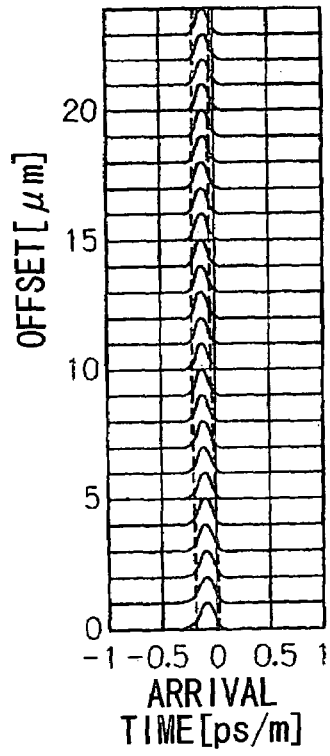

FIG. 63 is a diagram of DMD characteristics of the compensated fiber and the optical transmission path, calculated by simulation. FIG. 63(a) shows the DMD of the compensated fiber. FIGS. 63(b) and 63(c) show the DMD of an optical transmission path constructed by coupling the above-mentioned mode dispersion-compensating fiber to 1 km of the compensated fiber, FIG. 63(b) showing the DMD when the fibers are coupled at a length ratio $L_{comp}/L_{target}=0.250$, calculated by the conventional method, and FIG. 63(c) showing the DMD when the fibers are coupled at a length ratio $L_{comp}/L_{target}=0.187$, calculated in Specific Example 3-6.

As shown in FIG. 63(c), it can be seen that when coupled according to the length ratio $L_{comp}/L_{target}$ calculated by this method, the arrival times of signal light propagated in all modes are approximately synchronous, enabling modal dispersion of the compensated fiber to be precisely compensated. The band is clearly superior to that achieved when the optical transmission path is coupled at a length ratio $L_{comp}/L_{target}$ calculated by the conventional method.

SPECIFIC EXAMPLE 3-7

In Specific Example 3-7, an optical fiber that was already manufactured is used as the compensated fiber, and a mode dispersion-compensating fiber is coupled to the compensated fiber to construct an optical transmission path.

Figure 64:
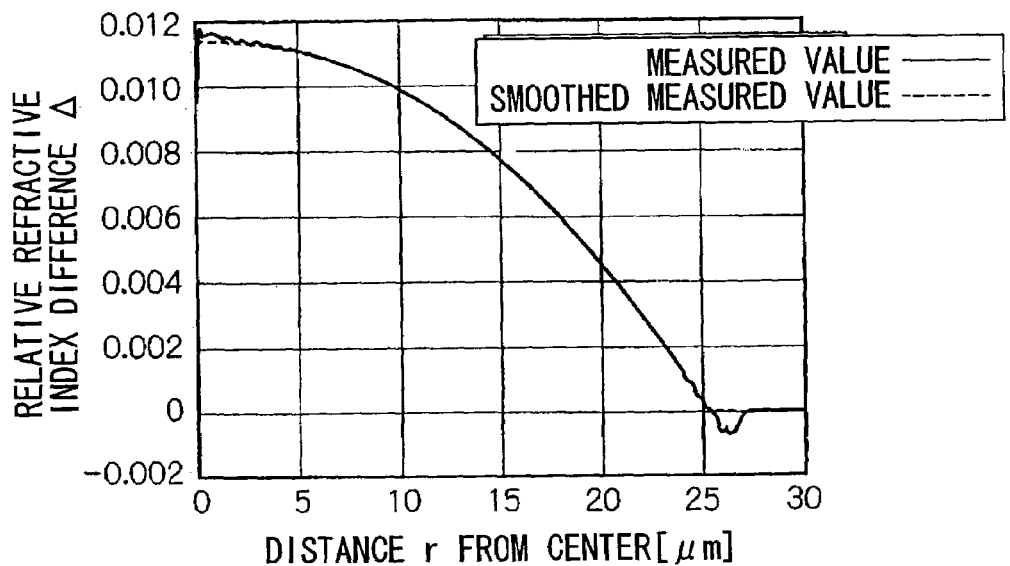
FIG. 64 is a diagram of the refractive index profile of a compensated fiber that has already manufactured according to Specific Example 3-7.

FIG. 64 is a diagram of the relative refractive index difference $\Delta_{comp}$ of the compensated fiber that was already manufactured in Specific Example 3-7, obtained by smoothing of the measurements.

Figure 65:
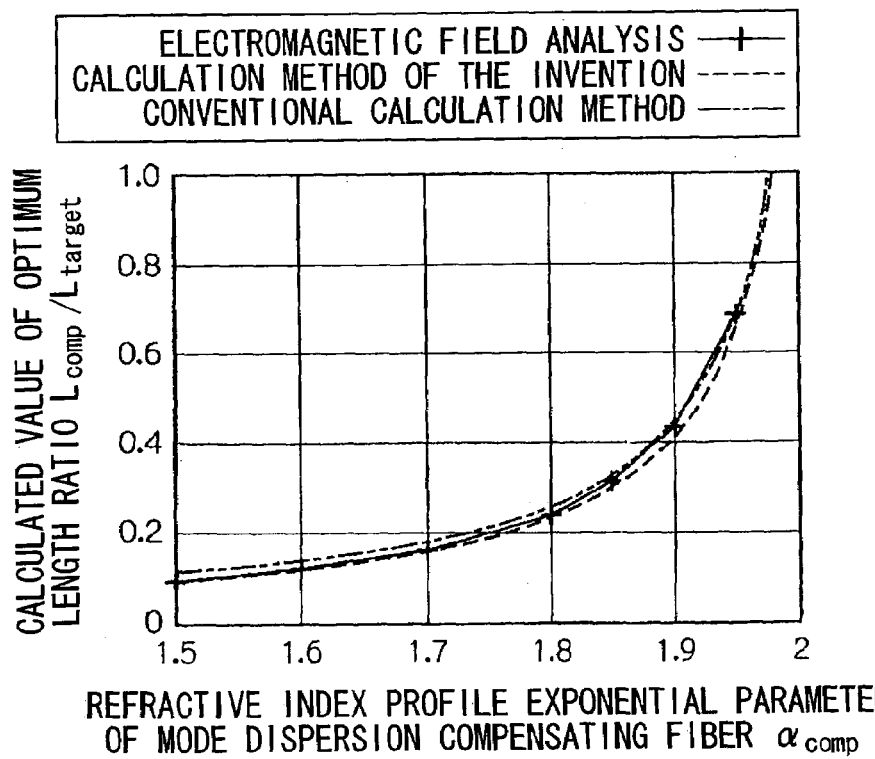
FIG. 65 is a diagram showing the relationship between $\alpha_{comp}$ and the length ratio $L_{comp}/L_{target}$ calculated in Specific Example 3-7.

FIG. 65 is a diagram of the length ratio $L_{comp}/L_{target}$ calculated using Equation (12), in a case where a mode dispersion-compensating fiber is coupled to the compensated fiber described above, plotted against $\alpha_{comp}$. It can be seen that the length ratio $L_{comp}/L_{target}$ calculated using Equation (12) has approximately the same value as the theoretical analysis value calculated by electromagnetic field analysis simulation.

By way of example, an optical transmission path constructed by coupling a mode dispersion-compensating fiber having a refractive index profile exponential parameter $\alpha_{comp}$ of 1.50 to the compensated fiber of Specific Example 3-7 will be explained.

The length ratio $L_{comp}/L_{target}$ for coupling the optical fibers is determined using Equation (12) as $L_{comp}/L_{target}=0.092$. The optical transmission path is constructed by coupling the mode dispersion-compensating fiber to the compensated fiber according to these lengths.

FIG. 66 is a diagram of DMD characteristics of the compensated fiber and the optical transmission path, calculated by simulation. FIG. 66(a) shows the DMD of the compensated fiber. FIGS. 66(b) and 66(c) show the DMD of an optical transmission path constructed by coupling the above-mentioned mode dispersion-compensating fiber to 1 km of the compensated fiber, FIG. 66(b) showing the DMD when the fibers are coupled at a length ratio $L_{comp}/L_{target}=0.115$, calculated by the conventional method, and FIG. 66(c) showing the DMD when the fibers are coupled at a length ratio $L_{comp}/L_{target}=0.092$, calculated in Specific Example 3-7.

As shown in FIG. 66(c), it can be seen that when coupled according to the length ratio $L_{comp}/L_{target}$ calculated by this method, the arrival times of signal light propagated in all modes are approximately synchronous, enabling modal dispersion of the compensated fiber to be precisely compensated. The band is clearly superior to that achieved when the optical transmission path is coupled at a length ratio $L_{comp}/L_{target}$ calculated by the conventional method.

SPECIFIC EXAMPLE 3-8

Specific Example 3-8 uses a compensated fiber whose relative refractive index difference of the core center with respect to the cladding $\Delta_1$ is 0.02, and whose core radius a is 31.25 µm. Accordingly, the refractive index profile that obtains the maximum band for signal light wavelength of 0.85 μm has a refractive index profile exponential parameter $\alpha_{opt}$ of 2.02.

FIG. 67 is a diagram of the length ratio $L_{comp}/L_{target}$ calculated using Equation (12), in a case where a mode dispersion-compensating fiber is coupled to the compensated fiber of Specific Example 3-8 shown in Table 3, plotted against $\alpha_{comp}$. It can be seen that the length ratio $L_{comp}/L_{target}$ calculated using Equation (12) has approximately the same value as the theoretical analysis value calculated by electromagnetic field analysis simulation.

By way of example, an optical transmission path constructed by coupling a mode dispersion-compensating fiber having a refractive index profile exponential parameter $\alpha_{comp}$ of 2.30 to the compensated fiber of Specific Example 3-8 will be explained.

The length ratio $L_{comp}/L_{target}$ for coupling the optical fibers is determined using Equation (12) as $L_{comp}/L_{target}=0.494$. The optical transmission path is constructed by coupling the mode dispersion-compensating fiber to the compensated fiber according to these lengths.

Figure 68A:
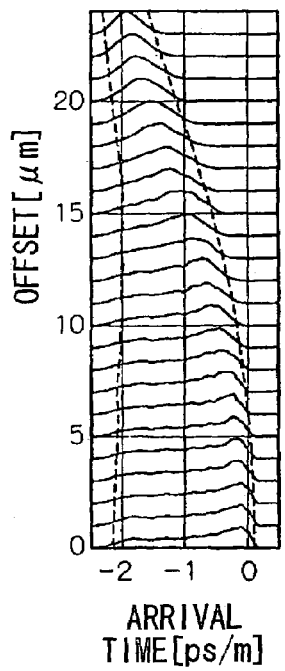
FIG. 68 is a diagram of DMD characteristics in (a) the compensated fiber, (b) an optical transmission path configured with a length ratio $L_{comp}/L_{target}$ calculated by a conventional method, and (c) an optical transmission path configured with a length ratio $L_{comp}/L_{target}$ calculated by the method of an exemplary embodiment of the present invention according to Specific Example 3-8.
Figure 68B:
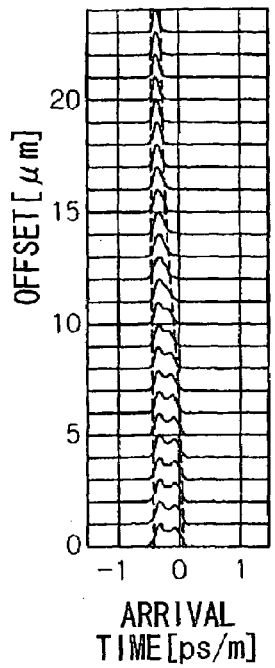
Figure 68C:
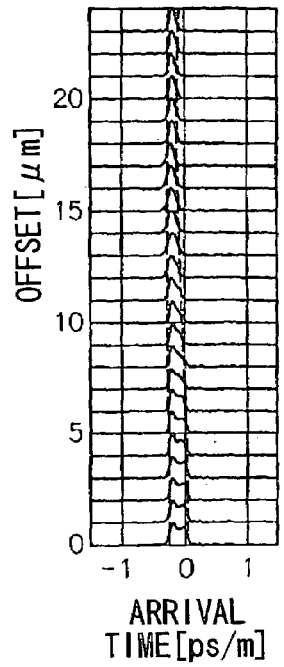

FIG. 68 is a diagram of DMD characteristics of the compensated fiber and the optical transmission path, calculated by simulation. FIG. 68(a) shows the DMD of the compensated fiber. FIGS. 68(b) and 68(c) show the DMD of an optical transmission path constructed by coupling the above-mentioned mode dispersion-compensating fiber to 1 km of the compensated fiber, FIG. 68(b) showing the DMD when the fibers are coupled at a length ratio $L_{comp}/L_{target}=0.434$, calculated by the conventional method, and FIG. 68(c) showing the DMD when the fibers are coupled at a length ratio $L_{comp}/L_{target}=0.494$, calculated in Specific Example 3-8.

As shown in FIG. 68(c), it can be seen that when coupled according to the length ratio $L_{comp}/L_{target}$ calculated by this method, the arrival times of signal light propagated in all modes are approximately synchronous, enabling modal dispersion of the compensated fiber to be precisely compensated. The band is clearly superior to that achieved when the optical transmission path is coupled at a length ratio $L_{comp}/L_{target}$ calculated by the conventional method.

SPECIFIC EXAMPLE 3-9

In Specific Example 3-9, the center wavelength of the signal light of 1.3 μm, the spectral full width at half maximum of 1.0 μm, and the pulse full width at half maximum of 0.05 ns are used. The refractive index profile that obtains the maximum band for signal light wavelength of 1.3 μm has a refractive index profile exponential parameter $\alpha_{opt}$ of 1.94.

Figure 69:
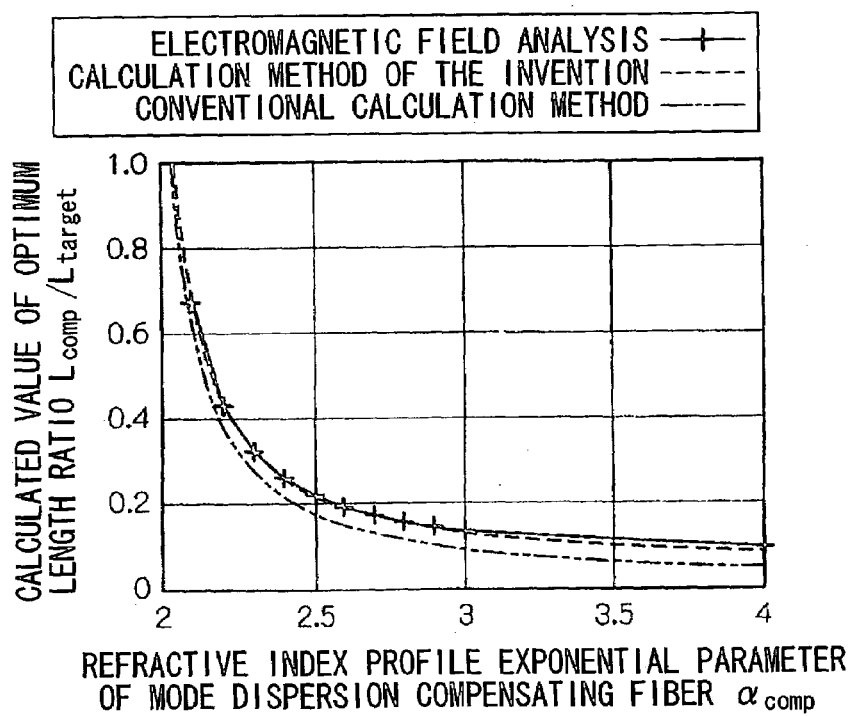
FIG. 69 is a diagram showing the relationship between $\alpha_{comp}$ and the length ratio $L_{comp}/L_{target}$ calculated in Specific Example 3-9.

FIG. 69 is a diagram of the length ratio $L_{comp}/L_{target}$ calculated using Equation (12), in a case where a mode dispersion-compensating fiber is coupled to the compensated fiber of Specific Example 3-9 shown in Table 3, plotted against $\alpha_{comp}$. It can be seen that the length ratio $L_{comp}/L_{target}$ calculated using Equation (12) has approximately the same value as the theoretical analysis value calculated by electromagnetic field analysis simulation.

By way of example, an optical transmission path constructed by coupling a mode dispersion-compensating fiber having a refractive index profile exponential parameter $\alpha_{comp}$ of 2.80 to the compensated fiber of Specific Example 3-9 will be explained.

The length ratio $L_{comp}/L_{target}$ for coupling the optical fibers is determined using Equation (12) as $L_{comp}/L_{target}=0.156$. The optical transmission path is constructed by coupling the mode dispersion-compensating fiber to the compensated fiber according to these lengths.

Figure 70A:
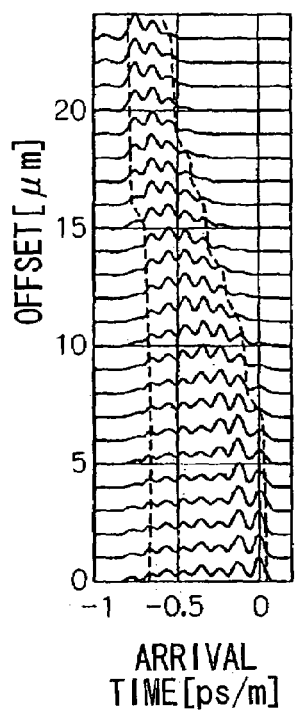
FIG. 70 is a diagram of DMD characteristics in (a) the compensated fiber, (b) an optical transmission path configured with a length ratio $L_{comp}/L_{target}$ calculated by a conventional method, and (c) an optical transmission path configured with a length ratio $L_{comp}/L_{target}$ calculated by the method of an exemplary embodiment of the present invention according to Specific Example 3-9.
Figure 70B:
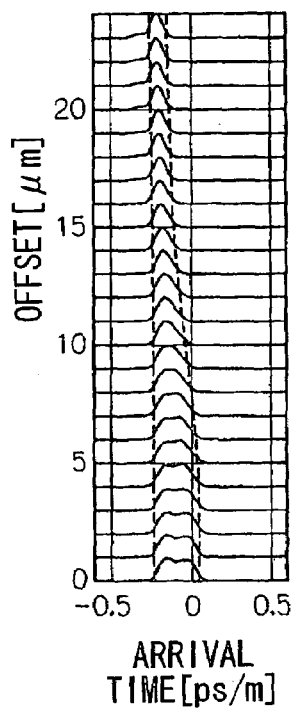
Figure 70C:
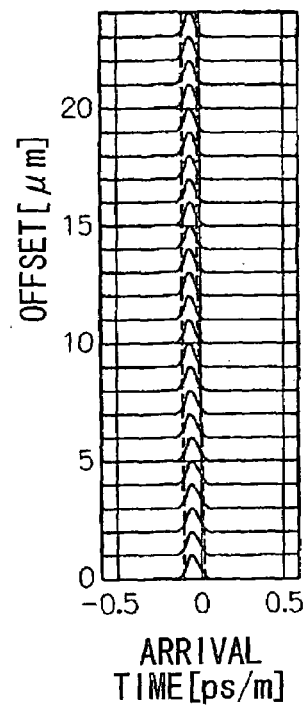

FIG. 70 is a diagram of DMD characteristics of the compensated fiber and the optical transmission path, calculated by simulation. FIG. 70(a) shows the DMD of the compensated fiber. FIGS. 70(b) and 70(c) show the DMD of an optical transmission path constructed by coupling the above-mentioned mode dispersion-compensating fiber to 1 km of the compensated fiber, FIG. 70(b) showing the DMD when the fibers are coupled at a length ratio $L_{comp}/L_{target}=0.116$, calculated by the conventional method, and FIG. 70(c) showing the DMD when the fibers are coupled at a length ratio $L_{comp}/L_{target}=0.156$, calculated in Specific Example 3-9.

As shown in FIG. 70(c), it can be seen that when coupled according to the length ratio $L_{comp}/L_{target}$ calculated by this method, the arrival times of signal light propagated in all modes are approximately synchronous, enabling modal dispersion of the compensated fiber to be precisely compensated. The band is clearly superior to that achieved when the optical transmission path is coupled at a length ratio $L_{comp}/L_{target}$ calculated by the conventional method.

Thus, the length ratio $L_{comp}/L_{target}$ of the coupling can be calculated easily by using Equation (12), and, by coupling the mode dispersion-compensating fiber to the compensated fiber at this length ratio, modal dispersion in the compensated fiber can be efficiently and precisely compensated, achieving an optical transmission path that propagates a broad band of signal light, particularly signals having a center wavelength of 0.85 μm or 1.3 μm.

The mode dispersion-compensating fiber and the compensated fiber of this Specific Example have refractive index profile exponential parameters $\alpha_{comp}$ and $\alpha_{target}$ of 0.5 or greater, the relative refractive index differences of core centers with respect to claddings $\Delta_{1comp}$ and $\Delta_{1target}$ are between 0.005 and 0.025, and core radii $a_{comp}$ and $a_{target}$ are between 5 μm and 50 μm, enabling modal dispersion of the compensated fiber to be precisely and efficiently compensated, and obtains an optical transmission path having a broad band.

An exemplary embodiment of the present invention can be applied even when the refractive index profiles of the compensated fiber and the mode dispersion-compensating fiber cannot be precisely approximated with Equation (12). In this case, the length of the mode dispersion-compensating fiber is determined from a length ratio of both fibers that satisfies Equation (11), and the mode dispersion-compensating fiber is coupled to the compensated fiber according to that length ratio. This enables modal dispersion of the compensated fiber to be approximately completely compensated, and obtains an optical transmission path having a broad band.

As described above, the length ratio $L_{comp}/L_{target}$ for coupling the mode dispersion-compensating fiber to the compensated fiber can be easily calculated by using Equation (10) or Equation (12). By coupling the mode dispersion-compensating fiber to the compensated fiber at this length ratio, modal dispersion of the compensated fiber can be efficiently and precisely compensated, and an optical transmission path having a broad band can be obtained.

This optical transmission path can be used in realizing an optical LAN that has a broad band and can handle high-speed communication.

What is claimed is:

1. A method for compensating modal dispersion comprising coupling a mode dispersion-compensating fiber and a compensated fiber having refractive index profiles that satisfy the following equation:

$$\Delta_{comp}(r)=\Delta_{opt}(r)+k\{\Delta_{opt}(r)-\Delta_{target}(r)\}$$

where $\Delta_{comp}(r)$ is a relative refractive index difference of the mode dispersion-compensating fiber at a distance r from a core center, $\Delta_{target}(r)$ is a relative refractive index difference of the compensated fiber at a distance r from a core center, $\Delta_{opt}(r)$ is a relative refractive index difference of the entire fiber at the distance r from the core center when the compensated fiber and the mode dispersion-compensating fiber are coupled to obtain a maximum band at a predetermined wavelength, and k is a proportional numerical constant, wherein the mode dispersion-compensating fiber and compensated fiber comprise multimode optical fibers, modal dispersion is compensated in the compensated fiber, and the maximum band at the predetermined wavelength is obtained.

2. The method for compensating modal dispersion as described in claim 1, wherein the mode dispersion-compensating fiber and the compensated fiber are coupled according to a length ratio that obtains a maximum band.

3. A mode dispersion-compensating fiber that couples to a compensated fiber comprising a multimode optical fiber, compensates for modal dispersion in the compensated fiber, and obtains a maximum band at a predetermined wavelength, wherein the refractive index profile of the mode dispersion-compensating fiber satisfies the following equation:

$$\Delta_{comp}(r)=\Delta_{opt}(r)+k\{\Delta_{opt}(r)-\Delta_{target}(r)\}$$

where $\Delta_{comp}(r)$ is a relative refractive index difference of the mode dispersion-compensating fiber at a distance r from a core center, $\Delta_{target}(r)$ is a relative refractive index difference of the compensated fiber at a distance r from a core center, $\Delta_{opt}(r)$ is a relative refractive index difference of the entire fiber at the distance r from the core center when the compensated fiber and the mode dispersion-compensating fiber are coupled to obtain the maximum band at the predetermined wavelength, and k is a proportional numerical constant.

4. An optical transmission path constructed by coupling a compensated fiber comprising a multimode optical fiber to a mode dispersion-compensating fiber having a refractive index profile that satisfies the following equation, according to a length ratio that obtains a maximum band:

$$\Delta_{comp}(r)=\Delta_{opt}(r)+k\{\Delta_{opt}(r)-\Delta_{target}(r)\}$$

where $\Delta_{comp}(r)$ is a relative refractive index difference of the mode dispersion-compensating fiber at a distance r from a core center, $\Delta_{target}(r)$ is a relative refractive index difference of the compensated fiber at a distance r from a core center, $\Delta_{opt}(r)$ is a relative refractive index difference of the entire fiber at the distance r from the core center when the compensated fiber and the mode dispersion-compensating fiber are coupled to obtain a maximum band at a predetermined wavelength, and k is a proportional numerical constant.

5. The optical transmission path as described in claim 4, wherein the optical transmission path transmits signal light with a wavelength of 0.85 μm or 1.3 μm.

6. A method for compensating modal dispersion comprising coupling a mode dispersion-compensating fiber and a compensated fiber according to a length that satisfies the following equation:

$$L_{comp}/L_{target} = \frac{\int_0^{a_{target}} \{\Delta_{target}(r) - \Delta_{opt}(r)\} dr}{\int_0^{a_{comp}} \{\Delta_{opt}(r) - \Delta_{comp}(r)\} dr}$$

where $L_{comp}$ is a length of the mode dispersion-compensating fiber, $L_{target}$ is a length of the compensated fiber, $a_{comp}$ is a core radius of the mode dispersion-compensating fiber, $a_{target}$ is a core radius of the compensated fiber, $\Delta_{comp}(r)$ is a relative refractive index difference at a distance r from a core center of the mode dispersion-compensating fiber, $\Delta_{target}(r)$ is a relative refractive index difference at a distance r from a core center of the compensated fiber, and $\Delta_{opt}(r)$ is a relative refractive index difference at a distance r from a core center of the entire fiber when the compensated fiber and the mode dispersion-compensating fiber are coupled to obtain a maximum band at a predetermined wavelength, wherein the mode dispersion-compensating fiber and compensated fiber comprise multimode optical fibers, modal dispersion is compensated in the compensated fiber, and a maximum band at a predetermined wavelength is obtained.

7. A method for compensating modal dispersion comprising coupling a mode dispersion-compensating fiber and a compensated fiber having refractive index profiles that satisfy the following equation:

$$n(r) = \begin{cases} n_1\{1 - 2\Delta_1(r/a)^\alpha\}^{1/2} & (0 \leq r \leq a) \\ n_1\{1 - 2\Delta_1\}^{1/2} & (a < r) \end{cases}$$

where n(r) is a relative refractive index difference of the optical fibers at a distance r from a core center, $n_1$ is a refractive index at the core center, $\Delta_1$ is a relative refractive index difference of the core center with respect to a cladding, a is a core radius, and α is a refractive index profile exponential parameter, wherein the mode dispersion-compensating fiber and compensated fiber comprise multimode optical fibers, modal dispersion is compensated in the compensated fiber, a maximum band at a predetermined wavelength is obtained, and the compensated fiber and mode dispersion-compensating fiber are coupled according to a length ratio that satisfies the following equation:

$$L_{comp}/L_{target} = \left(\frac{\alpha_{target} - \alpha_{opt}}{\alpha_{opt} - \alpha_{comp}}\right) \times \left(\frac{1 + \alpha_{comp}}{1 + \alpha_{target}}\right)$$

where $L_{comp}$ is a length of the mode dispersion-compensating fiber, $L_{target}$ is a length of the compensated fiber, $\alpha_{comp}$ is a refractive index profile exponential parameter of the mode dispersion-compensating fiber, $\alpha_{target}$ is a refractive index profile exponential parameter of the compensated fiber, and $\alpha_{opt}$ is a refractive index profile exponential parameter of the entire fiber when the mode dispersion-compensating fiber and the compensated fiber are coupled so as to obtain a maximum band at a predetermined wavelength.

8. An optical transmission path constructed by coupling a compensated fiber and a mode dispersion-compensating fiber, comprising multimode optical fibers, according to a length ratio that satisfies the following equation:

$$L_{comp}/L_{target} = \frac{\int_0^{a_{target}} \{\Delta_{target}(r) - \Delta_{opt}(r)\} dr}{\int_0^{a_{comp}} \{\Delta_{opt}(r) - \Delta_{comp}(r)\} dr}$$

where $L_{comp}$ is a length of the mode dispersion-compensating fiber, $L_{target}$ is a length of the compensated fiber, $a_{comp}$ is a core radius of the mode dispersion-compensating fiber, $a_{target}$ is a core radius of the compensated fiber, $\Delta_{comp}(r)$ is a relative refractive index difference at a distance r from a core center of the mode dispersion-compensating fiber, $\Delta_{target}(r)$ is a relative refractive index difference at a distance r from a core center of the compensated fiber, and $\Delta_{opt}(r)$ is a relative refractive index difference at a distance r from a core center of the entire fiber when the compensated fiber and the mode dispersion-compensating fiber are coupled to obtain a maximum band at a predetermined wavelength.

9. The optical transmission path as described in claim 8, wherein the optical transmission path transmits signal light with a wavelength of 0.85 μm or 1.3 μm.

10. An optical transmission path constructed by coupling a mode dispersion-compensating fiber and a compensated fiber, comprising multimode optical fibers, wherein the mode dispersion-compensating fiber and the compensated fiber have refractive index profiles that satisfy the following equation:

$$n(r) = \begin{cases} n_1\{1 - 2\Delta_1(r/a)^\alpha\}^{1/2} & (0 \leq r \leq a) \\ n_1\{1 - 2\Delta_1\}^{1/2} & (a < r) \end{cases}$$

where n(r) is a relative refractive index difference of the optical fibers at a distance r from a core center, $n_1$ is a refractive index at the core center, $\Delta_1$ is a relative refractive index difference of the core center with respect to a cladding, a is a core radius, and α is a refractive index profile exponential parameter, and the mode dispersion-compensating fiber and the compensated fiber are coupled according to a length ratio that satisfies the following equation:

$$L_{comp}/L_{target} = \left(\frac{\alpha_{target} - \alpha_{opt}}{\alpha_{opt} - \alpha_{comp}}\right) \times \left(\frac{1 + \alpha_{comp}}{1 + \alpha_{target}}\right)$$

where $L_{comp}$ is a length of the mode dispersion-compensating fiber, $L_{target}$ is a length of the compensated fiber, $\alpha_{comp}$ is a refractive index profile exponential parameter of the mode dispersion-compensating fiber, $\alpha_{target}$ is a refractive index profile exponential parameter of the compensated fiber, and $\alpha_{opt}$ is a refractive index profile exponential parameter of the entire fiber when the mode dispersion-compensating fiber and the compensated-fiber are coupled so as to obtain a maximum band at a predetermined wavelength.

11. The optical transmission path as described in claim 10, wherein the optical transmission path transmits signal light with a wavelength of 0.85 μm or 1.3 μm.

12. The optical transmission path as described in claim 10, wherein refractive index profile exponential parameters $\alpha_{comp}$ and $\alpha_{target}$ of the mode dispersion-compensating fiber and the compensated fiber are 0.5 or greater, the relative refractive index differences of core centers with respect to claddings $\Delta_{1comp}$ and $\Delta_{1target}$ are between 0.005 and 0.025, and core radii $a_{comp}$ and $a_{target}$ are between 5 μm and 50 μm.

13. The optical transmission path as described in claim 12, wherein the optical transmission path transmits signal light with a wavelength of 0.85 μm or 1.3 μm.

* * * * *